US008745661B2

(12) United States Patent
Ellis et al.

(10) Patent No.: US 8,745,661 B2
(45) Date of Patent: Jun. 3, 2014

(54) SYSTEMS AND METHODS FOR PROVIDING ENHANCED SPORTS WATCHING MEDIA GUIDANCE

(75) Inventors: Michael D. Ellis, Boulder, CO (US); Jon P. Radloff, Castle Rock, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 1401 days.

(21) Appl. No.: 11/888,675

(22) Filed: Jul. 31, 2007

(65) Prior Publication Data
US 2008/0066111 A1 Mar. 13, 2008

Related U.S. Application Data

(60) Provisional application No. 60/834,605, filed on Jul. 31, 2006, provisional application No. 60/903,808, filed on Feb. 26, 2007.

(51) Int. Cl.
| | | |
|---|---|---|
| H04N 5/445 | (2011.01) | |
| G06F 3/00 | (2006.01) | |
| G06F 13/00 | (2006.01) | |
| H04H 60/33 | (2008.01) | |
| H04N 7/16 | (2011.01) | |
| H04H 60/32 | (2008.01) | |
| H04N 21/442 | (2011.01) | |
| H04N 21/472 | (2011.01) | |
| H04N 21/466 | (2011.01) | |
| H04N 21/658 | (2011.01) | |
| H04N 7/173 | (2011.01) | |
| H04N 21/45 | (2011.01) | |
| H04N 21/258 | (2011.01) | |
| H04N 21/433 | (2011.01) | |
| H04N 21/458 | (2011.01) | |

(52) U.S. Cl.
CPC ... *H04N 21/44218* (2013.01); *H04N 21/47202* (2013.01); *H04N 21/4667* (2013.01); *H04N 21/6582* (2013.01); *H04N 5/44543* (2013.01); *H04N 7/17318* (2013.01); *H04N 21/4532* (2013.01); *H04N 21/25891* (2013.01); *H04N 21/47214* (2013.01); *H04N 21/4334* (2013.01); *H04N 21/4583* (2013.01)
USPC .................. 725/38; 725/139; 725/9; 725/14

(58) Field of Classification Search
None
See application file for complete search history.

(56) References Cited

U.S. PATENT DOCUMENTS 4,071,697 A    1/1978   Bushnell et al.
(Continued)

FOREIGN PATENT DOCUMENTS

| EP | 0 721 253 | 7/1996 |
| EP | 0 848 554 | 6/1998 |

(Continued)

OTHER PUBLICATIONS

Hogan, "ShopNBC Winks at ITV," Multichannel News, pp. 1-2, Jun. 25, 2001.

(Continued)

*Primary Examiner* — Mark D Featherstone
(74) *Attorney, Agent, or Firm* — Ropes & Gray LLP

(57) ABSTRACT

Systems and methods for enhanced sports-related media content access and display are provided. An intelligent tuning module for multi-tuner systems may designate one sporting event as a primary sporting event and another sporting event as a secondary sporting event. A primary tuner may tune the primary event whenever possible and a secondary tuner may tune the secondary event whenever possible. Sporting events may be assigned user profile scores and tuned away from in reverse priority order. An interactive scoreboard may also be displayed with various game status and alert icons. The interactive scoreboard may allow a viewer to quickly tune between high-interest sporting events. Sports-specific features, such as wagering and fantasy league support, are also provided.

86 Claims, 35 Drawing Sheets

(56) References Cited

U.S. PATENT DOCUMENTS

| | | | | |
|---|---|---|---|---|
| 4,706,121 | A | 11/1987 | Young | |
| 4,872,005 | A | 10/1989 | DeLuca et al. | |
| 4,977,455 | A | 12/1990 | Young | |
| 5,224,156 | A | 6/1993 | Fuller et al. | |
| 5,351,075 | A | 9/1994 | Herz et al. | |
| 5,353,121 | A | 10/1994 | Young et al. | |
| 5,410,344 | A | 4/1995 | Graves et al. | |
| 5,412,720 | A | 5/1995 | Hoarty | |
| 5,485,197 | A | 1/1996 | Hoarty | |
| 5,553,221 | A | 9/1996 | Reimer et al. | |
| 5,557,338 | A * | 9/1996 | Maze et al. | 725/38 |
| 5,583,560 | A * | 12/1996 | Florin et al. | 725/40 |
| 5,589,892 | A | 12/1996 | Knee et al. | |
| 5,594,661 | A | 1/1997 | Bruner et al. | |
| 5,600,364 | A | 2/1997 | Hendricks et al. | |
| 5,617,565 | A | 4/1997 | Augenbraun et al. | |
| 5,623,613 | A | 4/1997 | Rowe et al. | |
| 5,629,733 | A | 5/1997 | Youman et al. | |
| 5,635,978 | A | 6/1997 | Alten et al. | |
| 5,635,989 | A | 6/1997 | Rothmuller | |
| 5,659,350 | A | 8/1997 | Hendricks et al. | |
| 5,673,089 | A | 9/1997 | Yuen et al. | |
| 5,678,170 | A | 10/1997 | Grube et al. | |
| 5,680,617 | A | 10/1997 | Gough et al. | |
| 5,699,107 | A | 12/1997 | Lawler et al. | |
| 5,801,787 | A | 9/1998 | Schein et al. | |
| 5,809,204 | A | 9/1998 | Young et al. | |
| 5,812,931 | A | 9/1998 | Yuen | |
| 5,850,218 | A | 12/1998 | LaJoie et al. | |
| 5,886,746 | A | 3/1999 | Yuen et al. | |
| 5,940,073 | A | 8/1999 | Klosterman et al. | |
| 5,945,988 | A | 8/1999 | Williams et al. | |
| 5,986,650 | A * | 11/1999 | Ellis et al. | 725/40 |
| 6,002,394 | A | 12/1999 | Schein et al. | |
| 6,005,565 | A | 12/1999 | Legall et al. | |
| 6,008,802 | A | 12/1999 | Iki et al. | |
| 6,016,141 | A | 1/2000 | Knudson et al. | |
| 6,061,056 | A | 5/2000 | Menard et al. | |
| 6,061,097 | A | 5/2000 | Satterfield | |
| 6,133,909 | A | 10/2000 | Schein et al. | |
| 6,147,715 | A | 11/2000 | Yuen | |
| 6,177,931 | B1 | 1/2001 | Alexander et al. | |
| 6,208,335 | B1 | 3/2001 | Gordon et al. | |
| 6,216,264 | B1 | 4/2001 | Maze et al. | |
| 6,219,839 | B1 | 4/2001 | Sampsell | |
| 6,226,444 | B1 | 5/2001 | Goldschmidt et al. | |
| 6,226,618 | B1 | 5/2001 | Downs et al. | |
| 6,239,794 | B1 | 5/2001 | Yuen et al. | |
| 6,247,176 | B1 | 6/2001 | Schein et al. | |
| 6,256,071 | B1 | 7/2001 | Hiroi | |
| 6,263,501 | B1 | 7/2001 | Schein et al. | |
| 6,275,268 | B1 | 8/2001 | Ellis et al. | |
| 6,282,713 | B1 | 8/2001 | Kitsukawa et al. | |
| 6,289,346 | B1 | 9/2001 | Milewski et al. | |
| 6,308,328 | B1 | 10/2001 | Bowcutt et al. | |
| 6,324,338 | B1 | 11/2001 | Wood et al. | |
| 6,331,877 | B1 | 12/2001 | Bennington et al. | |
| 6,369,840 | B1 | 4/2002 | Barnett et al. | |
| 6,388,714 | B1 | 5/2002 | Schein et al. | |
| 6,418,556 | B1 | 7/2002 | Bennington et al. | |
| 6,536,041 | B1 * | 3/2003 | Knudson et al. | 725/39 |
| 6,539,548 | B1 | 3/2003 | Hendricks et al. | |
| 6,542,882 | B1 | 4/2003 | Smith | |
| 6,564,378 | B1 | 5/2003 | Satterfield et al. | |
| 6,571,390 | B1 | 5/2003 | Dunn et al. | |
| 6,614,987 | B1 | 9/2003 | Ismail et al. | |
| 6,651,253 | B2 * | 11/2003 | Dudkiewicz et al. | 725/114 |
| 6,721,954 | B1 | 4/2004 | Nickum | |
| 6,721,956 | B2 | 4/2004 | Wasilewski | |
| 6,742,183 | B1 | 5/2004 | Reynolds | |
| 6,756,997 | B1 | 6/2004 | Ward et al. | |
| 6,757,906 | B1 | 6/2004 | Look et al. | |
| 6,810,526 | B1 | 10/2004 | Menard et al. | |
| 6,813,777 | B1 * | 11/2004 | Weinberger et al. | 725/76 |
| 6,865,746 | B1 | 3/2005 | Herrington et al. | |
| 6,868,225 | B1 * | 3/2005 | Brown et al. | 386/83 |
| 6,897,904 | B2 * | 5/2005 | Potrebic et al. | 348/731 |
| 6,898,762 | B2 | 5/2005 | Ellis et al. | |
| 6,909,708 | B1 | 6/2005 | Krishnaswamy et al. | |
| 7,003,791 | B2 * | 2/2006 | Mizutani | 725/21 |
| 7,013,478 | B1 | 3/2006 | Hendricks et al. | |
| 7,055,166 | B1 | 5/2006 | Logan et al. | |
| 7,136,829 | B2 | 11/2006 | Hellal et al. | |
| 7,152,236 | B1 | 12/2006 | Wugofski et al. | |
| 7,165,098 | B1 | 1/2007 | Boyer et al. | |
| 7,185,355 | B1 | 2/2007 | Ellis | |
| 7,206,892 | B2 | 4/2007 | Kim et al. | |
| 7,213,089 | B2 * | 5/2007 | Hatakenaka | 710/65 |
| 7,231,607 | B2 | 6/2007 | Neely et al. | |
| 7,283,992 | B2 | 10/2007 | Liu et al. | |
| 7,296,284 | B1 | 11/2007 | Price et al. | |
| 7,334,195 | B2 | 2/2008 | Gemmell et al. | |
| 7,386,871 | B1 * | 6/2008 | Knudson et al. | 725/92 |
| 7,458,093 | B2 | 11/2008 | Dukes et al. | |
| 7,496,941 | B2 | 2/2009 | Russo | |
| 7,603,685 | B2 * | 10/2009 | Knudson et al. | 725/46 |
| 7,673,314 | B2 | 3/2010 | Ellis et al. | |
| 7,694,319 | B1 | 4/2010 | Hassell et al. | |
| 7,738,765 | B2 | 6/2010 | Matsuno et al. | |
| 7,783,632 | B2 | 8/2010 | Richardson et al. | |
| 7,825,987 | B2 | 11/2010 | Yui et al. | |
| 2001/0047298 | A1 | 11/2001 | Moore | |
| 2002/0026496 | A1 | 2/2002 | Boyer et al. | |
| 2002/0035697 | A1 | 3/2002 | McCurdy et al. | |
| 2002/0042913 | A1 | 4/2002 | Ellis | |
| 2002/0056119 | A1 * | 5/2002 | Moynihan | 725/87 |
| 2002/0059610 | A1 | 5/2002 | Ellis | |
| 2002/0059621 | A1 | 5/2002 | Thomas et al. | |
| 2002/0075402 | A1 | 6/2002 | Robson et al. | |
| 2002/0078447 | A1 | 6/2002 | Mizutome et al. | |
| 2002/0078453 | A1 | 6/2002 | Kuo | |
| 2002/0108113 | A1 | 8/2002 | Schaffer et al. | |
| 2002/0120507 | A1 | 8/2002 | Chanos et al. | |
| 2002/0124247 | A1 | 9/2002 | Houghton | |
| 2002/0129368 | A1 | 9/2002 | Schlack et al. | |
| 2002/0157099 | A1 | 10/2002 | Schrader et al. | |
| 2002/0165770 | A1 | 11/2002 | Khoo et al. | |
| 2002/0174430 | A1 | 11/2002 | Ellis et al. | |
| 2002/0194600 | A1 | 12/2002 | Ellis et al. | |
| 2003/0005445 | A1 | 1/2003 | Schein et al. | |
| 2003/0093792 | A1 | 5/2003 | Labeeb et al. | |
| 2003/0093803 | A1 | 5/2003 | Ishikawa et al. | |
| 2003/0110499 | A1 | 6/2003 | Knudson et al. | |
| 2003/0126600 | A1 | 7/2003 | Heuvelman | |
| 2003/0131356 | A1 | 7/2003 | Proehl et al. | |
| 2003/0149621 | A1 | 8/2003 | Shteyn | |
| 2003/0149980 | A1 | 8/2003 | Ellis | |
| 2003/0154478 | A1 | 8/2003 | Hassell et al. | |
| 2003/0167467 | A1 | 9/2003 | Allen et al. | |
| 2003/0177497 | A1 | 9/2003 | Macrae et al. | |
| 2003/0182658 | A1 | 9/2003 | Alexander | |
| 2003/0196201 | A1 | 10/2003 | Schein et al. | |
| 2003/0225777 | A1 | 12/2003 | Marsh | |
| 2004/0003391 | A1 | 1/2004 | Gutta et al. | |
| 2004/0025180 | A1 | 2/2004 | Begeja et al. | |
| 2004/0064835 | A1 | 4/2004 | Bellwood et al. | |
| 2004/0068745 | A1 | 4/2004 | Yamamoto et al. | |
| 2004/0073918 | A1 | 4/2004 | Ferman et al. | |
| 2004/0096184 | A1 | 5/2004 | Poslinski | |
| 2004/0103434 | A1 | 5/2004 | Ellis | |
| 2004/0103437 | A1 | 5/2004 | Allegrezza et al. | |
| 2004/0117831 | A1 | 6/2004 | Ellis et al. | |
| 2004/0128685 | A1 | 7/2004 | Hassel | |
| 2004/0128686 | A1 | 7/2004 | Boyer | |
| 2004/0139047 | A1 | 7/2004 | Rechsteiner et al. | |
| 2004/0177370 | A1 | 9/2004 | Dudkiewicz | |
| 2004/0210926 | A1 * | 10/2004 | Francis et al. | 725/25 |
| 2004/0210932 | A1 | 10/2004 | Mori et al. | |
| 2004/0239812 | A1 * | 12/2004 | Park et al. | 348/588 |
| 2005/0015405 | A1 | 1/2005 | Plastina et al. | |
| 2005/0028208 | A1 | 2/2005 | Ellis et al. | |
| 2005/0028218 | A1 | 2/2005 | Blake | |
| 2005/0120373 | A1 | 6/2005 | Thomas et al. | |
| 2005/0158023 | A1 | 7/2005 | Takasu | |

(56) References Cited

U.S. PATENT DOCUMENTS

| | | |
|---|---|---|
| 2005/0160461 A1 | 7/2005 | Baumgartner et al. |
| 2005/0204388 A1 | 9/2005 | Knudson et al. |
| 2005/0210520 A1 | 9/2005 | Horvitz et al. |
| 2005/0235319 A1 | 10/2005 | Carpenter et al. |
| 2005/0251827 A1 | 11/2005 | Ellis et al. |
| 2005/0259963 A1 | 11/2005 | Sano et al. |
| 2005/0278741 A1 | 12/2005 | Robarts et al. |
| 2005/0278768 A1 | 12/2005 | Boyer et al. |
| 2006/0026635 A1 | 2/2006 | Potrebic et al. |
| 2006/0026648 A1 | 2/2006 | Kirihara et al. |
| 2006/0026665 A1 | 2/2006 | Rodriguez et al. |
| 2006/0053449 A1 | 3/2006 | Gutta |
| 2006/0173838 A1 | 8/2006 | Garg et al. |
| 2006/0218573 A1 | 9/2006 | Proebstel |
| 2006/0218604 A1 | 9/2006 | Riedl et al. |
| 2006/0236360 A1 | 10/2006 | Yuen et al. |
| 2006/0253874 A1 | 11/2006 | Stark et al. |
| 2006/0271953 A1 | 11/2006 | Jacoby et al. |
| 2006/0294574 A1* | 12/2006 | Cha ................. 725/152 |
| 2007/0039023 A1 | 2/2007 | Kataoka |
| 2007/0055989 A1 | 3/2007 | Shanks et al. |
| 2007/0067271 A1 | 3/2007 | Lu |
| 2007/0074245 A1 | 3/2007 | Nyako et al. |
| 2007/0078822 A1 | 4/2007 | Cucerzan et al. |
| 2007/0089132 A1* | 4/2007 | Qureshey et al. ........ 725/39 |
| 2007/0112740 A1 | 5/2007 | Geva |
| 2007/0130089 A1 | 6/2007 | Chiu |
| 2007/0162502 A1 | 7/2007 | Thomas et al. |
| 2007/0162850 A1 | 7/2007 | Adler et al. |
| 2007/0169148 A1 | 7/2007 | Oddo et al. |
| 2007/0186240 A1 | 8/2007 | Ward et al. |
| 2007/0214132 A1 | 9/2007 | Grubb et al. |
| 2008/0092155 A1 | 4/2008 | Ferrone et al. |
| 2008/0092156 A1 | 4/2008 | Ferrone et al. |
| 2008/0104057 A1 | 5/2008 | Billmaier et al. |
| 2008/0104127 A1 | 5/2008 | Billmaier et al. |
| 2008/0184294 A1 | 7/2008 | Lemmons et al. |
| 2010/0107194 A1 | 4/2010 | McKissick et al. |
| 2010/0131983 A1 | 5/2010 | Shannon et al. |
| 2010/0153885 A1 | 6/2010 | Yates |
| 2010/0175092 A1 | 7/2010 | Kikinis et al. |
| 2010/0287590 A1 | 11/2010 | Knudson |

FOREIGN PATENT DOCUMENTS

| | | |
|---|---|---|
| EP | 0 854 645 | 7/1998 |
| EP | 1 363 452 A | 11/2003 |
| EP | 1 463 307 | 9/2004 |
| JP | 09-037233 | 2/1997 |
| WO | WO 97/13368 | 4/1997 |
| WO | WO 98/26584 | 6/1998 |
| WO | WO 98/27723 | 6/1998 |
| WO | WO 98/43183 | 10/1998 |
| WO | WO 99/01984 | 1/1999 |
| WO | WO 99/04561 | 1/1999 |
| WO | WO 00/33576 | 6/2000 |
| WO | WO 00/38428 | 6/2000 |
| WO | WO 01/15438 | 3/2001 |
| WO | WO 01/91458 A | 11/2001 |
| WO | WO 2008/016617 | 2/2008 |

OTHER PUBLICATIONS

NDS Opens a New York Office to Focus on Developing Interactive TV Systems and Application for U.S. Market, Business Wire, pp. 1-3, Jan. 24, 2001.

Shaw, "The Interactive Living Revolution," Multichannel News, pp. 1-3, Mar. 31, 2003.

Susanne Boll, Utz Westermann: "Meeting Experience: MediÆther: An Event Space for Context-Aware Multimedia Experiences," Proceedings of the 2003 ACM SIGMM Workshop on Experiential Telepresence ETP '03, Online Nov. 7, 2003, pp. 21-30.

TiVo Viewer's Guide: How to Activate and Use Your TiVo Service, SDOC-00057-000 Rev. B, 2002.

Van Barneveld et al., "Designing Usable Interfaces for TV Recommender Systems," Personalized Digital Television, vol. 6, pp. 259-286.

Waltner, "Cable Nets Eye New Interactive Services (Interactive Television)," Multichannel News, pp. 3-5, Feb. 23, 1998.

* cited by examiner

| Source ID | Type | Profile Score |
|---|---|---|
| <sourceid_1> | Game | 90 |
| <sourceid_2> | Game | 95 |
| <sourceid_3> | Commentary | 45 |
| <sourceid_4> | News | 75 |
| <sourceid_5> | Movie | 25 |
| <sourceid_6> | Movie | 35 |
| <sourceid_7> | Highlights | 65 |
| <sourceid_8> | Game | 80 |

230

| Tuner | Primary Source ID |
|---|---|
| 1 | <sourceid_2> |
| 2 | <sourceid_1> |
| 3 | <sourceid_8> |
| 4 | <sourceid_4> |

Set Favorites

26 FSN
11a-2p

1302 — Football ★ ⌒1308
1304 — NFL
1306 — SEA ★★★
PIT

1310 ⌒

SEA 7 PIT 0; 5:50 rem in 4th; PIT 2nd/10 on PIT 35yd
Seattle plays football with Pittsburgh. Seattle is coming off a losing streak, while Pittsburgh is hot. This match-up will feature two of the league's toughest QB's and will prove to be an exciting game. Seattle is battling several injuries of key players, which may hurt them here. Pittsburgh...

SYSTEMS AND METHODS FOR PROVIDING ENHANCED SPORTS WATCHING MEDIA GUIDANCE

CROSS-REFERENCE TO RELATED APPLICATIONS

This application claims the benefit of U.S. Provisional Application No. 60/834,605, filed Jul. 31, 2006 and 60/903,808, filed Feb. 26, 2007, both of which are hereby incorporated by reference herein in their entireties.

BACKGROUND OF THE INVENTION

This invention relates generally to media systems and, more particularly, to media systems with sports-specific viewing and tuning enhancements.

An interactive media guidance application, such as an interactive television program guide, allows a user to tune to and display a wide array of media content that is available within a media system. It also facilitates the display of additional information (e.g., program schedule and summary information) about the media content. This additional information may be accessed from a variety of data sources and data feeds and may include, for example, content summaries, genre classifications, and ratings information. The interactive media guidance application may also support advanced features, such as content searching and filtering, channel scanning, and access to other interactive applications, such as a home shopping application.

Such media guidance applications are typically generalized applications that support basic media guidance functionality for a wide array of media content of a variety of different genres and subgenres. These applications, however, typically fail to provide a custom set of features and functionality for specific types of media content, such as sporting events and other sports-related content.

In addition, some media guidance applications fail to take full advantage of today's high-end user equipment devices. For example, current user equipment devices may support multiple digital or analog tuners, allowing for more than one channel or media content to be tuned, displayed, and/or recorded simultaneously. Current media guidance applications fail to efficiently manage and leverage the capabilities of multiple tuners to better match how certain types of viewers (e.g., sports viewers) commonly watch and interact with sporting events displayed on the user equipment device. As a result, idle tuners are often untuned or tuned to content that is not of particular interest to the viewer. In addition, traditional tuner management schemes for multi-tuner systems are not optimized for certain types of viewing, such as sports viewing.

For example, in order to tune and display a digital television channel, many steps typically are performed. The digital content may first be demodulated from a digital carrier frequency and then FEC decoded from the demodulated transport stream (TS). The digital content may then be demultiplexed from the demodulated transport stream. After the digital content is demultiplexed from the transport stream, the content may be extracted from a particular packet identifier (PID) stream. In addition, decryption and decoding (e.g., MPEG-2 or H.264 decoding) may be required. These digital tuning and decoding processes may take an appreciable amount of time, during which a blank or black screen is typically displayed to the viewer. This idle time is particularly noticeable to users who switch back and forth between a small number of content selections, like the way sports viewers switch back and forth between a small number of televised sporting events.

In addition, a viewer is unable to efficiently switch between sporting events of interest to the viewer at any given time. For example, although some user equipment devices support last channel recall or similar functionality, last channel recall functions are typically limited to switching back only to the most recently accessed television channel. The ability to efficiently switch between multiple high-interest content selections is severely limited. Real-time buffering and immediate video control (e.g., pause and rewind functions) after switching to a sporting event of interest are also severely limited because of idle tuners or tuners tuned to arbitrary content.

SUMMARY OF THE INVENTION

In accordance with principles of the present invention, systems and methods for providing enhanced information access and viewing functionality for sports-related programming are provided. An interactive "sports watcher" application may execute at least partially on a local user equipment device to support the enhanced access and viewing functionality. In some embodiments, the interactive sports watcher application is integrated as a mode of another interactive application already resident on the user equipment device. For example, the sports watcher application may be integrated with an interactive media guidance application, such as an interactive television program guide. In other embodiments, a separate interactive sports watcher application or module is provided. This application or module may be automatically invoked by the interactive media guidance application when certain pre-determined conditions are met (e.g., when sports-related programming or information is requested, accessed, or displayed).

A user may designate a first sporting event as a primary sporting event and up to N−1 additional sporting events as secondary sporting events, where N is the number of available tuners in the user equipment device. One tuner may be designated as the primary tuner that, whenever possible, is tuned to the primary sporting event. The other N−1 tuners may be designated secondary tuners, each of which may be assigned a lower priority than the primary tuner. After receiving a request to change channels or access content that requires an available tuner, the secondary tuner with the lowest priority may be used to tune to the requested channel or access the requested content. In this way, the primary sporting event may be tuned on the primary tuner whenever possible. Sporting events designated as primary or secondary sporting events may be manually selected by the user, or the interactive sports watcher application may automatically designate certain events as primary or secondary sporting events. This designation may be based, at least in part, on user profile information, user preferences, active user monitoring, user history information, network viewing statistics, third-party ratings information (e.g., Nielson ratings), or any other suitable criterion or combination of criteria.

The interactive sports watcher application may maintain a dynamic, real-time buffer for each tuned sporting event. The user may have full control over each real-time buffer, including pause, instant replay, and slow motion replay control. In some embodiments, the characteristics of the buffers (e.g., buffer size, buffer window, and/or buffer resolution) may differ depending on the type of sport, whether the buffered sporting event is designated as a primary sporting event, secondary sporting event, or otherwise matches the user's predefined sports viewing event preferences. For example, a high-speed basketball game may be buffered at the highest available resolution (e.g., in high-definition, if available), while a golf tournament may be buffered in a lower resolution (e.g., standard definition). In addition, the buffer window (i.e., the length of time buffered) may be longer for the basketball game than the golf tournament, depending on user preferences.

In some embodiments, the interactive sports watcher application may monitor all media content access requests on the user equipment device. When sports-related content is accessed, an interactive scoreboard may be automatically displayed in one area of the display screen while the requested sports-related content (e.g., a sporting event, sports news, or sports commentary) is displayed in another area of the screen. The interactive scoreboard may include an identification of a plurality of sporting events that are in progress, recently ended, or match user-defined preference criteria. The current score of each sporting event may be provided within the interactive scoreboard. A user may interact with the scoreboard to obtain more detailed information about a sporting event, automatically tune a sporting event, or automatically designate a sporting event as a primary or secondary sporting event.

The interactive scoreboard may also feature a variety of icons that indicate the status of sporting events associated with scores displayed in the scoreboard. For example, one icon may indicate that the sporting event is currently tuned by a tuner in the user equipment device. Another icon may indicate that the event is currently displayed in the main screen or active window. Game status icons may also be included in the interactive scoreboard. These game status icons may indicate that a sporting event has returned from a commercial break (e.g., a live action notification), is almost over (e.g., a time remaining notification), currently has exciting action taking place, or any other suitable content characteristic. Through these icons in the scoreboard, a user may be presented with additional information about sporting events of interest.

In some embodiments, value-added features, such as sports wagering and fantasy leagues, are provided by the interactive sports watcher application. Users may be credited with electronic wagering points or dollars that may be redeemable for sports-related merchandise (e.g., team clothing), on-demand content, sports package subscriptions, premium channels and services, or cash. Various incentives may be offered to encourage participation in the wagering and/or the fantasy league features of the present invention.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 2B shows illustrative tuner data tables in accordance with one embodiment of the invention;

FIGS. 10-13 are illustrative display screens for setting user favorites in accordance with one embodiment of the invention;

DETAILED DESCRIPTION

The interactive sports watcher application described herein may be implemented as a stand-alone application executing at least partially on a user equipment device, or the application may be implemented as a module or mode of an existing interactive application. If implemented as a module or mode of an existing interactive application, such as an interactive media guidance application, all the display screens, prompts, and overlays shown herein may be integrated with the display screens, prompts, and overlays of the existing application. For example, fonts, colors, and overall layouts may be changed from those depicted to better match the fonts, colors, and overall layouts of the already existing application. In addition, features of an existing interactive media guidance application (or any other interactive application) may be incorporated into the sports watcher application in order to provide added flexibility and functionality without leaving the sports watcher application, if desired.

The interactive sports watcher application may monitor all media content access requests, including television channel requests, Internet webpage requests, requests for on-demand and pay-per-view content, and requests for locally-recorded content. The sports watcher application may automatically launch after a request for a sporting event or sports-related content is received or after such content is displayed. Alternatively, a user may manually launch the sports watcher application by issuing a suitable command to the user equipment device. For example, a user may press a button on a remote control to launch the sports watcher application in some embodiments.

Although the terms "sporting event" and "sports-related content" are sometimes used interchangeably herein, both of these terms include content, such as television programming, on-demand movies, and Internet websites, that is accessible from a user equipment device and is related to, or affiliated with, a sport, sports team, or athlete. In addition to traditional television programming, these terms may include webpages, online discussion boards, chat rooms, web logs (blogs), interactive games, and digital music. For example, in some embodiments, an online sports commentary or sports blog may be considered a sporting event or sports-related content by the interactive sports watcher application. As another example, sports-themed movies and sports news may also be considered sports-related content by the interactive sports watcher application. As described below, accessing this content may automatically launch the sports watcher application (and automatically display any of the sports watcher display screens described herein).

Figure 1:
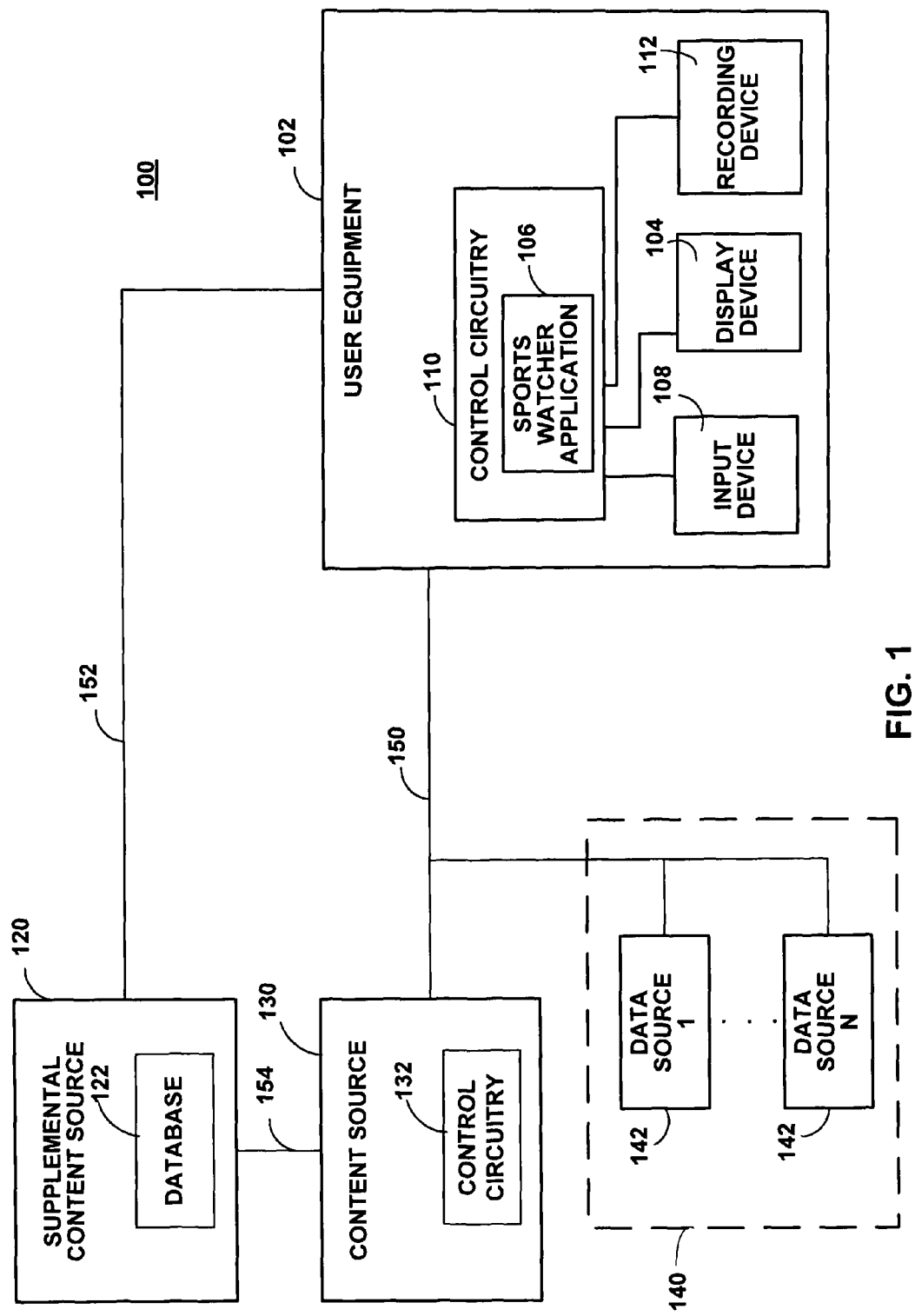
FIG. 1 is an illustrative block diagram of a media system in accordance with one embodiment of the invention.

FIG. 1 shows illustrative interactive media system 100 that may be used with the sports watcher application in accordance with one embodiment of the invention. User equipment device 102 receives content in the form of signals from content source 130 and/or supplemental content source 120 over communications paths 150 and 152, respectively. Any suitable number of users may have one or more user equipment devices, such as user equipment 102, coupled to content source 130, data sources 140, and supplemental content source 120. For the clarity of the figure, however, only a single user equipment device is shown. In addition, although in practice there may be numerous instances of content source 130 and supplemental content source 120, for clarity only one instance of each source has been shown in the example of FIG. 1.

Content source 130 may be any suitable source of media content, such as, for example, a cable system headend, satellite television distribution facility, television broadcast facility, on-demand server (e.g., video-on-demand (VOD) server), Internet or network media/web server, or any other suitable facility or system for originating or distributing passive or interactive content to user equipment 102. Media content that may be provided by content source 130 to user equipment 102 includes broadcast programming, VOD programming, digital music, news, interactive applications (e.g., interactive games), Internet resources and web services (e.g., websites, newsgroups, and chat rooms), and any other content capable of being displayed by, presented to, recorded, or interacted with, using user equipment 102.

Supplemental content source 120 may be any suitable content source configured to provide real-time sports scores and game summary information, tournament brackets and tournament information, sports commentary, athlete biographies, spread and wagering data, and any other sports-related information to user equipment 102. In some embodiments, this sports-related information is provided to user equipment 102 as a plurality of real-time data feeds. Each data feed may be individually accessed or subscribed to by user equipment 102. For example, sports score and game status information may be included in one real-time data feed, while sports commentary may be included in another feed. The sporting events with associated data available from supplemental content source 120 may include events in progress or events that have recently ended. In addition, supplemental content source 120 may include information relating to sporting events not available for viewing in media system 100. For example, a non-televised game may nevertheless have associated sports-related information available on supplemental content source 120.

Some or all of this sports-related information may be stored in database 122 and provided to content source 130 or directly to user equipment 120 over communications paths 154 and 152, respectively. Supplemental content source 120 may include any third-party application provider, data manager, content manager, content aggregator, or intermediate content provider. Supplemental content source 120 may also be contracted to provide enhanced parental control services on behalf of user equipment 102. For example, supplemental content source 120 may provide ratings information for media types that traditionally are not associated with ratings information. Supplemental content source 120 may provide sports news ratings, website ratings, interactive application and sports games ratings, as well as ratings information for any other type of content accessible by user equipment 102. The ratings information may be derived, at least in part, from government agencies and public or private ratings bureaus (e.g., the TV Parental Guidelines Monitoring Board, the Federal Communications Commission (FCC), the Motion Picture Association of America (MPAA), and the Entertainment Software Ratings Board (ESRB)).

Database 122 may also store network viewing statistics and editor picks of sporting events. By accessing network viewing statistics, user equipment 102 may determine which sporting events are currently being watched by a large number of viewers. This may be used as an indication of the popularity of the sporting event. The sports watcher application may then advertise these games to the user, as discussed in more detail with regard to FIG. 5 below.

Database 122 may also store the interactive sports watcher application itself. Upon receiving a request from user equipment 102, supplemental content source 120 may transmit the interactive sports watcher application directly to user equipment 102 via communications path 152 (or supplemental content source 120 may transmit the interactive content control application to content source 130 for transmission to user equipment 120, if desired). In one embodiment, the interactive sports watcher application is a self-executing OpenCable Applications Platform ("OCAP") application downloaded by middleware to user equipment 102. User equipment 102 (or a proxy acting on behalf of the user equipment) may periodically query supplemental content source 120 for application updates, or supplemental content source 120 may push application updates to user equipment 102 automatically as updates become available. Database 122 may also store data generated by the interactive sports watcher application. By providing centralized storage of such data, it may allow a user to access these features from multiple locations. It may also allow for collation of the data from multiple users. Data stored in database 122 may include user preferences, setup options, active and recent wagers, wager bank balances, wagering leader boards, sports reminders, sports recordings, sports parental controls, user-defined sports searches, fantasy sports teams and standings, or any other suitable data.

Content source 130 and supplemental content source 120 may be configured to transmit signals to user equipment 102 over any suitable communications paths 150 and 152 including, for example, a satellite path, a fiber-optic path, a cable path, or any other suitable wired or wireless path. The signals may be transmitted as a broadcast, multicast, unicast, or any other suitable transmission stream. Content source 130 may also include control circuitry 132 for performing operations on the signals transmitted by content source 130, such as, for example, generating new signals or communicating with user equipment 102 to provide on-demand functionality.

User equipment 102 may receive interactive application data from one or more instances of data sources 140, content source 130, and supplemental content source 120. Data sources 140 may provide data for a particular type of content or for a particular application running on user equipment 102. For example, one data source 142 may provide data for an interactive media guidance application and another data source may provide data for interactive sports watcher application 106. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130, supplemental content source 120, and data sources 140 are shown in FIG. 1 as separate elements. In practice, their functionality may be combined into a single mechanism and provided from a single system at a single facility, or their functionality may be provided by multiple systems at multiple facilities. For example, supplemental content source 120, content source 130, and data sources 140 may be combined to provide broadcast television content and associated broadcast television data, including ratings information, sports-related information, or other suitable information to user equipment 102.

User equipment 102 may include any equipment suitable for presenting media content to a user. For example, user equipment 102 may include computer equipment, such as a personal computer with a television card (PCTV) and/or Open Cable Unidirectional Receiver (OCUR). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive experience. For example, user equipment 102 may include a DCT 2000, 2500, 5100, 6208 or 6412 set-top box provided by Motorola, Inc.

In the example of FIG. 1, user equipment 102 includes control circuitry 110, display device 104, interactive sports watcher application 106, recording device 112, and user input device 108, all of which may be implemented as separate devices or as a single, integrated device. In addition to interactive sports watcher application 106, other interactive applications, such as an interactive media guidance application, may be implemented on user equipment 102. In some embodiments, these interactive applications may, for example, direct a tuner in control circuitry 110 to display, on display device 104, the content transmitted by content source 130 or supplemental content source 120 over communications paths 150 and 152 and to provide interactive application features.

Display device 104 may be any suitable device capable of presenting human-perceivable media, such as, for example, a television monitor, computer monitor, LCD display, video projection device, holographic projector, or virtual reality simulator. Display device 104 may also be configured to provide audio and other sensory output.

Control circuitry 110 is adapted to receive user input from input device 108, execute the instructions of interactive sports watcher application 106, execute the instructions of any other interactive applications, and direct display device 104 to display media content and interactive application display screens and overlays. Control circuitry 110 may include one or more tuners (e.g., analog or digital tuners), encoders and decoders (e.g., MPEG encoders and decoders), processors (e.g., MIPs and/or Motorola 68000 family processors), memory (e.g., RAM, ROM, flash memory, and hard disks), communications circuitry (e.g., cable modem and ATSC 256QAM receiver circuitry), input/output circuitry (e.g., graphics circuitry), connections to the various devices of user equipment 102 (e.g., recording device 112), and any other suitable components for providing analog or digital television programming and supplemental sports-related information. In one embodiment, control circuitry 110 may be included as part of one of the devices of user equipment 102 such as, for example, part of display 104 or any other device (e.g., a set-top box, television, and/or video player).

Control circuitry 110 may be connected to recording device 112 for storing data from data sources 140, content source 130, or supplemental content source 120. For example, recording device 112 may include one or more digital video recorders (DVRs), hard disks, or any other storage mechanism. Control circuitry 110 may also be configured to execute the instructions of interactive sports watcher application 106 from memory, which may include any type of storage or memory mechanism (e.g., RAM, ROM, hybrid types of memory, hard disks, and/or optical drives).

Although, in the illustrated embodiment of FIG. 1, interactive sports watcher application 106 is internal to user equipment 102, interactive sports watcher application 106 may be implemented externally or partially implemented externally to user equipment 102. For example, interactive sports watcher application 106 may be implemented at supplemental content source 120 or content source 130 and may run using a client-server or distributed architecture where some of the application is implemented locally on user equipment 102 in the form of a client process and some of the application is implemented at a remote location in the form of a server process. Sports watcher application 106 may also be implemented on any suitable server, computer equipment, or set-top box accessible by user equipment 102. In some embodiments, interactive sports watcher application 106 is integrated with another interactive application or is implemented as a standalone application, subprocess, or class (e.g., in an OCAP environment). In one embodiment, interactive sports watcher application 106 is completely integrated within an interactive media guidance application running on user equipment 102. In this embodiment, the management and administrative functionality of interactive sports watcher application 106 may be invoked directly by the interactive media guidance application or the underlying operating system after some user input from input device 108.

In at least some embodiments, interactive sports watcher application 106 is implemented in software. However, an implementation of software and/or hardware may be used in other embodiments. These arrangements are merely illustrative. Other suitable techniques for implementing interactive sports watcher application 106 may be used if desired.

Interactive sports watcher application 106 may use application data from data sources 140 to determine the type of content currently being displayed on display device 104 or recorded on recording device 112. For example, media guidance application data, which may include genre information (e.g., sports, mystery, comedy) and subgenre information (e.g., football, baseball, or any other sport) about media content accessible within media system 100, may be accessed to determine what content is sports-related as well as the type of sport. Although, in some embodiments, interactive sports watcher application 106 may consult the genre data associated with media content to determine if media content is sports-related, in other embodiments other methods may be used. For example, content titles and descriptions may be searched for keywords (e.g., "baseball" or "Yankees"). Content matching the search criteria may be deemed sports-related for the purposes of interactive sports watcher application 106. Content available on specific channels (e.g., ESPN or the YES network) may also be deemed sports-related in some embodiments.

After sports-related content is displayed on user equipment 102, the user equipment may automatically enter sports watcher mode and/or execute the sports watcher application. Alternatively or additionally, the user may manually select to enter sports watcher mode. For example, the user may select a button on input device 108 to enter sports watcher mode. After entering sports watcher mode, interactive sports watcher application 106 may automatically display any of the screens shown in FIGS. 3-29 below.

Figure 2A:
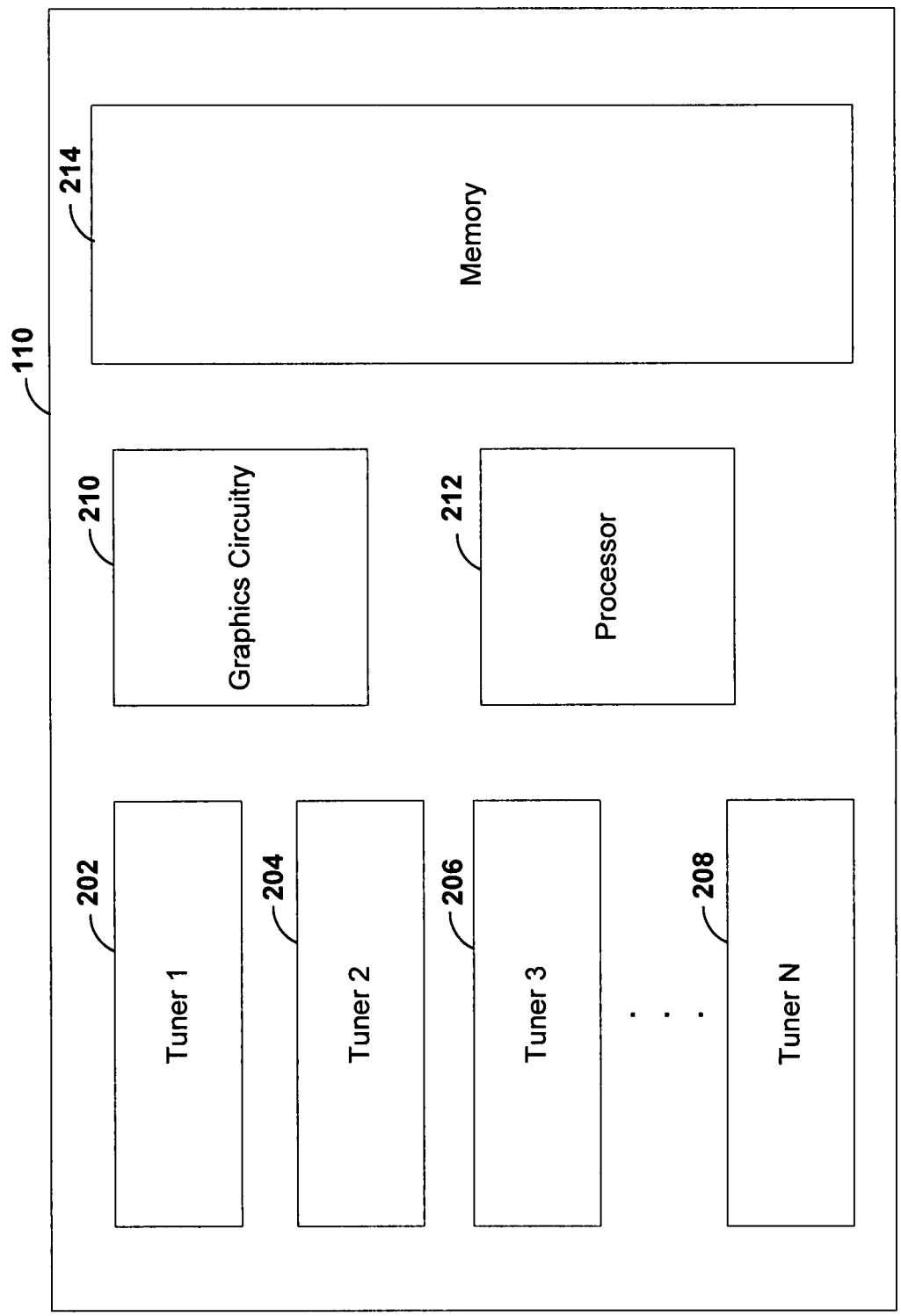
FIG. 2A is an illustrative block diagram of the control circuitry shown in FIG. 1 in accordance with one embodiment of the invention.

FIG. 2A shows illustrative control circuitry 110 in more detail. Control circuitry 110 may include one or more tuners 202, 204, 206, and 208. These tuners may be digital tuners, analog tuners, or a combination of digital and analog tuners. Control circuitry 110 may also include processor 212, which may include one or more MIPS/RISC and/or Motorola 68000 family processors. Graphics circuitry 210 may be used to decode video signals from tuners 202, 204, 206, and 208 and output the decoded video signals to one or more display devices, such as display device 104 (FIG. 1). As is currently understood in the art, the output from more than one tuner may be decoded and displayed simultaneously on a single display screen if desired. For example, picture-in-picture (PIP) or picture-on-picture (POP) modes may be implemented to allow for multiple video windows to be displayed simultaneously.

Graphics circuitry 210 may also include scaled video output circuitry to perform operations on the outputs of tuners 202, 204, 206, and 208. For example, PIP windows may be dynamically resized by the user in real-time. In addition, graphics circuitry 210 may support the conversion from one output format or resolution to another output format or resolution. For example, a high-definition (HD) video output may be converted to a standard-definition (SD) output and vice versa. A variety of highly compressed video codecs, such as an H.264/MPEG-4 AVC codec, may also be used by graphics circuitry 210 to decode/encode additional formats.

Control circuitry 110 may be configured to automatically buffer media content tuned by one or more of tuners 202, 204, 206, and 208. This content may be buffered in memory 214, which may include RAM, ROM, hard disks, and hybrid types of memory. Each tuner may be associated with its own buffer in memory 214. For example, the output of tuner 202 may be buffered in a first buffer file and stored in memory 214. Similarly, the outputs of tuners 204, 206, and 208 may also be buffered in one or more separate buffer files in memory 214. The buffer files may include real-time buffers corresponding to a sliding window of time for each tuner output. For example, in some embodiments, a 30-minute buffer window may be used. In other embodiments, a maximum buffer size is used in addition to, or in lieu of, a buffer time window. The characteristics of the buffer (e.g., buffer size, buffer window, and/or buffer resolution) may be dependent on the type of media content being buffered as well as user preferences. For example, certain sports may be given larger (or longer) buffers than the buffers for other sports. In addition, tuner outputs may be transcoded and buffered in a format other than the format transmitted to the user equipment device. For example, graphics circuitry 210 may be configured to buffer high-definition content in standard definition, depending on the type of sporting event and user preferences. This may save space in memory 214 for the buffers of other tuners.

For example, a user's profile may determine which sports are buffered in high-definition, which sports are buffered in standard-definition, and which sports are buffered in H.264 format. The user's profile may also indicate the preferred length or size of the buffers. For example, a user may select to give football sporting events a 45-minute buffer window, while basketball events are buffered for only a 30-minute window.

As described above, an interactive media guidance application may include a sports watcher mode, or the sports watcher application may be a separate module or application (both approaches are collectively referred to herein as "sports watcher mode"). A user may enter the sports watcher mode to actively watch one or more sporting events. The sports watcher mode may be optimized for the multi-tuner user equipment devices, such as a dual-tuner DVR, and for widescreen or normal aspect ratio television. For example, in some embodiments, there may be always N active sporting events or games, where N is the number of tuners in the user equipment. One tuner may be designated as the primary game tuner (i.e., "primary tuner"). This tuner may not change or tune away while the primary game is in progress. The primary game may be selected based on preferences of the user, and the user may change these preferences at any time. The other N−1 tuners may be tuned to user-selected secondary sporting events or games, but these tuners can also be used to view other events, games, and programming. Any of the N tuners can be in view, or more than one tuner can be in view with PIP/POP or split screen mode. Smart channel changing, or flipping, may be enabled whereby if a user-selected channel can be brought up with a tuner swap, no actual tune will take place. In this way, the primary sporting event or game may be always tuned, allowing for advanced navigation functionality, such as fast-forward, rewind, and slow motion replay, using the real-time buffers described above.

FIG. 2B shows illustrative tuner data tables 220 and 230 in accordance with one embodiment of the invention. In some embodiments, only one sporting event is designated as the primary sporting event at any given time. One or more sporting events other than the primary sporting event may be designated as secondary sporting events. The user may change or swap primary and/or secondary sporting events at any time. In other embodiments, however, each tuner within the user equipment is assigned a primary sporting event. Each tuner may remain tuned to the tuner's primary sporting event whenever possible. If the user requests media content that requires tuning away from a primary sporting event, the tuner currently tuned to the sporting event with the lowest user profile score (or other priority designation) may be tuned to the requested media content, and the newly tuned content may then be displayed to the user. The other tuners may remain tuned on their respective primary games.

In the example of FIG. 2B, tables 220 and 230 may be stored in memory 214 of control circuitry 110 (FIG. 2A). Table 220 may associate each tuner in tuner column 222 (e.g., all four tuners in the user equipment device) with a primary sporting event or other sports-related content. The source identifier (e.g., channel identifier) of the primary sporting event for the tuner may be included in primary source identifier column 224. Table 230 may associate each sporting event available in the media system with a user profile score. For example, source identifier column 232 may include the source identifiers of all the sports-related media content currently being broadcast (or otherwise available within the media system, for example, via a VOD service). The type of content (e.g., sports-themed movie, game, sports news, or sports commentary) may be listed in type column 234. Finally, profile score column 236 may include the user profile score for the sports-related media content. For example, the user may define a number of sports viewing preferences or criteria, such as the user's favorite sport or sports, favorite sports team or teams, favorite player or players, favorite venue or venues, favorite league or leagues, or any other suitable criteria, in the user's profile. In some embodiments, the user may setup the user's viewing preferences from a sports watcher options screen, such as display screen 2900 of FIG. 29, which is described in more detail below. The user may optionally assign a weight to each criterion as well as a rank for each entry within the criterion. For example, the user may designate the NY Yankees as the user's first favorite baseball team and the NY Mets as the user's second favorite baseball team, and so on.

Using the weights assigned to each criterion and the rank assigned to each entry within each criterion, a user profile score may be calculated by the sports watcher application and assigned to each sporting event or sports-related content accessible by the user equipment. The user profile score may be computed in accordance with:

$$\text{score} = \sum_{i=1}^{N} w_i r_i \quad \text{(EQ 1)}$$

where N is the total number of criteria defined in the user's profile (and applicable to the media content), w is the weight assigned to the criterion, and r is the rank within the criterion. The profile score may also be scaled, if desired, so that, for example, all the scores have a maximum value of 100 (or any other convenient number). In general, the higher the user profile score, the more user profile matches the media content has and the more interested the user will be in the media content. In addition to using the user profiles scores in column 236 to determine a priority order for sports-related content, the sports watcher application may also use the user profile scores to automatically designate primary and/or secondary games. For example, as shown in table 220, the media content with the greatest user profile score (i.e., "sourceid_2" in the example of FIG. 2B) may be assigned as the primary event for tuner 1, the media content with the next greatest user profile score (i.e., "sourceid_1" in the example of FIG. 2B) may be assigned as the primary event for tuner 2, and so on. In this way, tuners may be assigned a priority ranking. This ranking may determine the order in which tuners are tuned away from their respective primary game, as described in more detail below in regard to FIG. 31B.

Sports watcher mode may also include dual picture capability. The user may select letterbox or standard aspect ratio, and may additionally select a single video, PIP (with location complementary to an interactive scoreboard, described below in more detail with regard to FIG. 3), side by side view, or multiple video windows, in which case any of the N tuners may be active. Audio may be played from the active window, and channel flipping may be relative to the active window. Video controls (e.g., pause, rewind, slow motion replay) may also be relative to the active window.

Figure 29:
FIG. 29 shows an illustrative sports watcher preferences display screen in accordance with one embodiment of the invention.

Enhanced video controls may also be provided in some embodiments. The enhanced controls may include all standard video controls (e.g., pause, multi-speed rewind/fast-forward, multi-speed slow forward/reverse, frame advance/reverse, and live play). Sports-oriented additions may also be included, such as a user-configurable or sport-specific instant replay time. For example, replay requests for football games may automatically replay the last 15 seconds of play, while replay requests for basketball games may automatically replay only the last 10 seconds of play. Replays may be automatically displayed in various user-selected or system-selected slow motion or accelerated speeds, if desired. For example, football may be replayed at ¾ normal speed while basketball may be replayed at ½ normal speed, depending on user preferences. A user may set replay times and speeds for specific sports in a sports watcher options display screen, such as display screen 2900 (FIG. 29).

Sports-oriented video controls may also include a turbo replay function. Turbo replay allows a user to hold a button (e.g., a "replay" button) on an input device, such as input device 108 (FIG. 1), to skip back continuously by a user-configurable amount of time (for example, 0.5 seconds). The user may then release the button to replay the portion of play from the desired location. The user may also select to automatically repeat or loop the selected replay portion at normal, slow, or increased speeds while the replay button is pressed. To allow for greater flexibility, a user may also use a mark/nudge/loop function whereby a user may mark a spot in a video using the replay/slow/pause buttons on an input device, such as input device 108 (FIG. 1), and then nudge the marked location using the arrow or cursor buttons. A nudge timeline may be displayed for use with the mark/nudge/loop function in some embodiments. By nudging the marked location, the user may set the start and end positions of the replay window relative to the marked location. The user may then replay the replay window repeatedly at regular, slow, or increased speeds.

Figure 3:
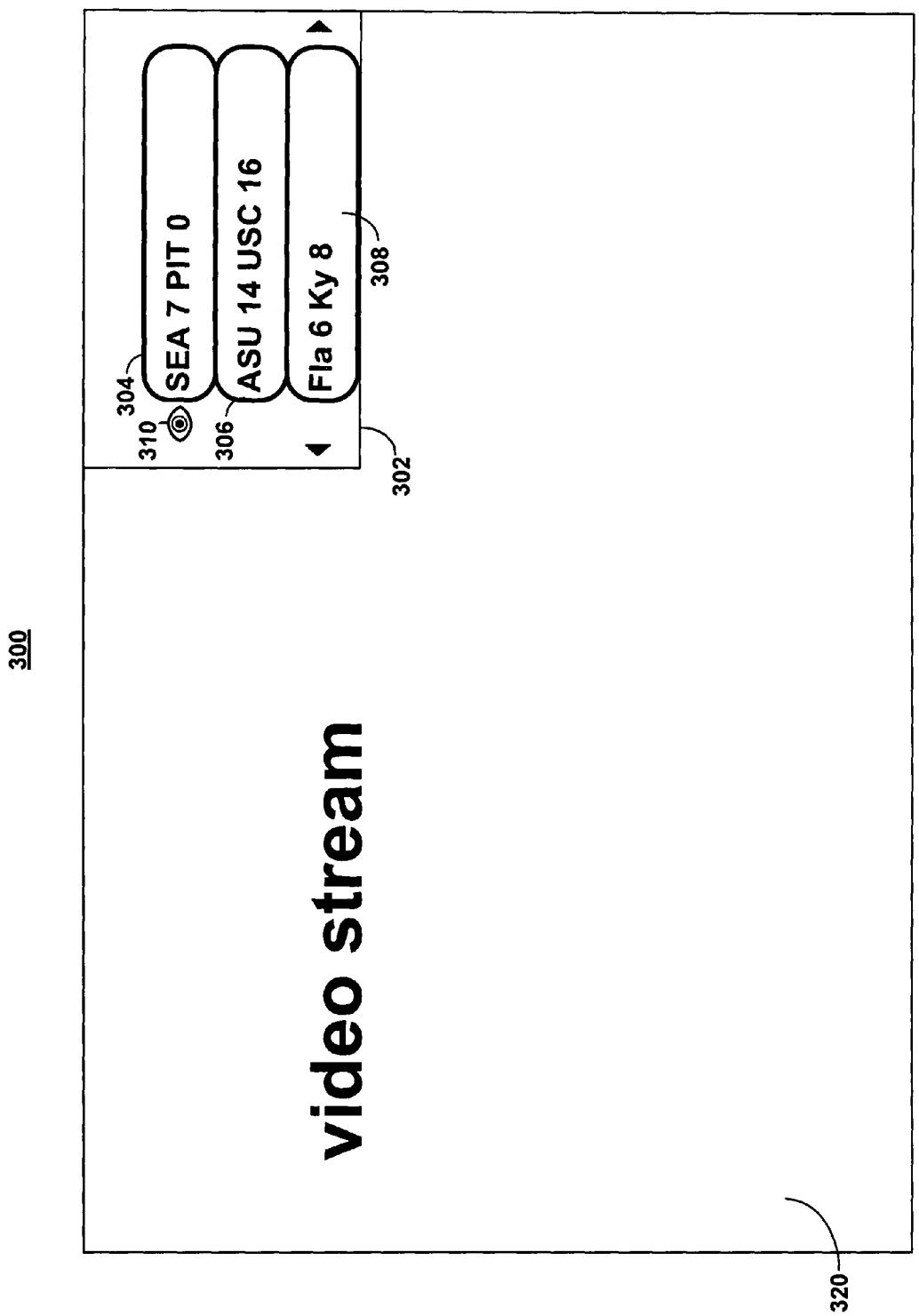
FIG. 3 is an illustrative display screen with an interactive scoreboard in accordance with one embodiment of the invention.

In some embodiments, the sports watcher mode may include an interactive scoreboard feature. Display screen 300 of FIG. 3 shows interactive scoreboard 302 in accordance with one embodiment of the invention. Interactive scoreboard 302 is a sports scoreboard that is available in sports watcher mode. It may be displayed and dismissed with a single keystroke or button press on an input device, such as input device 108 (FIG. 1). Interactive scoreboard 302 may include a number of passive and interactive features. For example, interactive scoreboard 302 may be automatically displayed when sports watcher mode is entered or it may be automatically displayed when the user requests or accesses sports-related programming (e.g., a sporting event). Although interactive scoreboard 302 may be displayed and dismissed with a single keystroke, in some embodiments it may not time out and may persist until manually dismissed by the user. Interactive scoreboard 302 may include a list of currently tuned sporting events and games, such as scoreboard entries 304 and 306. Icon 310 may indicate that the game associated with the score listed next to icon 310 is viewable in an active or main window (e.g., in the foreground area of main window 320). Icon 310 may also indicate that the game associate with the score listed next to icon 310 is viewable somewhere on the current display screen (e.g., in a PIP or POP window). Interactive scoreboard 302 may also include scrollable list 308 of other sports scores. The scores displayed in scrollable list 308 may include scores of one or more of currently televised games, non-televised games, and games that have recently ended (e.g., games that have ended earlier in the day or within a 24-hour period). The user may press left or right arrow keys on an input device, such as input device 108 (FIG. 1), to manually scroll through additional sports scores in scrollable list 308.

Interactive scoreboard 302 may be displayed as an overlay on main window 320, which may be currently displaying sports programming. As shown in the example of FIG. 3, interactive scoreboard 302 may occupy approximately ⅙ of one corner of display screen 300. As described in more detail with regard to FIG. 28 below, interactive scoreboard 302 may also be dynamically resized and/or repositioned as desired by the user. Although interactive scoreboard 302 takes a square or rectangular shape in the example of FIG. 3, interactive scoreboard 302 may also run horizontally or vertically across the entire width or length of display screen 300 in a banner or sports ticker format in other embodiments. A highlight cursor may surround one of scoreboard entries 304 and 306 or scrollable list 308 to indicate which scoreboard element is currently selected by the user. In some embodiments, the font size and/or font color of the highlighted element may change to further indicate which scoreboard element is selected.

In some embodiments, scrollable list 308 may scroll through the scores of a plurality of different games automatically without any user input. Each score in scrollable list 308 may be flashed for a user-configurable amount of time, or the games may be displayed in a scrolling fashion, whereby the score enters scrollable list 308 from right to left or left to right and is scrolled out after a user-configurable amount of time. A user may also select a predefined subset of all the available sports scores for display in scrollable list 308. For example, the user may set preferences in the user's profile to include only scores of a certain sport, a certain league, or a certain tournament in scrollable list 308. The user may also indicate one or more custom subsets of scores for display in scrollable list 308. For example, the user may wish to see scores of his or her favorite teams, leagues, or sports. This information may be saved to a user profile and used to select which scores are displayed in scrollable list 308. As such, scoreboard 302 may offer users a method to customize which scores are included or excluded in the display (e.g., football and baseball games, but not basketball games). In some embodiments, games may be ranked based on user preferences for multiple attributes (e.g., sport, team, venue, league, tournament, etc.). In such embodiments, inclusion on the scoreboard (and order) may be determined based on the calculated rank. Games that are currently tuned or which have been recently tuned may be included in the scoreboard even if their ranks would not otherwise cause them to be included. The data for use by scoreboard 302 (e.g., the scores and any related game summary information) may be accessed from one or more real-time data feeds received from any suitable content or data source (e.g., content source 130, supplemental content source 120, or data sources 140 (all of FIG. 1)).

In some embodiments, scoreboard 302 may be adjusted to include more or less information about each game. In addition to real-time scores, the information displayed in scoreboard 302 may include channel names, channel numbers, team names, clock time, time remaining, performance of specific players in the game (e.g., configured in such a manner that only select players' statistics are displayed, thus becoming a fantasy team tracking feature), other current status and game summary information from real-time data feeds, sports news information that is not related to any specific game, or any other suitable information. Depending on the size and location of scoreboard 302, this additional information may be displayed within each scoreboard entry (e.g., next to the appropriate score), above or below the scores, or at any other suitable location within scoreboard 302. This information may also be displayed in a separate window from scoreboard 302, if desired. In some embodiments, when a user highlights or selects a score in scoreboard 302 that is associated with a game that is currently tuned, the interactive media guidance application may automatically swap the display to that tuner. If the user highlights or selects a score associated with a game that is available but not currently tuned, the interactive media guidance application may tune that game on an available tuner. The tuner used to tune the selected game may be the tuner with the lowest priority so that the user's primary game or games remain tuned whenever possible.

Figure 4:
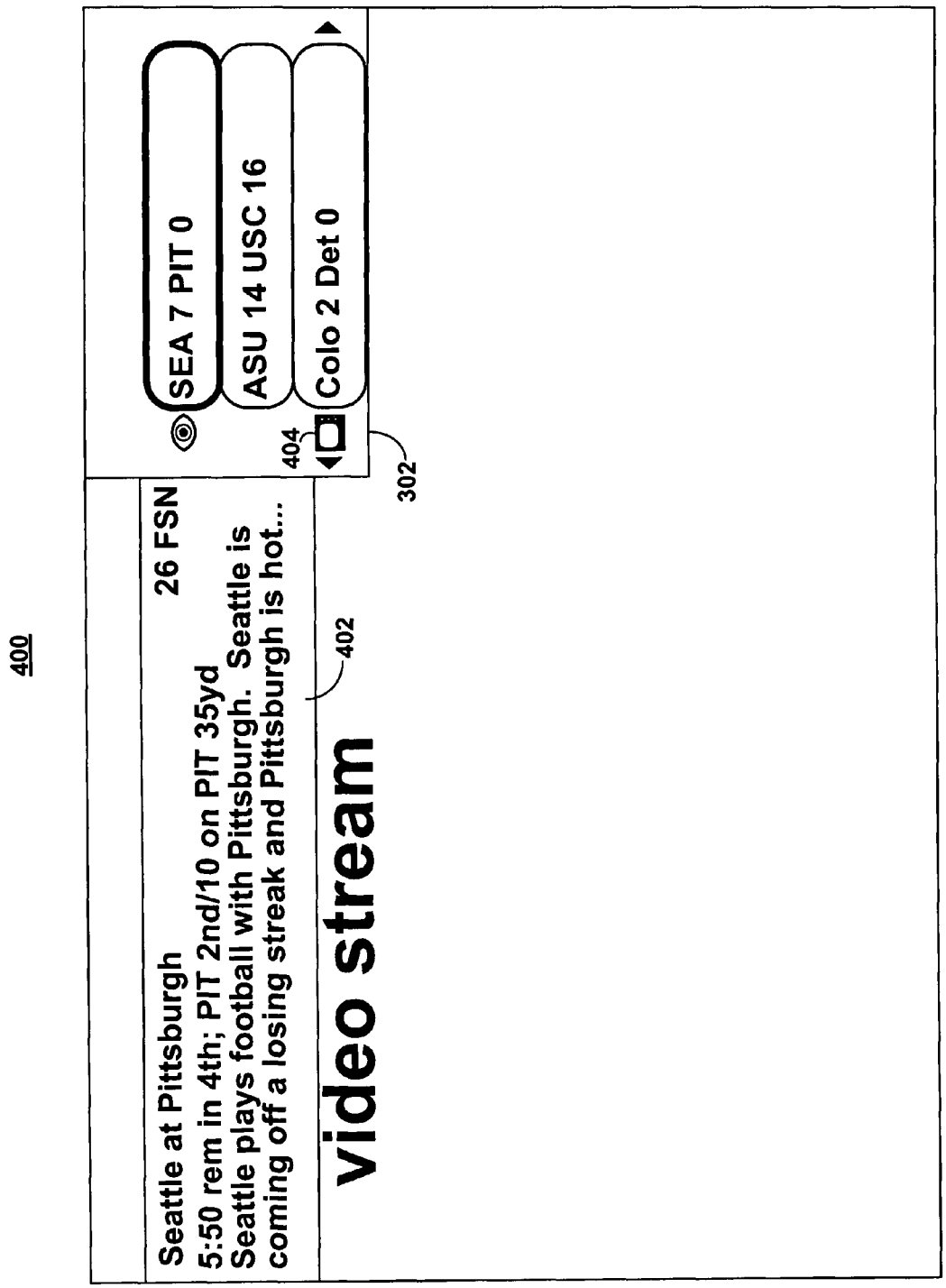
FIG. 4 is an illustrative display screen with an interactive scoreboard and flip panel in accordance with one embodiment of the invention.

As shown in display screen 400 of FIG. 4, the user may highlight a score in scoreboard 302 and press an "Info" button on an input device, such as input device 108 (FIG. 1), to view a game information screen or banner for the game associated with the selected score. In the example of FIG. 4, banner 402 displays more detailed game information, including time remaining, quarter, down, yards remaining to first down, field location, and summary information for the Seattle at Pittsburgh football game highlighted in scoreboard 302. Banner 402 may also display the channel number and call letters that the game is currently being broadcast on. The amount and type of information displayed in flip banner 402 may be customized via a user preferences screen, such as sports watcher options display screen 2900 (FIG. 29), which is described in more detail below.

Scoreboard 302 may also include television icon 404 next to one or more of the scores listed in scoreboard 302. Television icon 404 may indicate that the game associated with the score is currently available on at least one television channel accessible by the user equipment device. Similar to icon 310 (FIG. 3), television icon 404 (FIG. 4) provides more information to the user in a convenient, highly-visible way. If the user wishes to tune a different game on a foreground or background tuner, the user may select any score in scoreboard 302 that shows television icon 404 (FIG. 4) to automatically tune the game associated with the selected score. Icon 310 may then be displayed adjacent to the selected score, indicating that this game is now tuned in the active window. In some embodiments, a tuned icon (not shown) may be used to indicate that the game is tuned by a tuner other then the tuner being shown in the active window. More than one instance of tuned icon may appear in scoreboard 302 if the user equipment device includes more than one tuner. In some embodiments, the order in which games are shown on the scoreboard may reflect the priority of the games. For example, the top game on the scoreboard may be for the primary game, and the second game on the scoreboard may be for the secondary game with the highest priority. Games that are not currently tuned may be included in scrollable list 308.

For traditional analog television systems, tuned content may include content acquired or locked from a particular channel carrier frequency. For digital television systems, tuned content may include content demodulated from a digital carrier frequency, content FEC decoded from the demodulated transport stream (TS), content demultiplexed from the transport stream, and/or content extracted from a particular packet identifier (PID) stream. This digital content may be received by the user equipment device over a number of switched digital television channels. For IPTV, tuned content may include content to be delivered on a particular network address (e.g., multicast address) on which an IP socket is currently joined.

As mentioned above, one feature of the sports watcher application is more efficient sports tuning, especially in dual-tuner or multi-tuner systems. In the example of FIG. 4, scoreboard 302 lists the Seattle at Pittsburgh score in position 1 (e.g., the top row) of scoreboard 302 and the ASU at USC football game in position 2 (e.g., the second row) of scoreboard 302. The game associated with the score in position 1 of scoreboard 302 may be designated as the user's primary game. The game associated with the score in position 2 of scoreboard 302 may be designated as the user's secondary game (for example, in user equipment with two tuners). A user may set or switch the primary game at any time. The sports watcher application may keep the sporting event designated as the primary game tuned whenever possible. For example, if a user requests media content (e.g., by changing channels), the tuner tuned to the primary sporting event may persist on the primary sporting event while another available tuner tunes to the requested media content. In this way, channel changing or flipping may be generally performed on a secondary tuner (i.e., a tuner other than the tuner that is currently tuned to the primary sporting event), so that the primary tuner can remain tuned on the primary sporting event. Flipping to the primary sporting event may perform a tuner output swap (i.e., display the output from the tuner already tuned to the primary sporting event) rather than a new tune. Flipping from the primary sporting event may perform a tuner output swap first, and then a tune, if required.

In some embodiments, a sport pilot feature may allow the sports watcher application to automatically designate particular sporting events as primary and/or secondary sporting events. In this way, the most pertinent game or games that are active at the moment may be automatically tuned without the user requesting that the game or games be tuned. For example, network access or network usage statistics may be received by the user equipment device from a network usage monitoring service. The network statistics may be used to determine which games are popular within the entire network or some subset of the entire network (e.g., the local geographic region in which the user equipment device is currently located). In some embodiments, the geographic location of the user equipment device may be derived from the user equipment device's network address (e.g., IP address) or a multicast address of a local cable headend that the user equipment device is subscribed to. The user equipment device may use the received network statistics along with user profile or preference information to automatically designate one or more sporting events as primary and/or secondary events. Some weighted function (e.g., taking into account both network activity and user preferences) may be used to determine which events qualify as primary and/or secondary events. The weighted function may be similar to EQ 1, described above, which may be used to calculate user profile scores for sports content. Network access or usage statistics may represent one criterion in EQ 1.

In addition to, or in lieu of, receiving network statistics, system selections of primary and/or secondary sporting events may be automatically received by the user equipment device in some embodiments. The system selections may include events with high network access requests in a local geographic region or throughout the entire media system or network. Primary sporting events may also be selected by one or more sports editors. For example, an artificial intelligent agent, live agent, or other editor (e.g., at the headend or the production facility) may monitor all sporting events currently in progress and designate popular games, high action games, high excitement games, or games that might be of interest to the user as primary sporting events. An indication of the designated primary sporting events may then be provided to user equipment 102 (FIG. 1) in the form of a primary sporting event flag. For example, a game that has a tie score with two minutes left or a game where a high number of points are being scored could be flagged as more interesting than a shut-out or a low scoring game. User equipment 102 (FIG. 1) may automatically designate a sporting event, based on the editor-selected events and user viewing preferences, as the primary sporting event (and optionally automatically tune a foreground or background tuner to the event).

In some embodiments, historical information related to a match-up is also made available. For example, in a text-oriented addition, scores, statistics, player differences, etc., can be provided of prior match-ups between the two teams featured in the game or games currently being displayed on the user equipment device. This match-up information may then be displayed in the display screen simultaneously with the sporting event. As another example, the prior match-ups between these teams or highlights of those match-ups can be provided via a VOD service for the game or games currently being displayed on the user equipment device. This prior match-up information may be accessible from the game information screen (e.g., display screen 600 of FIG. 6), if desired.

Primary sporting events may also be automatically selected by the sports watcher application itself. For example, the sports watcher application may monitor one or more real-time data feeds and designate games, for example, that are on the verge of scoring opportunities, almost over, or have players approaching statistical milestones (e.g., 400 yard passer or 1,000 yard rusher), as primary games. In some embodiments, a primary game flag may be included in media guidance application data associated with sporting events and other sports-related media content that are designated as primary sporting events. This allows for virtually any criterion or combination of criteria (user-selected, editor-selected, or application-selected) to be used to select and designate primary games. The sports watcher application may parse the media guidance application data for primary game flags and compile a list of games that are primary game candidates. From the candidate list, the sports watcher application may select and designate one or more primary games based on user preferences or profile information. In some embodiments, after entering sports watcher mode, the primary games may be automatically tuned by one or more tuners in the user equipment device. The scores of these games may also be displayed in an interactive scoreboard, such as scoreboard 302. For example, if the user equipment device includes three tuners, three games may be selected and tuned automatically after sports mode is entered.

The sports watcher application may also support intelligent channel changing, or flipping. Channel changing may change the video in the active window. The active window may be the main window, PIP window, POP window, or either side window. In some embodiments, the active window is surrounded by a cell or region highlight to visually distinguish the active window from other windows in display screen 400. The channel up/down buttons on an input device, such as input device 108 (FIG. 1), may change channels relative to the channel of the active window. As described above, channel changing may swap tuners (if the requested content is already tuned) or tune one of the secondary tuners.

In some embodiments, an all-sports channel flipping function may be defined, whereby flipping is constrained to channels currently showing sporting events or sports-related programming. Other channels may be automatically skipped in the flipping sequence. The sports watcher application may maintain a list or table of channels currently showing sports programs in memory. This list or table may be derived from media guidance application data transmitted to the user equipment device. This media guidance application data may include genre (e.g., "sports") and subgenre (e.g., "football") information about all channels currently accessible by the user equipment device. The all-sports flipping function may include in the channel line-up one or more of all channels showing sporting events, all channels showing any sports-related programming (sporting events, sports commentary, sports news, sports-themed movies, etc.), or all channels showing sporting events of a particular type of sport (e.g., football). The channels included in the all-sports channel flipping function may be set using sports watcher options display screen 2900 (FIG. 29), which is described in more detail below.

Using the all-sports flipping function, the interactive media guidance application may also automatically scan through the all-sports channel lineup. Each channel in the lineup may be displayed for a predetermined or user-configurable amount of time before the next channel in the lineup is displayed. The channels may be displayed in any order, for example, by channel number (low to high or high to low), by profile score (low to high or high to low), or by priority (low to high or high to low).

A favorites flipping function may also be defined in some embodiments, whereby only channels showing media content that matches the user's favorites (as determined by the user profile or user favorites list) are tuned in the flipping sequence. Other channels may be automatically skipped. The favorites flipping function and the all-sports flipping function may also be combined in some embodiments, so that only channels showing content that matches the user's favorites and the user's all-sports flipping options are included in the channel line-up. All other channels may be automatically skipped.

In some embodiments, an interactive listing of the channels included in the all-sports and/or favorites flipping functions may be displayed on the screen in a scrollable overlay. The interactive listing may also be displayed in a PIP/POP window anywhere on the screen. A user may navigate a cursor within the interactive listing and select one or more entries in the listing. After selecting one or more entries in the listing, a media guidance application function may be automatically invoked. For example, the selected channel or channels may be automatically tuned and displayed in the main window, added to the user's favorites, scheduled for recording, added to an alert list, or a reminder may be set. The user may select to reorder the interactive listing by channel name, channel number, title, time started, or sport. In this way, the user may have access to a complete list of the channels currently showing sporting events. By reordering the interactive listing by sport, the user may view a list of all the channels currently showing a particular type of sport (e.g., baseball) in a convenient on-screen overlay without entering the main guidance application screen or tuning away from media content currently being displayed on the display screen.

In some embodiments, scoreboard 302 may be moved to different screen positions to support avoidance of different on-screen displays, overlays, and windows. For example, scoreboard 302 may be dynamically moved to another area of the screen or reduced/enlarged in size in response to another overlay, window (e.g., PIP/POP window), or prompt being displayed. Scoreboard 302 may also be made into a ticker (e.g., displayed horizontally across the bottom of the screen or displayed vertically across the side of the screen). Such a ticker may be somewhat translucently overlaid, partially blocking a portion of the video, may be opaquely overlaid, fully blocking a portion of the video, or the video portion may be squeezed in such a way that the ticker can coexist without overlap with the video, and without either the ticker or the video interfering with each other.

As previously mentioned, the scores listed in scoreboard 302 may include scores of games that are currently airing and of interest to the user. After entering sports watcher mode, a real-time data feed including sports scores of a plurality of sporting events may be received by the user equipment device. The scores selected for inclusion in scoreboard 302 may be based on user sports preferences previously stored. The user may modify the list at any time while sports watcher mode is active. The list may include several games; however, as previously described, the first two positions in scoreboard 302 may be special. For example, the first position may display the score of the primary game. This game is assigned to a primary tuner and generally the tuner may not be tuned away from the primary game. The second position in scoreboard 302 may be the secondary game. It is assigned to the second tuner, but the tuner may be tuned to another game in the list. Tuned games are automatically buffered in real-time on the user equipment device to support standard and advanced video controls, such as rewind, pause, instant replay, slow motion replay, etc.

The user may highlight any score in scoreboard 302 using an input device, such as input device 108 (FIG. 1), and immediately tune to the game associated with the selected score or perform any available media guidance function on the game associated with the selected score. If the game is already tuned on one of the tuners in the user equipment device, no tune may actually take place. Rather, the output of the tuner already tuned to the sporting event is displayed (i.e., a tuner swap) or made active. While sports watcher mode is active, flipping through channels via the "Favorites" key may be constrained to the games associated with scores in scoreboard 302. The scores displayed in scoreboard 302 may update automatically as games start and end. In some embodiments, scores may remain in scoreboard 302 for some time after the game associated with the score has ended.

In a typical usage scenario, when a user presses the "OK" key while any scoreboard entry is highlighted, if the game associated with the highlighted score is on television but not tuned, the selected game may be tuned using a secondary tuner, and the game may be brought into foreground view. If the selected game is already tuned on a background (e.g., secondary) tuner, the game may be brought to foreground view. If the user is in PIP or POP mode, the selected game may be made the active video window. A flip banner, such as flip banner 402, may be automatically displayed with detailed game information after a new sporting event is tuned, brought into foreground view, or designated an active window. The flip banner may time out after some predetermined amount of time.

Figure 5:
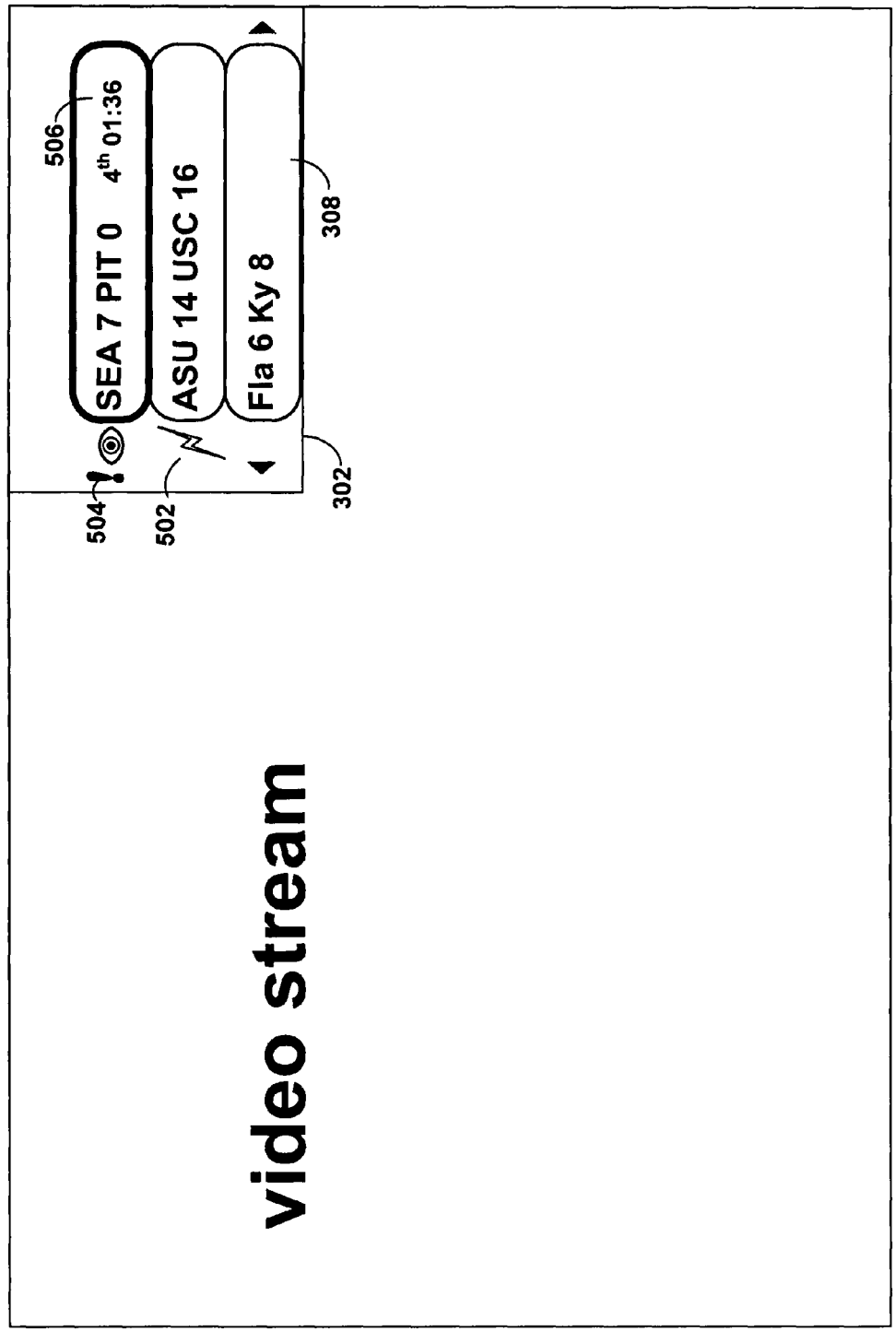
FIG. 5 is an illustrative display screen with an interactive scoreboard and informational status icons in accordance with one embodiment of the invention.

FIG. 5 shows display screen 500 with enhanced game status icons in interactive scoreboard 302. Display screen 500 may be similar to display screen 400 (FIG. 4). In the example of FIG. 5, scoreboard 302 includes game status icons 502 and 504. Game status icon 502, which in some embodiments may resemble a lightning bolt, may be positioned adjacent to any of the entries in scoreboard 302, including scrollable list 308. The sports watcher application may display icon 502 next to a score associated with a sporting event that has resumed play or is back from a commercial break. In a typical usage scenario, a user may access another sporting event after the primary event goes to commercial by selecting another score listed in scoreboard 302. Even though the game may not be currently viewable in display screen 500, the sports watcher application may monitor a real-time data feed for one or more game status flags. These status flags may indicate any suitable characteristics about the sporting events associated with scores displayed in scoreboard 302. For example, the status flags may indicate that the game has resumed play, is back from commercial, has gone to commercial, the current clock time, or any other suitable game status information. Using these status flags, the sports watcher application may display appropriate game status icons, such as icon 502 and 504 within scoreboard 302. These icons provide additional information to the user about games associated with scores displayed in scoreboard 302. Game status icons may be associated with any score in any position within scoreboard 302, including scores in scrollable list 308.

Game status icons may be displayed near other icons within the scoreboard. Each entry in scoreboard 302 may be associated with zero, one, or more icons. For example, game status icons 502 and/or 504 may be positioned near icon 310 (FIG. 3), icon 404 (FIG. 4), or any other suitable icons described herein. Multiple icons adjacent to the same entry in scoreboard 302 may indicate that all the icons are applicable to the given scoreboard entry. For example, if, in the example of FIG. 5, the Seattle at Pittsburgh game was currently displayed in the active window, tuned on a tuner within the user equipment device, and back from commercial, all three icons may be displayed next to the appropriate entry in scoreboard 302.

Action icon 504 is a special type of game status icon. Action icon 504, which may resemble an exclamation point in some embodiments, indicates that exciting action is currently taking place in the game associated with the score that action icon 504 is displayed adjacent to. For example, action icon 504 may be displayed when there is a scoring drive, rally, or any other suitable event of interest currently occurring in the game associated with the score. In the example of FIG. 5, action icon 504 is presented as a time remaining warning, indicating that less than two minutes of clock time is remaining in the fourth quarter of the football game. Time remaining indicator 506 may display the current quarter and clock time remaining. This information may be received from the same real-time data feed as the game status information, or this information may be received from another real-time data feed. As shown in display screen 500, time remaining indicator 506 may be displayed within a scoreboard entry or adjacent to a scoreboard entry.

Although FIGS. 3-5 show some of the most common icons that may be associated with scores displayed in scoreboard 302, other icons may also be defined and displayed within the scoreboard at the appropriate times. For example, as described above, when certain milestones are about to be reached by a team or a particular player on a team, a milestone icon may be displayed in the scoreboard. In general, a user may choose which icons the user would like to appear in the scoreboard using a sports watcher options display screen, such as display screen 2900 of FIG. 29.

Pressing the "Info" key on any scoreboard entry may cause a flip banner, such as flip banner 402 (FIG. 4), for that entry to be displayed if not already displayed (even if the game is not tuned). Full-screen game information may also be displayed if the flip banner is already displayed for that game, as shown in game information display screen 600 of FIG. 6. The flip banner or full-screen game information 604 may be co-located on the screen with scoreboard 302 and available for any game on scoreboard 302, including games not on television. Alternatively, scoreboard 302 may be removed from the display and the game itself may be displayed in picture-in-guide (PIG) window 602. A supplemental data source (e.g., supplemental content source 120 of FIG. 1) may be accessed to retrieve information for games not broadcast on television. The flip banner or full-screen game information 604 may also include additional live update data that is not shown on scoreboard 302. As shown in display screen 600, full-screen game information 604 may feature a scrollable description, live score and status updates, point spread, money line, and other wagering information, and other game-specific information.

Display screen 600 may also include a number of game-specific options in a game menu. The game specific options may include watch option 608. Watch option 608 may change depending on the status of the game. For example, if the game is on television but not tuned, selecting watch option 608 may tune the game using a secondary tuner and bring it to foreground view (i.e., makes the game the active window). If the game is tuned in the background, selecting watch option 608 may bring it to foreground view. If the game is in the foreground on a secondary tuner, the label of watch option 608 may change to "Make Primary Game." Selecting watch option 608 after the label has changed to "Make Primary Game" may designate the game as the user's primary game. If appropriate, the label of watch option 608 may also change to "Watch Pregame" or "Watch Postgame" if the game has ended or not yet started (and postgame or pregame content is available). Pregame and postgame video may be available from the same channel the game is to be broadcast on, or was broadcast on, or from a supplemental content source, such as supplemental content source 120 (FIG. 1). If the selected game is not on television, but the same team is playing, the label of watch option 608 may change to "Watch [team name]." In this case, after selecting watch option 608, a listing of available games (e.g., both prerecorded and live games) featuring the team or teams in the game the user requested more information about may be displayed to the user. The user may then select any game from the listing to watch the selected game.

The user may also set game reminders using reminders option 610. Reminders may be set for specific games, or any of a specific game's categories (e.g., sport, league, event, or team). Reminders on categories may result in any game with a matching category designation to automatically receive a reminder. Standard reminders may be created that will appear whether sports watcher mode, the interactive media guidance application, or any other application is active. Reminders are discussed in more detail below with regard to display screen 2200 (FIG. 22), which shows an example game reminder screen.

A recordings page may also be accessed from the game information screen, such as display screen 600. After selecting recordings option 612, one or more display screens may be presented to the user that allow for recordings to be scheduled for specific games. Recordings may also be scheduled for any of a game's categories (e.g., sport, league, event, or team). Schedule a category for recording may result in any game with same category designation to be automatically recorded (or scheduled for recording). Standard recording options may also be available that are present whether sports watcher mode, the interactive media guidance application, or any other application is active. Recordings are discussed in more detail with regard to display screens 2300 (FIG. 23) and 2400 (FIG. 24) below.

Game commentary may also be accessed from the game information screen, such as display screen 600. After selecting commentary option 614, the user may access multiple sources of additional information about the game, including recommendations, analysis and predictions, and odds and spreads. Game commentary may also feature scrollable text and may include images and links to video clips. Game commentary is discussed in more detail below with regard to display screen 2500 (FIG. 25), which shows an illustrative game commentary screen.

The sports watcher application may also provide comprehensive wagering support. A user may access a wagering interface from the game information screen by selecting wagering option 616. After selecting wagering option 616, a wagering interface, such as display screen 1500 (FIG. 15), may be displayed to the user. The wagering interface may be customized to the currently selected game. For example, after the user selects wagering option 616, a custom wagering interface for the Detroit at Colorado game may be displayed. This interface may allow the user to wager on the game, to modify a previous wager on the game, or to view a wager previously made on the game, including any results. Wagering functionality is described in more detail below with regard to FIG. 15.

To set or view user favorites, the user may select favorites option 618. Favorites may be set for specific game, or any of a game's categories (e.g., sport, league, event, or team). For example, display screen 1100 (FIG. 11) may be displayed after a user selects favorites option 618. Favorites are described in more detail below with regard to FIG. 11.

Sports-related parental control features may also be supported in some embodiments. After the user selects lock option 620, a parental control display screen, such as display screen 1400 (FIG. 14), may be displayed. From the parental control display screen, the user may create, remove, or modify parental control locks for the game, any of the game's categories (e.g., sport, league, event, tournament, or team), or the channel the game is being broadcast on. Locks may be set by sport (e.g., lock "Auto Racing"), and may be enforced during regular (i.e., non-sports) television watching even if the sports watcher application or interactive media guidance application is not currently active. Alternately, locks may be enforced only while the sports watcher application is active and running. Parental control locks are described in more detail below with regard to FIG. 14.

Information shown on the game information screen, such as display screen 600 (FIG. 6), may also include all or a part of the information from the media guidance application program database (if applicable), score and other information from the live data feed (for current or recent games), odds, point spreads, or other wagering information, advance or real-time commentary, and any other suitable information. A textual game summary may also be provided as an option. In some embodiments, a video summary may be provided via VOD or some other mechanism. This video summary may include a half-time highlights reel or key plays video, for example. The text game summary may be configured to not only display to the user on television, but to also send the summaries as an e-mail, text message, or Instant Message (IM) to a cellular telephone, PDA, or other mobile device. Audio highlights may also be generated as a result and sent as voice mails to home or mobile phone voice mailboxes. To return to the main display screen, such as display screen 500 (FIG. 5), the user may select back option 606.

Figure 7:
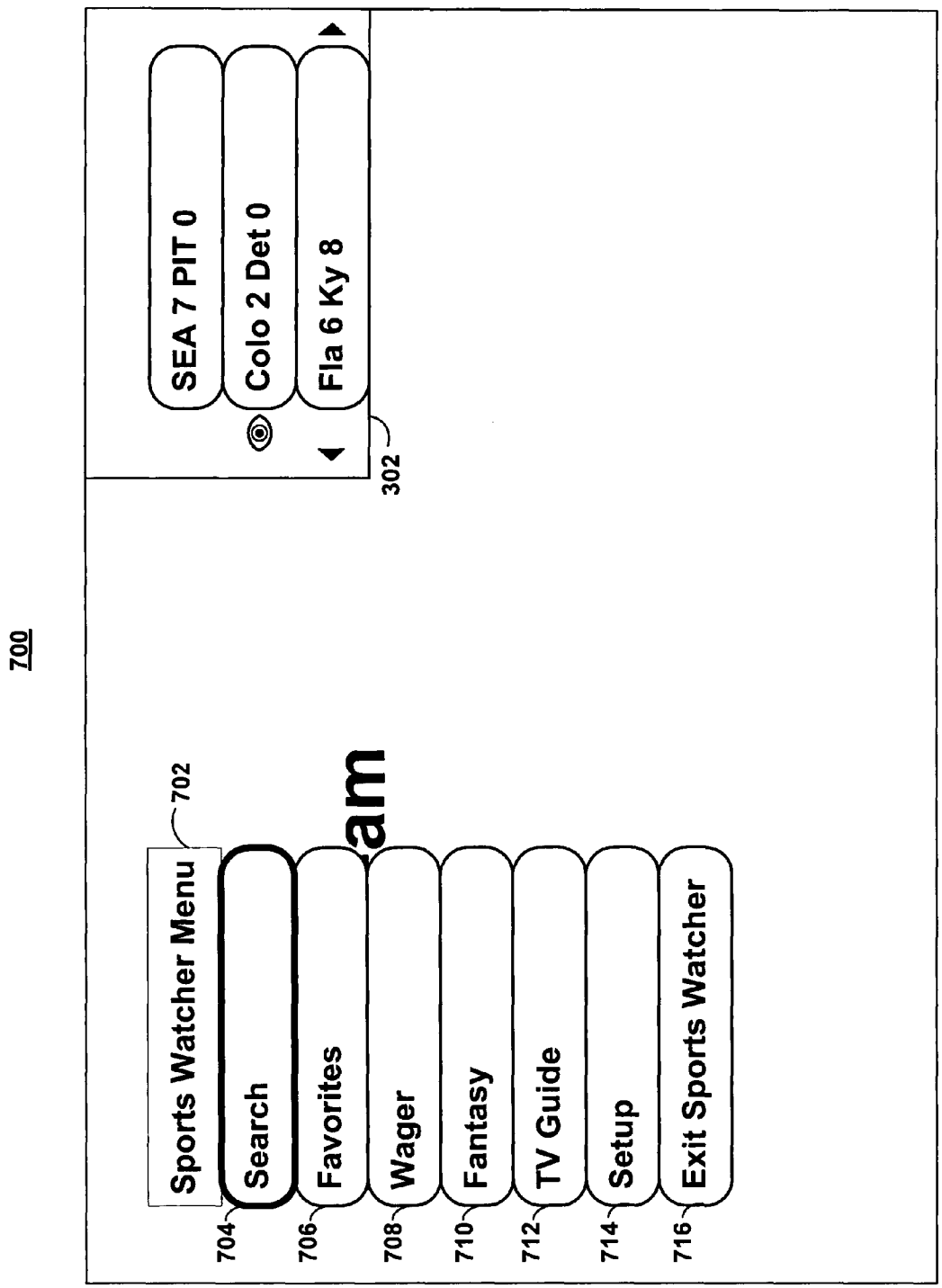
FIG. 7 is an illustrative sports watcher main menu display screen in accordance with one embodiment of the invention.

As shown in display screen 700 of FIG. 7, a user may access a sports watcher quick menu, such as Quick Menu 702, when the sports watcher application is active. In some embodiments, the user may press a "Menu" button on an input device, such as input device 108 (FIG. 1) in order to display Quick Menu 702. Quick Menu 702 may be displayed as an overlay while video content is being watched in the background. Quick Menu 702 may include a number of sports-specific functions and features. These features and functions may include the most commonly accessed features and functions of the sports watcher application.

For example, the user may select "TV Guide" option 712, which displays the interactive media guidance application main menu, allowing the viewer access to non-sports functions. The user may select Search option 704 to access a set of search screens that can be used to find sports programming. For example, after selecting search option 704, display screen 900 (FIG. 9) may be displayed to the user. The user may select favorites option 706 to set specific sports, leagues, teams, and tournaments as favorites. After selecting favorites option 706, display screen 1000 (FIG. 10) or 1100 (FIG. 11) may be displayed to the user. The user may select wagering option 708 to access a wagering interface. For example, display screen 1500 (FIG. 15) may be displayed after a user selects wagering option 708.

To access fantasy league functions, the user may select fantasy option 710. After selecting fantasy option 710, display screen 1600 (FIG. 16) or 1700 (FIG. 17) may be displayed to the user. Through these screens, a user may create or join a private or public fantasy sports league, as described in more detail with regard to FIGS. 16 and 17. The user may customize many of the sports watcher features via setup option 714. For example, after selecting setup option 714, display screen 2600 (FIG. 26) may be displayed to the user. To exit sports watcher mode or terminate the sports watcher application, the user may select exit sports watcher option 716. After selecting exit sports watcher option 716, the user may be presented with a traditional media guidance application display screen.

Figure 8:
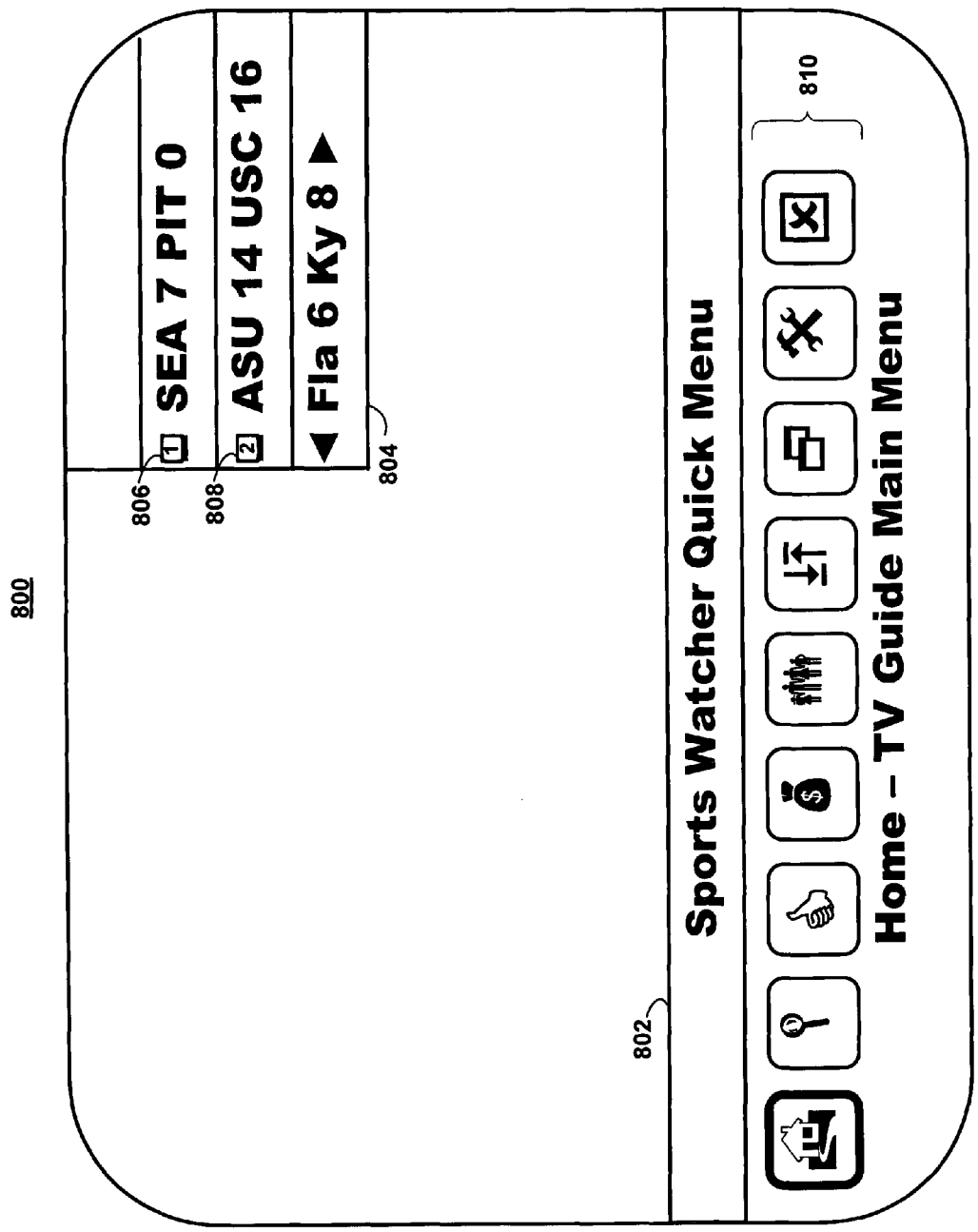
FIG. 8 is another illustrative sports watcher main menu display screen in accordance with another embodiment of the invention.

Although, in the example of FIG. 7, Quick Menu 702 is arranged vertically in display screen 700, the quick menu may be displayed in other layout arrangements in other embodiments of the invention. For example, FIG. 8 shows display screen 800 with Quick Menu 802. Quick Menu 802 is arranged horizontally in the flip bar region at the bottom of display screen 800. Option buttons 810 may include all the options shown in display screen 700 of FIG. 7. In some embodiments, Quick Menu 802 may also be an undocked overlay window that the user may reposition and/or resize using an input device, such as input device 108 (FIG. 1). For example, the user may select and drag Quick Menu 802 up from the bottom of display screen 800 to convert the menu into an undocked overlay window. The user may then move the overlay window about the screen so as to obstruct less of the video being presented in the main window.

Display screen 800 includes interactive scoreboard 804, which may include all the features of interactive scoreboard 302 (FIG. 7). For example, any of the aforementioned scoreboard icons, alerts, and related information may be displayed in or near interactive scoreboard 804. Tuner icons 806 and 808 may indicate that the games associated with these scores are currently tuned by tuners in the user equipment device. As shown in the example of FIG. 8, tuner icons 806 and 808 may be visually distinguishable from one another. For example, icon 806 may include the number 1 as part of the icon to indicate that this game is tuned on the primary tuner. Similarly, icon 808 may include the number 2 as part of the icon to indicate that this game is tuned on a secondary tuner. The user may swap the priority of the tuners (or the content tuned by the tuners) at any time. In this way, a user may reprioritize sporting events (and designate primary and/or secondary games) directly from scoreboard 804. If more than two tuners are present in the user equipment device, scoreboard 804 may be expanded accordingly, if desired, to include more rows and more tuned games with tuner icons.

Figure 6:
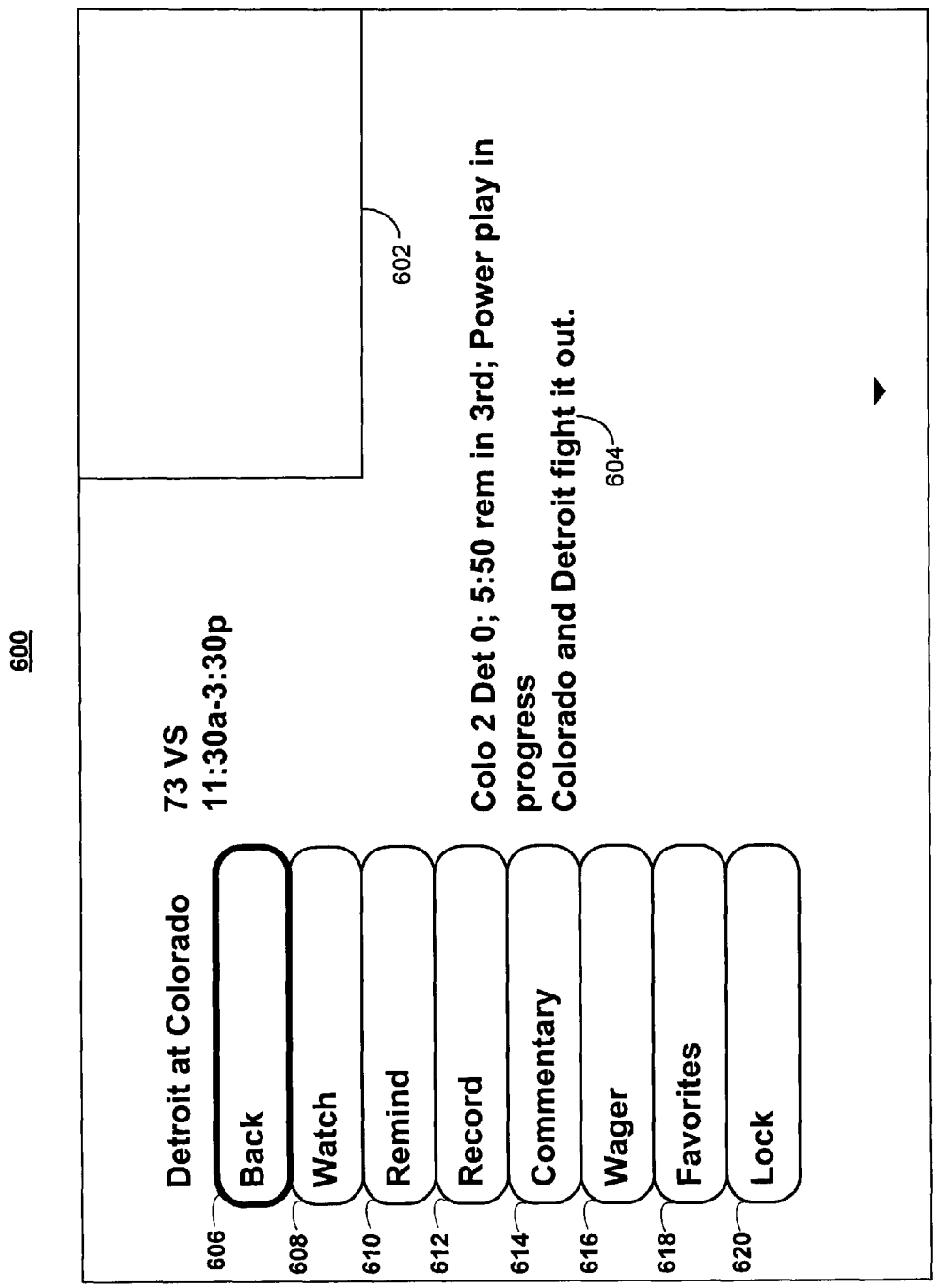
FIG. 6 is an illustrative full-screen game information display screen in accordance with one embodiment of the invention.
Figure 9:
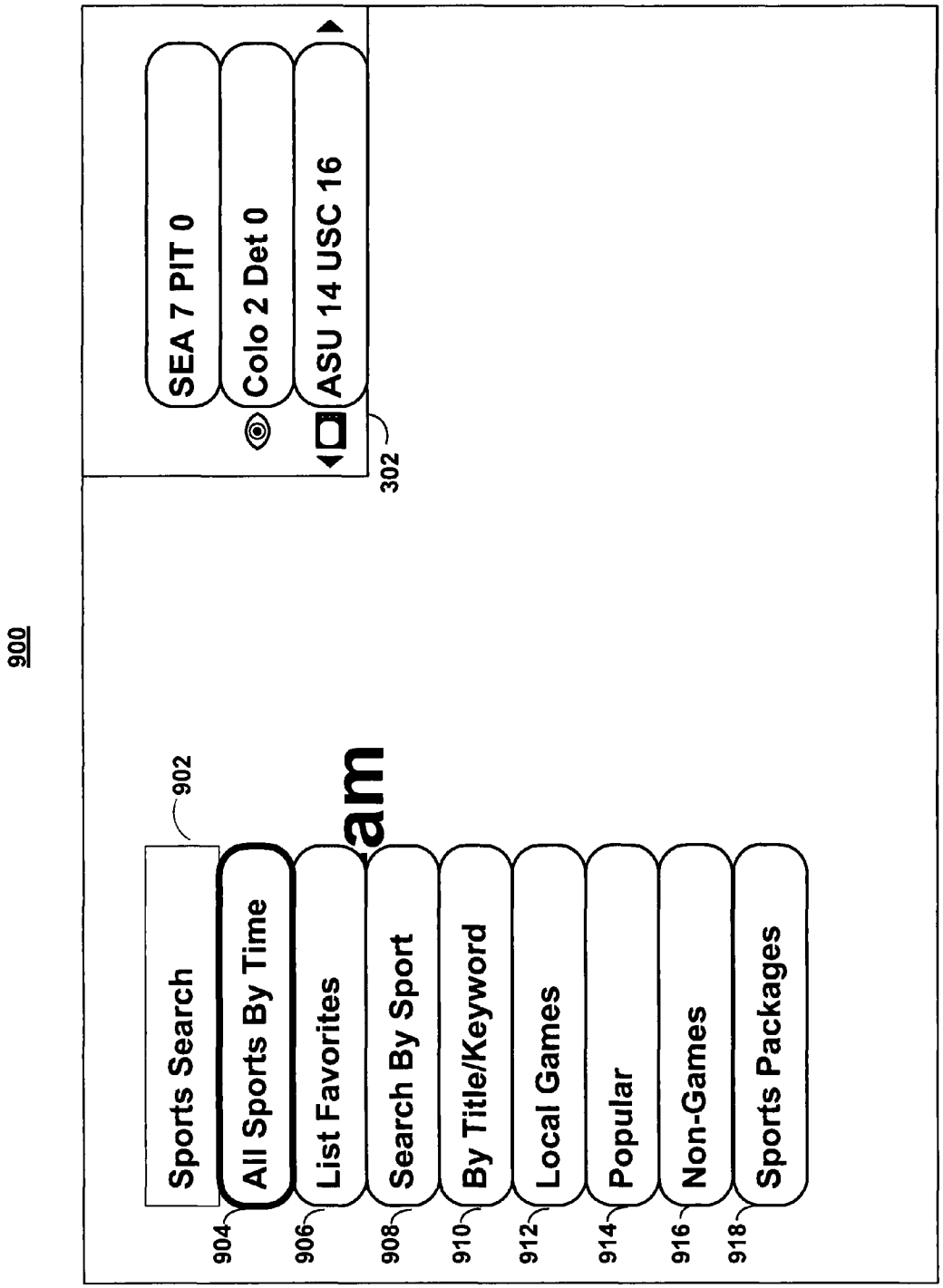
FIG. 9 is an illustrative display screen for searching for sports-related content and programming in accordance with one embodiment of the invention.

FIG. 9 shows display screen 900 used to search for sports-related media content. Media content searching may be facilitated by sports search menu 902. Search menu 902 may provide access to listings of only sporting events and sports-related programming (e.g., sports news, highlights, and commentary). The search and listing screens may be designed to be identical or very close to the traditional interactive media guidance application search screens. A user may select any game from a search results listing to view detailed game information in a game information display screen, such as display screen 600 (FIG. 6). The user may also perform any media guidance function on a game listed in a search results display screen.

Illustrative search options may include all sports option 904. This option may search for all sports-related programming on any channel at any time, sorted by time. Favorites option 906 may only search games in the user's favorites list or games with positive ratings (as described in more detail below), sorted by ranking. Search by sport option 908 may allow the user to drill down by category and see a listing of games and other sports-related programming by category (e.g., sport, team, or league). Search by title/keyword option 910 may allow the user to enter a text string and see all games with matching media guidance application data (e.g., title, description, summary, or genre information). Local games option 912 allows the user to access a list of all games including at least one team from a local market (professional, college, high school, etc.). An option may be provided to select alternate locations, if desired. By selecting popular option 914, a list of the most popular games or game recommendations may be presented to the user. The recommendations may be selected by an expert or editor. Non-games option 916 allows the user to search all sports-related content other than games (e.g., highlights, commentary, news updates, interviews, and sport-themed movies). Finally, sports packages option 918 allows the user to search sports packages offered by the cable operator. After selecting sports packages option 918, all packages may be listed, or only those including games matching the user's preferences may be listed. A user may view a list of currently scheduled games in a package, purchase the package, automatically set all package contents as favorites, and/or automatically set an automatic reminder for all package contents.

Figure 10:
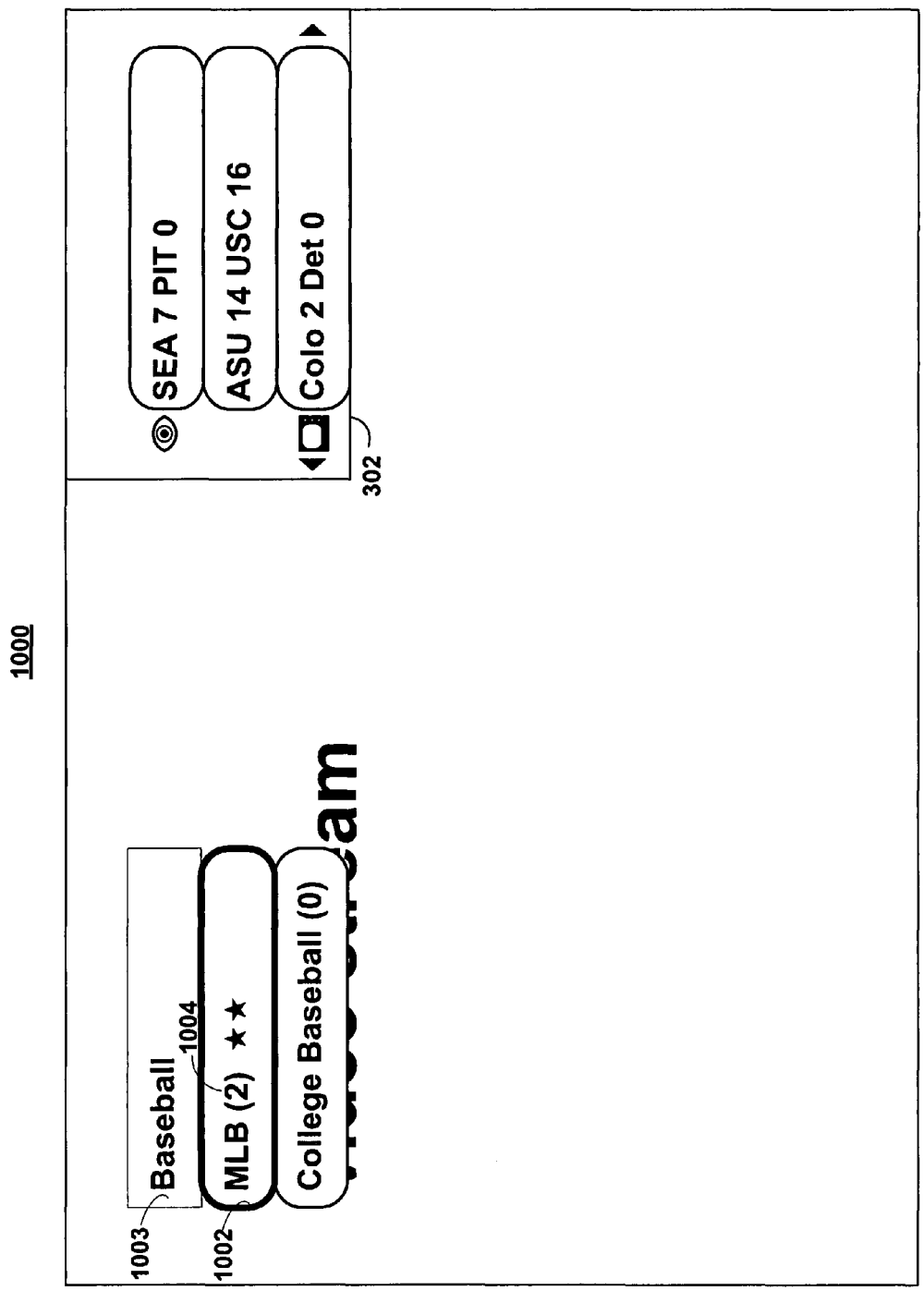

FIG. 10 shows display screen 1000 with a user's favorites search results. In the example of FIG. 10, the user performed a search of category 1003 within the user's favorites. The category matches are listed in display screen 1000 with the relevant number of matches in each category. In this way, the user may focus the search by selecting any displayed category. After selecting a displayed category, a list of matches within that category may be displayed. For example, category 1002, MLB, includes two matches in the user's favorites. Number indicator 1004 indicates the number of content matches. Selecting category 1002 may either drill down one level to a more detailed sub-category or display a list of the matching games or content.

In some embodiments, selection of list favorites option 906 from sports search menu 900 (FIG. 9) may list all sports programming matching the user's preferences, or those exceeding a ranking threshold. Favorite sports programming may be sorted by rank, by time, by sport, or any other suitable criteria. In some embodiments, a screen similar to display screen 1000 may be presented in response to the user selecting search by sport option 908 from sports search menu 900 (FIG. 9). In these embodiments, number indicator 1004 may indicate the count of all sports programs within category 1002 or it may indicate the number of subcategories available within category 1002. Selecting a category may either list all programming within that category or the subcategories of that category.

In some embodiments, a screen similar to display screen 1000 may be presented in response to the user selecting favorites option 706 from sports watcher menu screen 700 (FIG. 7). In these embodiments, the number of stars next to category 1002 may indicate the level of preference for the category. Any other suitable preference system, such as thumbs up and thumbs down system, may be used. The user may highlight any category and press a key such as a favorites key on input device 108 (FIG. 1) to modify the preference level. Number indicator 1004 may indicate the number of subcategories within category 1002. Selecting category 1002 with a non-zero number indicator may display a screen similar to screen 1000 which lists the selected category and its subcategories.

Figure 11:
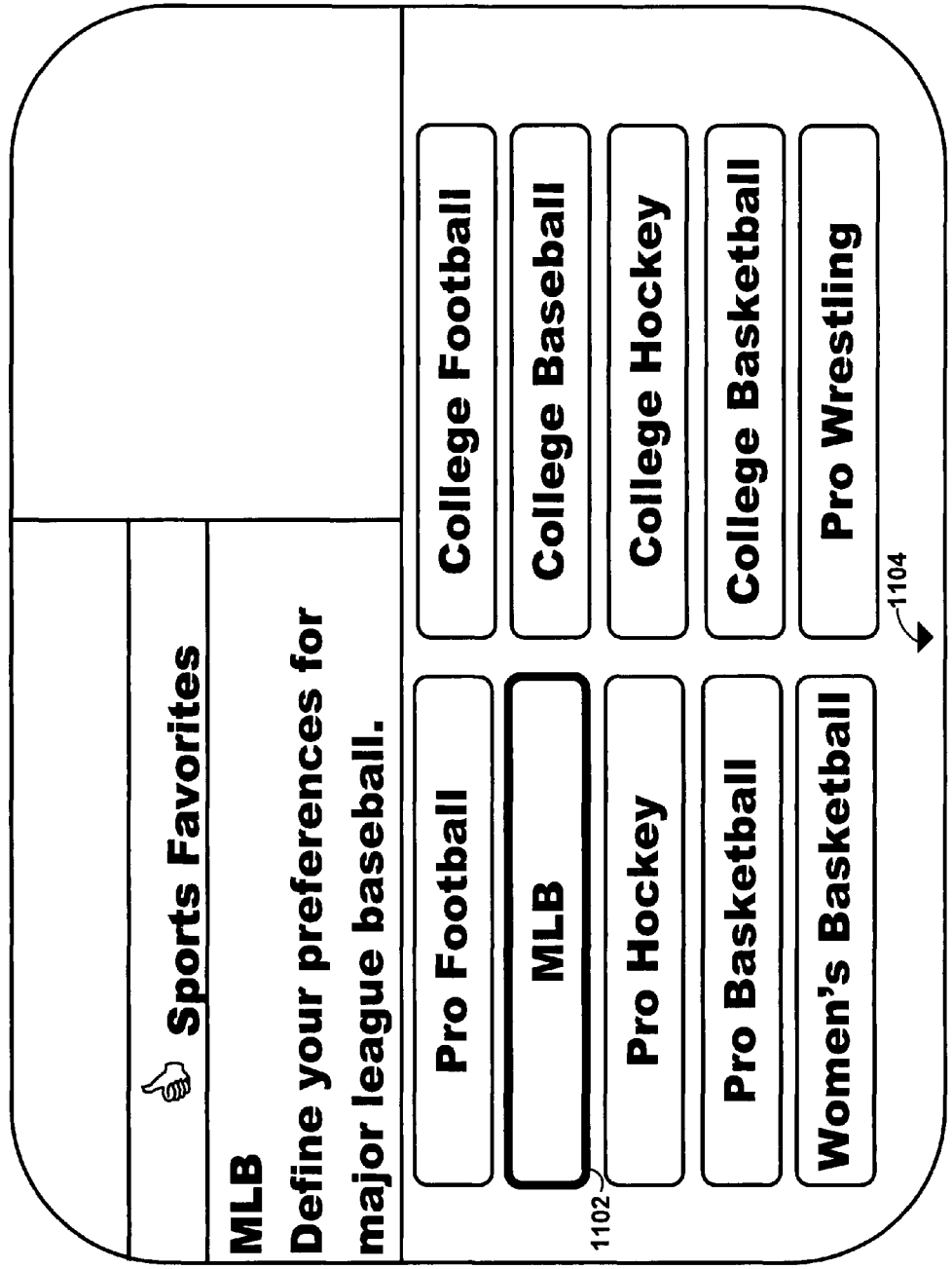
Figure 12:
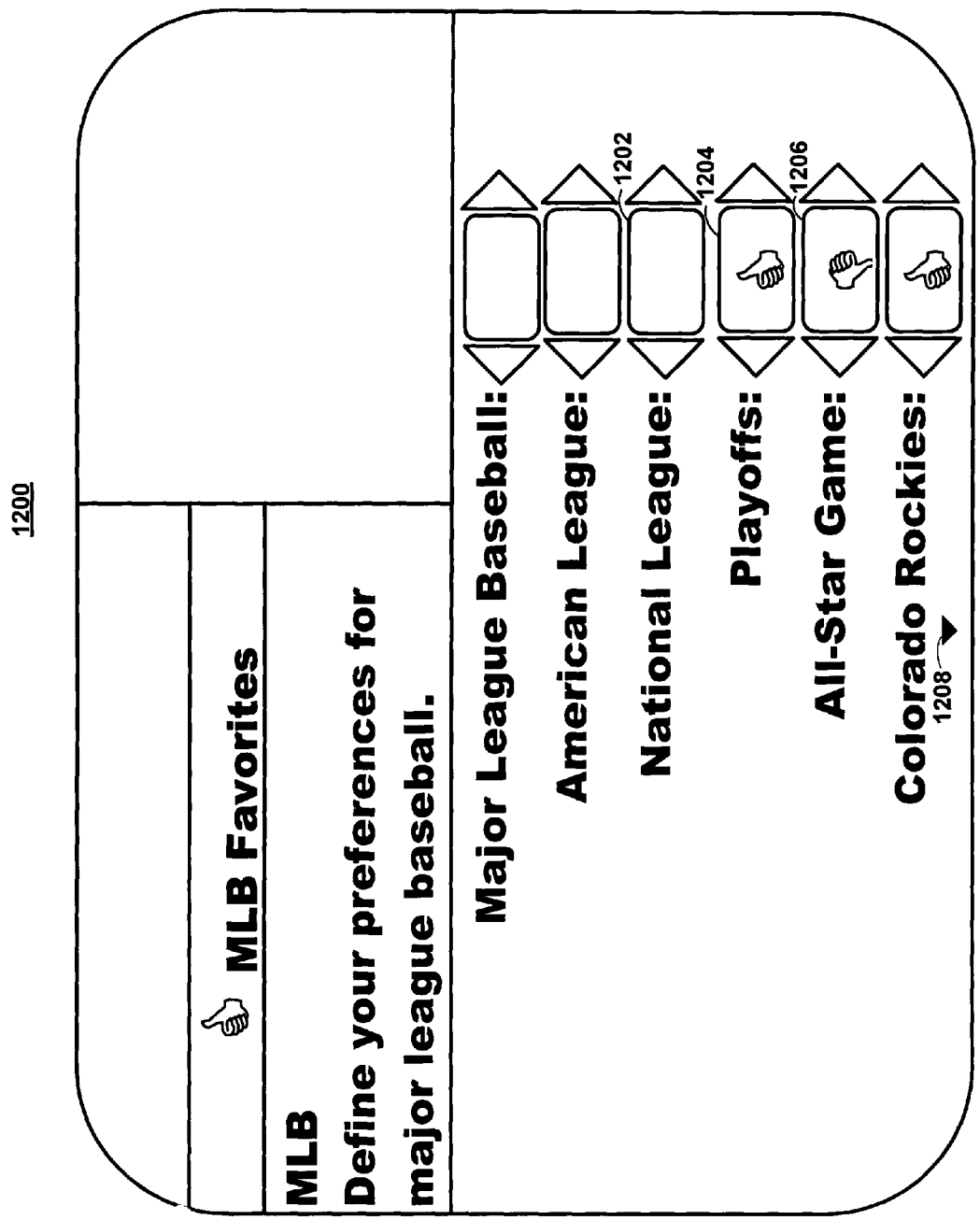

FIG. 11 shows display screen 1100 for customizing a user's favorites. Display screen 1100 may include a variety of sports categories or classification options, such as MLB option 1102. A user may view more options by selecting more option 1104. After selecting a category in display screen 1100, display screen 1200 of FIG. 12 may be displayed to the user. This display screen may allow the user to set a rating for a number of subcategories of the selected category. For example, if the user selects MLB option 1102 in display screen 1100, display screen 1200 may include a listing of all the teams in the MLB, leagues within the MLB, types of games, or any other suitable subclassification or subcategorization. A user may scroll through the listings and associate either thumbs up rating 1204, thumbs down rating 1206, multiple thumbs up, multiple thumbs down, or no rating 1202 with each subcategory. To view more subcategories, the user may select more option 1208.

Although a thumbs up/thumbs down system is used in some embodiments, any suitable rating system may be used in other embodiments. For example, FIG. 13 shows display screen 1300 with a star rating system. The user may select any entry in the favorites listings, such as entries 1302, 1304, or 1306, to change the rating associated with the entry. For example, in display screen 1300, entry 1302 is associated with one-star rating 1308. In some embodiments, star ratings may range from zero stars (unrated) to five stars (the highest rating). A description of the selected entry, or of any content associated with the selected listing, may be displayed in text area 1310.

The user may also setup favorites from the game information screen, such as display screen 600 (FIG. 6). Display screen 1300 of FIG. 13 is an example of a favorites setup screen that may be accessed from the game information screen. The favorites screen may list all categories in which the selected game appears. Categories may include the sport (e.g., iThemes or full media guidance application list), level (professional, college, high school, Olympics, etc.), men's, women's, or mixed, the league, the team, the event/tournament (e.g., Super Bowl or Tour de France), and/or the channel. The user may individually rate each category. As described above, illustrative rating schemes may include one to three thumbs down, neutral, one to three thumbs up, or a star rating system. Other rating systems (e.g., numeric) may also be used. Every game may receive a ranking based on the user ratings of each of its associated categories. Preferences specified for multiple categories may be given extra weight. The largest number of thumbs (up or down) or stars may be given highest precedence. Games with net negative or neutral rankings may not be included within the user's favorites in some embodiments. Games with net positive rankings may be listed in rank order.

Figure 14:
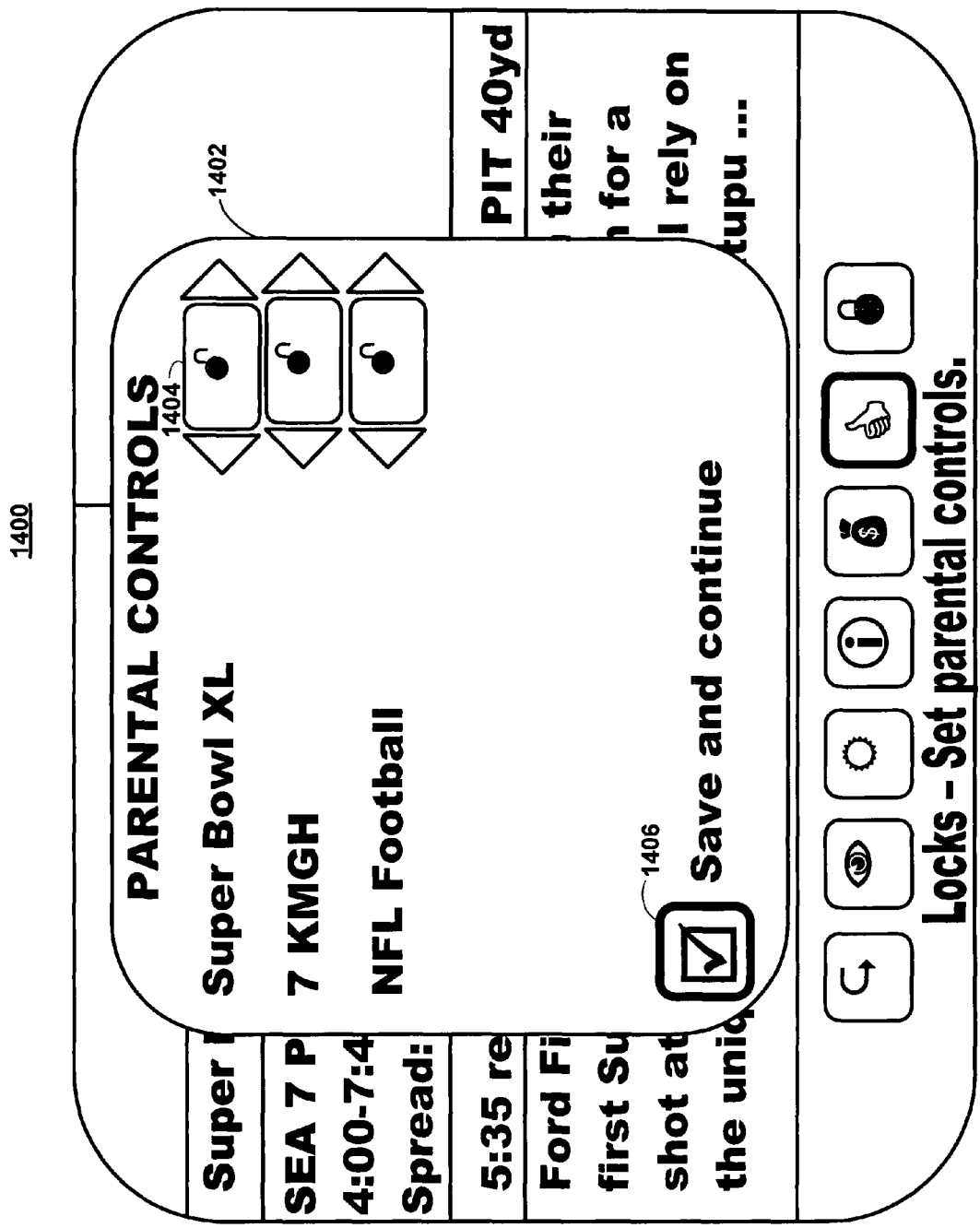
FIG. 14 is an illustrative parental control display screen in accordance with one embodiment of the invention.

FIG. 14 shows display screen 1400 for setting parental control locks for sports-related content. Parental controls may be defined for sporting events or other sports-related content (e.g., sports news, highlights, commentaries, and sports-themed movies). Parental control display screen 1400 may be accessed from the game information screen, such as display screen 600 (FIG. 6), or by pressing an appropriate button or key (e.g., a "Lock" key) on an input device, such as input device 108 (FIG. 1). The parental controls may be linked to the main interactive media guidance application parental controls and may be enforced regardless of which application (the sports watcher application, the interactive media guidance application, or neither application) is active. Illustrative parental control locks may include lock by channel, by title, or by sport. For example, parental control overlay 1402 presents several lock options to the user. The user may select to lock or unlock each option by selecting lock status indicator 1404. To save the parental control settings displayed in parental control overlay 1402, the user may select save button 1406. If the user selects any individual attribute for locking, then all current and future programs and games with matching attributes may be locked.

Figure 15:
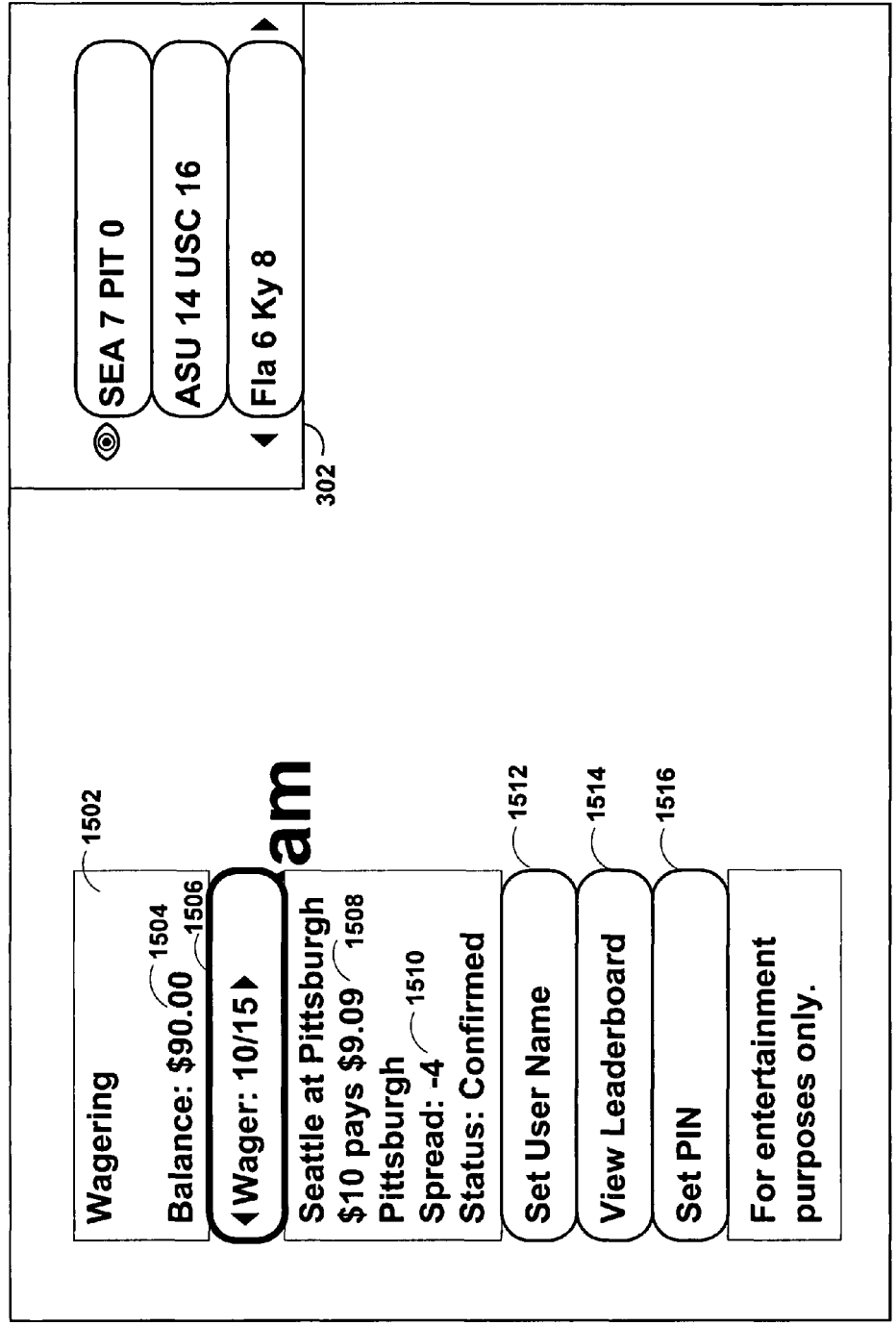
FIG. 15 is an illustrative display screen for wagering on sporting events in accordance with one embodiment of the invention.

FIG. 15 shows illustrative wagering display screen 1500. As previously mentioned, the sports watcher application supports a comprehensive interactive sports wagering interface. The wagering interface may support both parimutuel and fixed odds betting. Through the interactive wagering interface, the user may build wagers and place these wagers with a network transaction processing system (not shown). The transaction processing system may maintain a database of user account information, including available balance information, on behalf of the users of the wagering system. Wagers on sporting events, such as football and baseball games, may all be created and placed from the user equipment device using a series of interactive overlays and prompts. To wager on a game, the user may select the game the user would like to wager on using game info screen 600 (FIG. 6), select wager option 616 (FIG. 6), and view a game wager screen (not shown). On the game wager screen, the user may select the wager amount, the wager type, the wager team, and any other wager information. Wager types may include final score, half-time score, over/under, or any other sport-specific wager type. The sports watcher application may display the bank balance, the odds, spread or money line, the anticipated payout based on the selected options, and any other wager information. In some embodiments, a $1 minimum balance may be required to access the game wager screen. After the game has been completed, the user may reselect the game wager screen to see the final results and payout, if any.

The user may select wager option 708 from sports watcher menu 700 (FIG. 7) to view information about all pending and recent wagers, and to access other wagering features. When the user selects wager option 708 (FIG. 7), the sports watcher application may display wagering menu 1502. Wagering menu 1502 may display multiple wagering options. For example, wagering menu 1502 may include summary information about previously placed wagers. The user may be allowed to select a previous wager using option 1506. When the user selects a specific wager, the sports watcher application may display the date of the game being wagered upon, the teams involved in the contest, the type of wager, the amount of the wager and the possible or actual payout 1508, the team selected for the wager, the odds, money line or spread 1510, the status of the wager (e.g., wager confirmed, wager lost, wager won, or no action), and any other suitable information concerning the selected wager. The wagering feature may be based on "play money" redeemable for gifts, prizes, and sports-related merchandise, or the wagering interface may link to user bank account or credit information for real money wagering (if permitted by local laws). The user's current balance (which may be stored locally on the user equipment or on a network location) may be displayed to the user in balance area 1504.

Once the wager is confirmed, the wager amount is deducted from the user's account balance. The wager information may then be transmitted to the network transaction processing system for processing, if desired. Generally, fixed odds wagers (e.g., wagers on football, baseball, or basketball games) are not transmitted to the network transaction processing system, but these wagers may be transmitted to the network transaction processing system if desired. Parimutuel pool wager information (e.g., wagers on horse races) may be transmitted to the network transaction processing system so that the parimutuel pools associated with the wager may be updated centrally. Real-time wagering information, including current odds and payout information, may be provided to all user equipment devices in the media system. When results of the wager are known (e.g., by reading the real-time score data feed), the user's balance may be automatically updated, and the next time the wagering screen is displayed, the status of the wager may be shown (e.g., amount won, lost, or no action).

The wagering system may enhance marketing and advertising efforts. For example, new users could be credited $100 when they sign up for a wagering account. In some embodiments, if a user's balance is less than $1 with no active bets, the use may "declare bankruptcy" and get, for example, another $50. With every wager, the user may be entered in a daily drawing for a $100 balance credit to the user's wagering account. A bonus may be given for subscribing to a premium sports package. Bonuses may also be given for correct trivia answers, completing surveys, etc. The user's wagering account balance may be used for VOD purchases, pay-per-view movies, merchandise, etc. Interest may also be earned on game balances.

In some embodiments, a leader board is maintained on the network. The user may set up his or her username, screen name, or handle by selecting user name option 1512. After selecting leader board option 1514, the current leader board may be displayed to the user. This leader board may list the top wager bank balances and the corresponding usernames associated with the top wagering account balances. The position on the leader board may be displayed, the time in position, the position on the leader board last week, etc. In some embodiments, a PIN may also be specified via PIN option 1516 to access all wagering features. In this way, unauthorized users are prevented from creating or submitting any wagers or accessing any wagering-related functionality.

Figure 16:
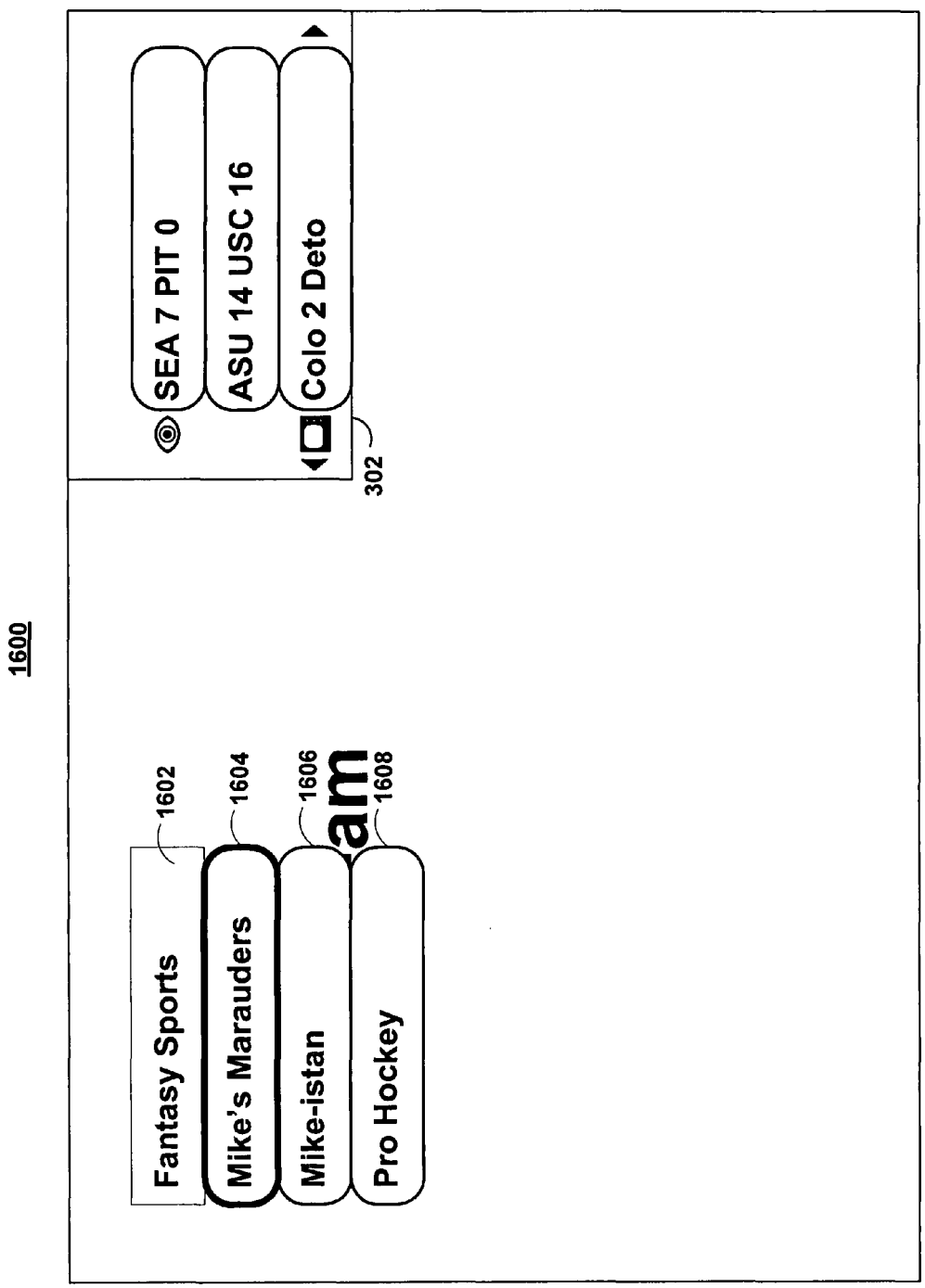
FIGS. 16-21 are illustrative fantasy league display screens in accordance with one embodiment of the invention.

The user may also select a fantasy sports option from the sports watcher menu screen, such as display screen 700 (FIG. 7), to access the fantasy sports feature. Display screen 1600 of FIG. 16 shows an illustrative fantasy league display screen. Fantasy league menu 1602 may display the user's active fantasy teams, such as teams 1604 and 1606. The user may select any one of teams 1604 and 1606 to access a number of options relating to the selected team. For example, after selecting team 1606, display screen 1800 of FIG. 18 may be displayed.

Fantasy league menu 1602 may also list the sports with active fantasy league play or for which new fantasy teams may be formed. In the example of FIG. 16, only professional hockey option 1608 is displayed, indicating to the user that only the professional hockey season currently has fantasy league play available for new teams/players. After selecting a sport from fantasy league menu 1602, the user may be presented with display screen 1700 of FIG. 17.

A variety of fantasy sports league options may be available. Leagues for alternate sports (e.g., Olympics or marathon—where a team is a country) may also be supported. Leagues may open x days before a season starts, where X is any positive number. Each league may have a minimum and maximum number of teams. Multiple leagues may be created for each sport based on demand. For example, public leagues created as needed, and users may be assigned as they join. Users may create and/or join a private league by entering the league name and an optional password. Typically, leagues will close at or before the start of season. In some embodiments, leagues may be designated "A," "B," or "C" leagues depending on the level of competitiveness and expertise of users within the league. Users may self-select a level. Leagues may also include "keeper leagues" that include the same players from year to year, or leagues may start anew each season.

Figure 17:
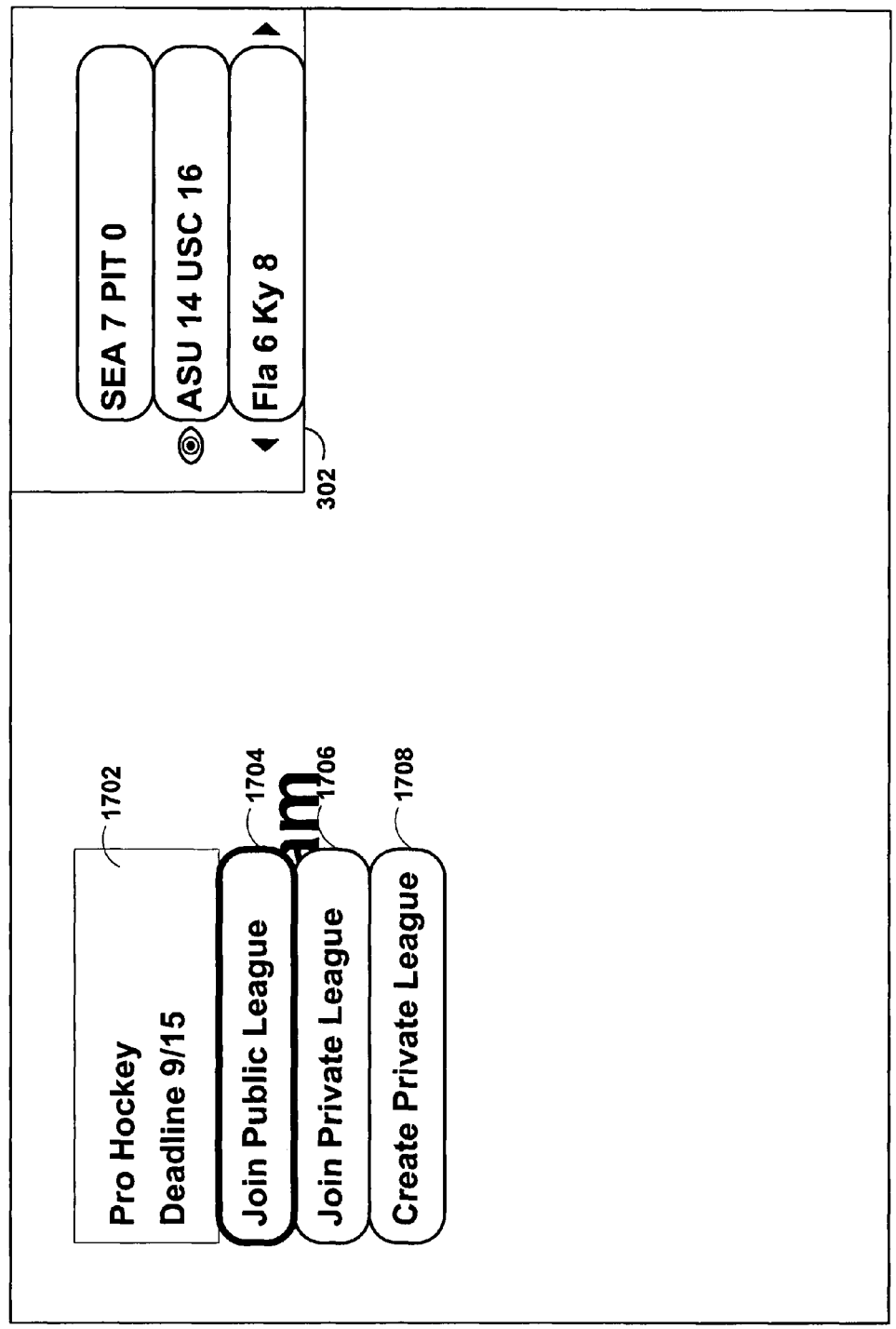

FIG. 17 shows fantasy league display screen 1700. The deadline to join a league and/or create a new league may be displayed in deadline area 1702. To join a public league, the user may select join public league option 1704. To join a private league, the user may select join private league option 1706. To create a new private league, the user may select create private league option 1708. Public leagues may be created by the system operator, while private leagues may be created by individual users of the fantasy league feature.

After selecting a fantasy team, the options presented to the user may depend on the type of sport and on whether it is pre-season, during season, or post-season. In the pre-season, a user may name his or her team when it is created. Player selection may proceed using an auction or draft system. In an auction selection system, each team may be given X dollars each season, and the players may bid for players. In a draft selection process, a round robin draft approach may be used, with the order determined randomly or based on last season's results. A user must participate in draft/auction in timely manner or may lose the franchise or draft selection. The auction method may be preferred in some embodiments, as the auction can proceed even if some players do not participate fully. From the pre-season fantasy league screen, users may see available players, statistics from previous seasons, other teams' selections, and abandoned franchises.

Figure 18:
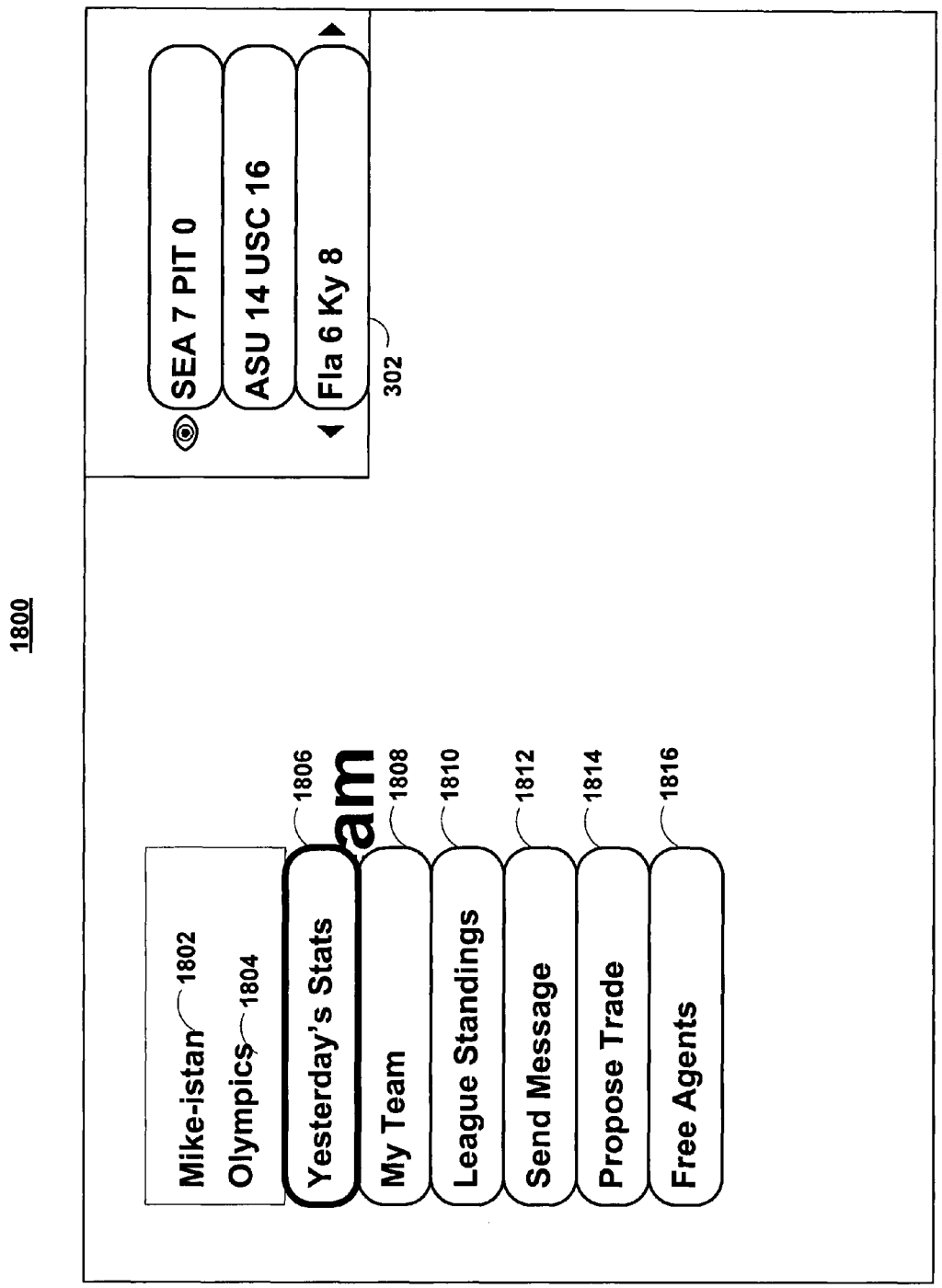

FIG. 18 shows fantasy league team screen 1800. During the season, statistics and standings may be updated automatically. In some embodiments, statistics and standings are updated daily (e.g., baseball leagues) or weekly (e.g., football leagues). A user may view individual player and overall team statistics from a fantasy league team menu. In the example of FIG. 18, the team menu may include an indication of the team name in name area 1802 and an indication of the sport in sport area 1804. The user may select yesterday's statistics option 1806 to view statistics for the previous day. A user may view the user's own team statistics by selecting my team option 1808. The standings of all teams in the league may be displayed after selecting league standings option 1810. Trades may be supported with other teams, with messaging between teams to facilitate the trade. To create and send a message (e.g., instant message or email message), the user may select send message option 1812. Single and/or multi-player trades may be supported by selecting propose trade option 1814. Off-season trades may be made with other teams (for keeper leagues), and users can choose to abandon their team. In some embodiments, a user must actively rejoin the league before the start of the next season or their franchise will be lost. The top players in each league may get bumped from "C" to "B" leagues or from "B" to "A" leagues. Each team may also be given a limited number of free agent drafts to replace injured players. To view a list of available free agents, the user may select free agent option 1816.

Figure 19:
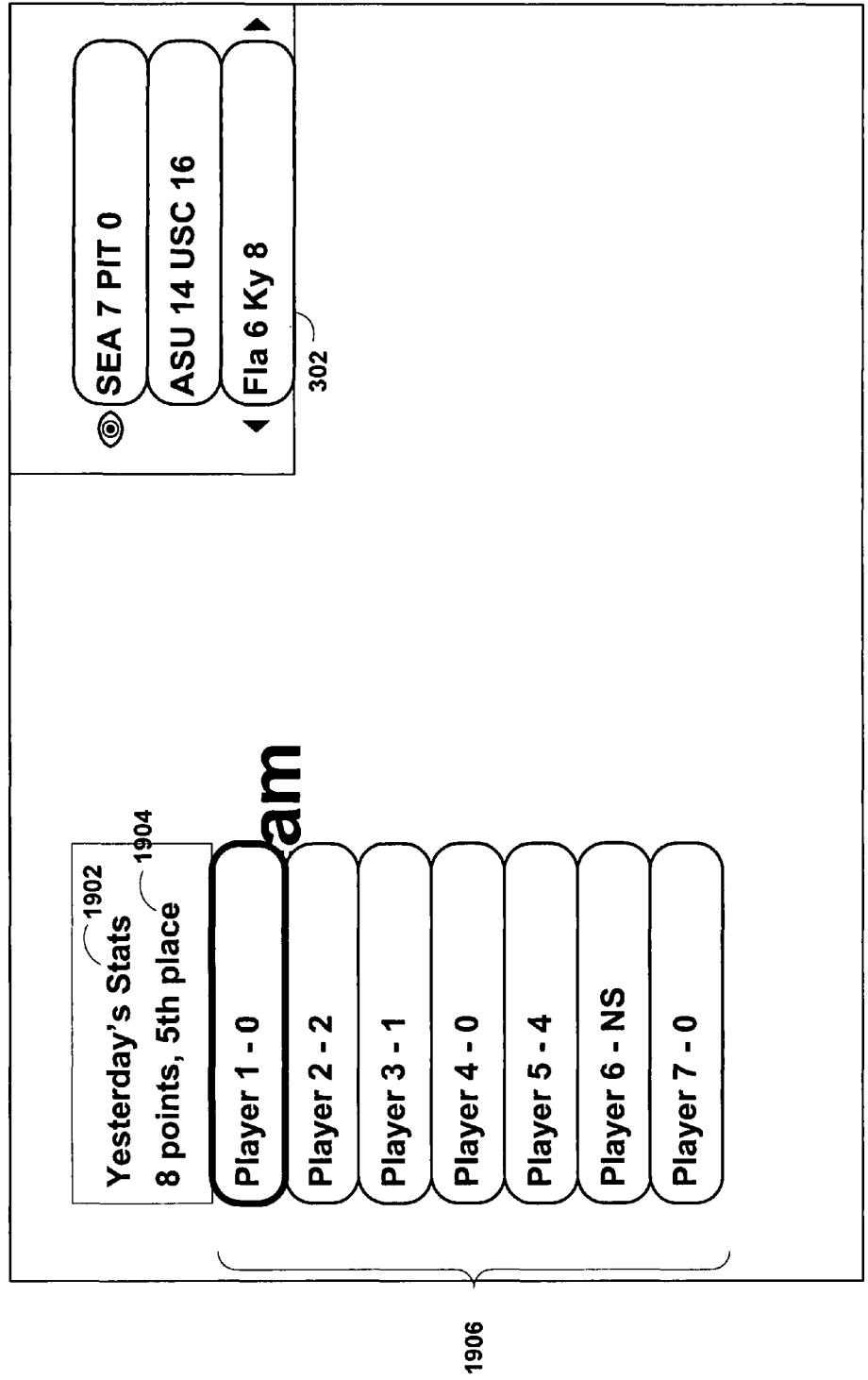
Figure 20:
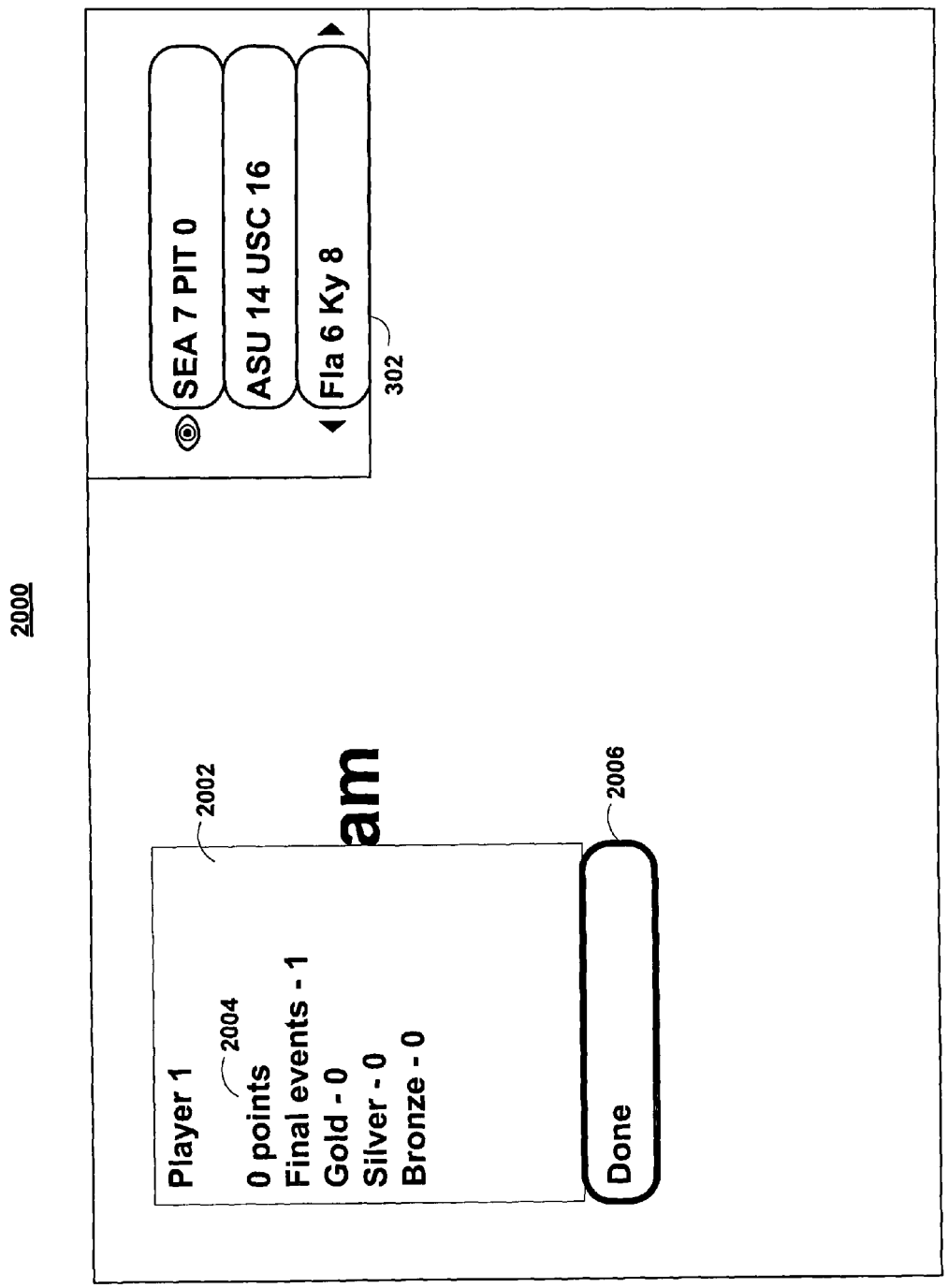

After selecting yesterday's stats option 1806, display screen 1900 of FIG. 19 may be displayed. Display screen 1900 may include statistics menu 1902 with the team's current standing in area 1904. The points may be broken down on a player basis. The players and their accumulated points may be displayed in players area 1906. To view more information about an individual player, a user may select any player in players area 1906 to receive detailed point break-down information. For example, as shown in display screen 2000 of FIG. 20, individual player menu 2002 may be displayed after the user selects a specific player from players area 1906. A breakdown of the player's total number of points may be listed in points details area 2004. After the user is finished looking at the points details, the user may select done option 2006 to return to the previous screen.

Figure 21:
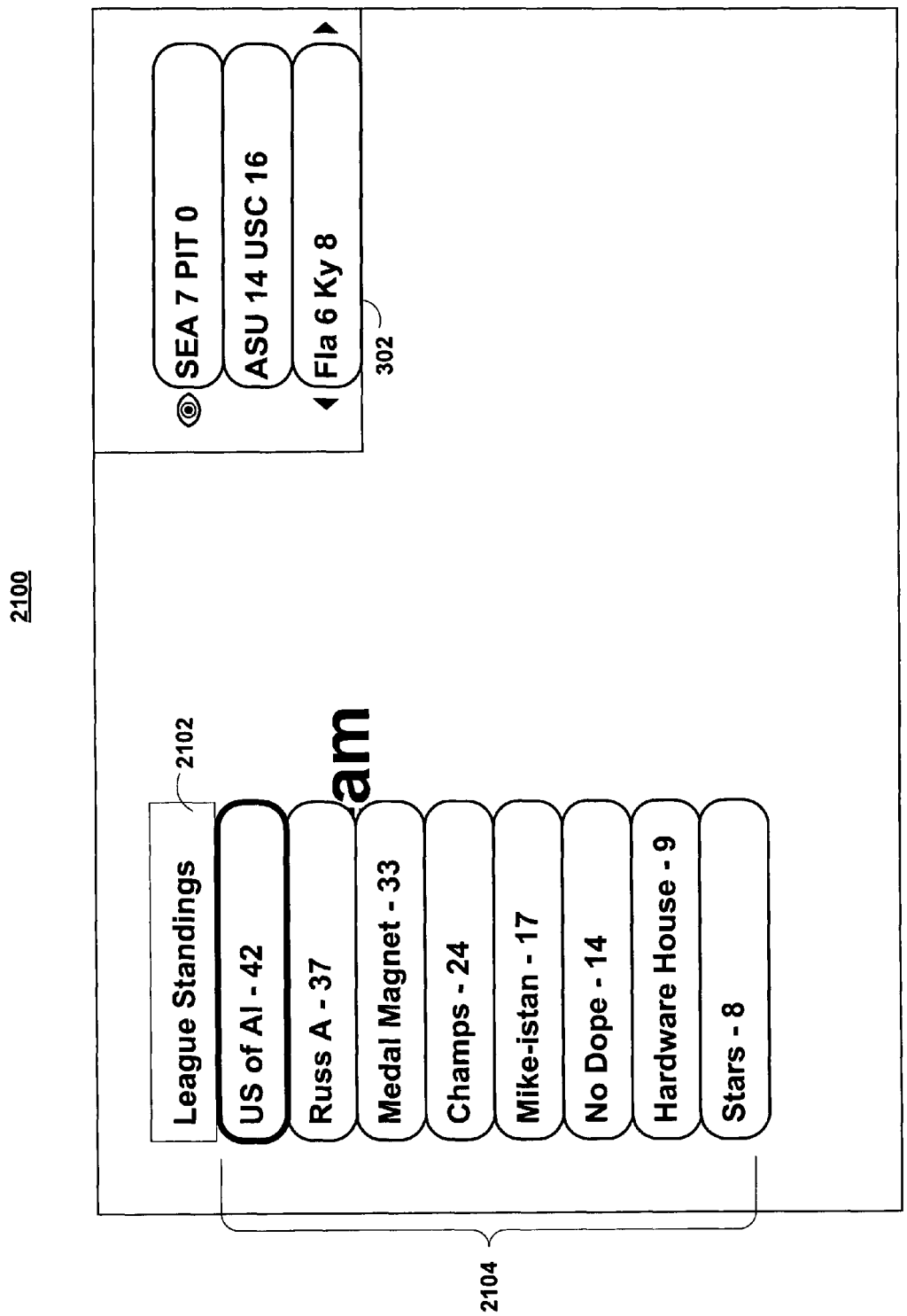

In the post-season, users may view the final player and team statistics and standings of all teams in league. For example, display screen 2100 of FIG. 21 shows illustrative league standings. League standings menu 2102 may include a listing of all the teams in the league or the teams with the greatest number of total points in the league. This listing of teams in rank order may be displayed in area 2104. The user may select any team in area 2104 to receive more detailed information about the selected team.

Figure 22:
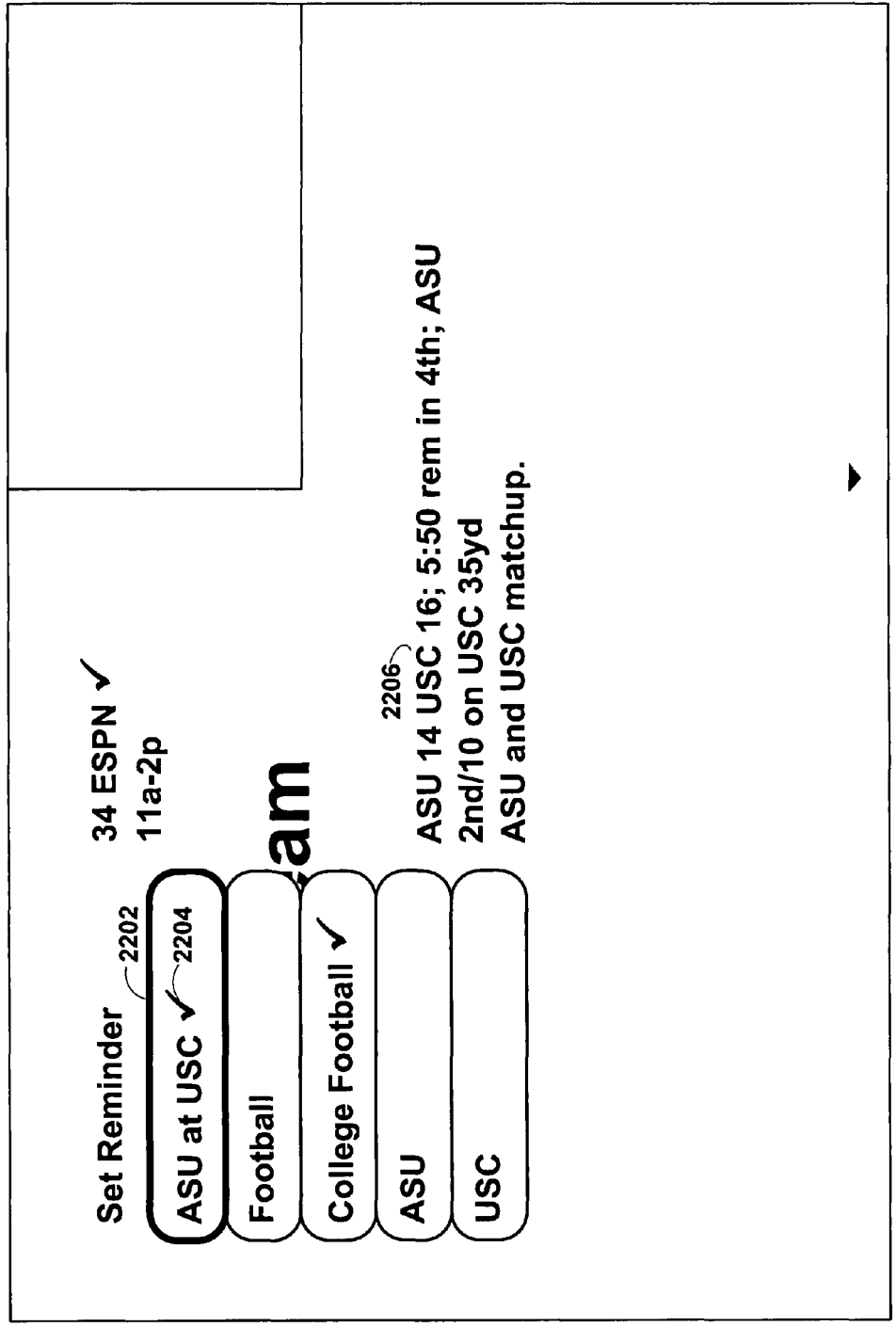
FIG. 22 is an illustrative display screen for setting sports-related reminders in accordance with one embodiment of the invention.

As previously mentioned, the sports watcher application also supports enhanced reminder and recording options for sports-related content. Reminders may be set for any game or any category associated with a game. For example, FIG. 22 shows display screen 2200 for setting reminders. This screen may be displayed after selecting remind option 610 (FIG. 6) from game information screen 600 (FIG. 6). In the example of FIG. 22, the user selected a reminder option from an ASU at USC game information screen. The user may move highlight 2202 to any of the available categories associated with the ASU at USC game, such as the football category, college football category, ASU category, or USC category. More or fewer categories may be defined in other embodiments. The user may toggle a reminder indication, such as checkmark 2204, to turn the reminder on or off. Reminders on categories (e.g., " college football") may remind the user whenever an event matching the category is available or about to be broadcast. For example, other college football games would match the "college football" category. As another example, the user may select a team (e.g., ASU) to be reminded whenever that team is playing and/or the game is available within the media system. Display screen 2200 may also include detailed information 2206 about the selected game or category. A checkmark or similar icon may be displayed on the game info screen if any matching category has a reminder set.

Figure 23:
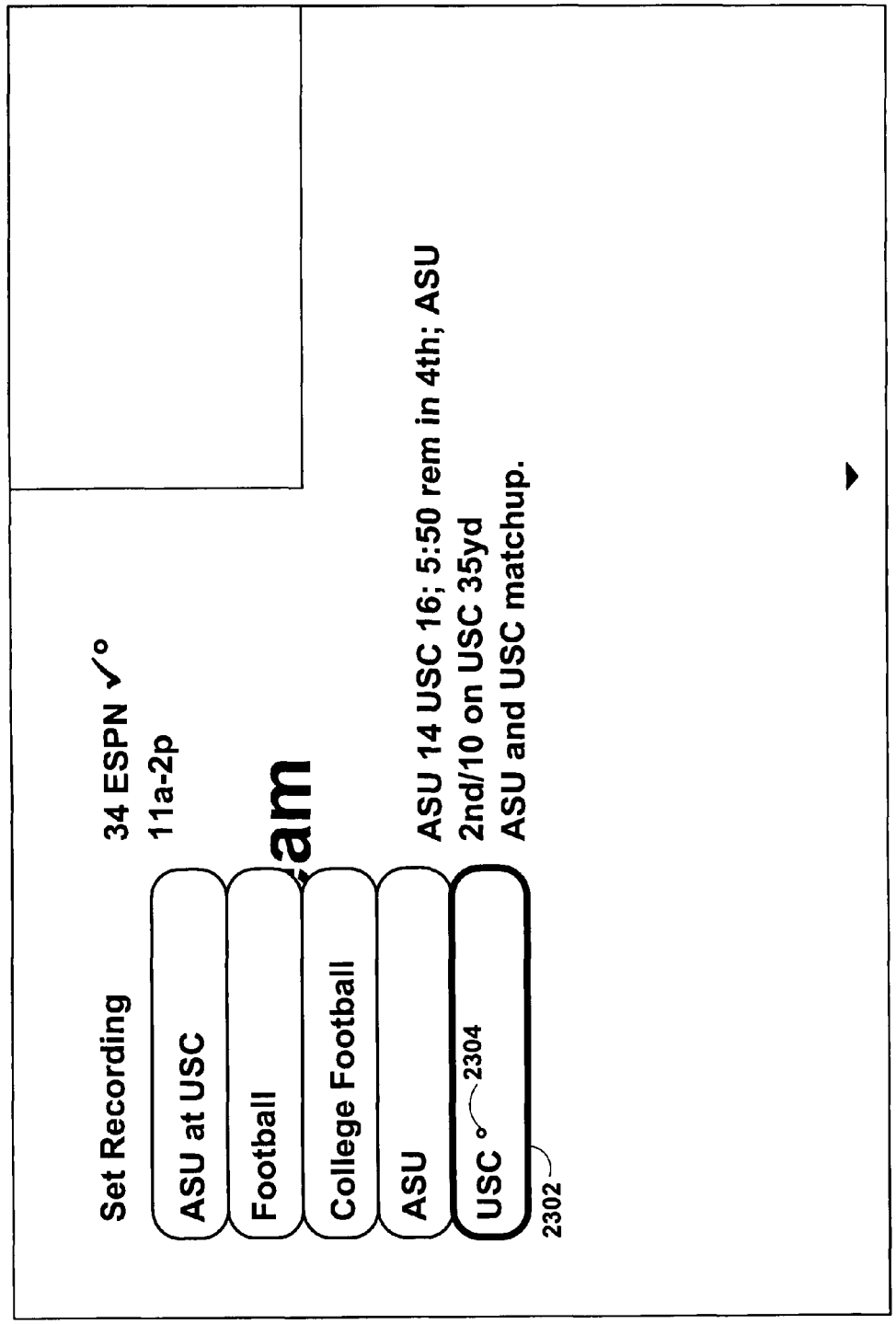
FIG. 23 is an illustrative display screen for scheduling recordings in accordance with one embodiment of the invention.

Similar to the process for setting reminders, a user may also schedule custom recordings of sports-related content. FIG. 23 shows display screen 2300 for scheduling sports-related recordings. A user may select to schedule recordings of a particular match-up (e.g., all ASU at USC or USC at ASU games) or a particular category. For example, any sports-related content matching the college football category may be scheduled for recording with a single user selection of the college football category in display screen 2300. A user may also schedule all games featuring a particular team for recording. As shown in FIG. 23, team option 2302 may be selected to toggle the recording option on and off. Scheduled icon 2204 may be displayed within the selected option to indicate that the option is scheduled for recording. A matching scheduled recording icon may be displayed within the game information screen if any matching category has been scheduled for recording.

Figure 24:
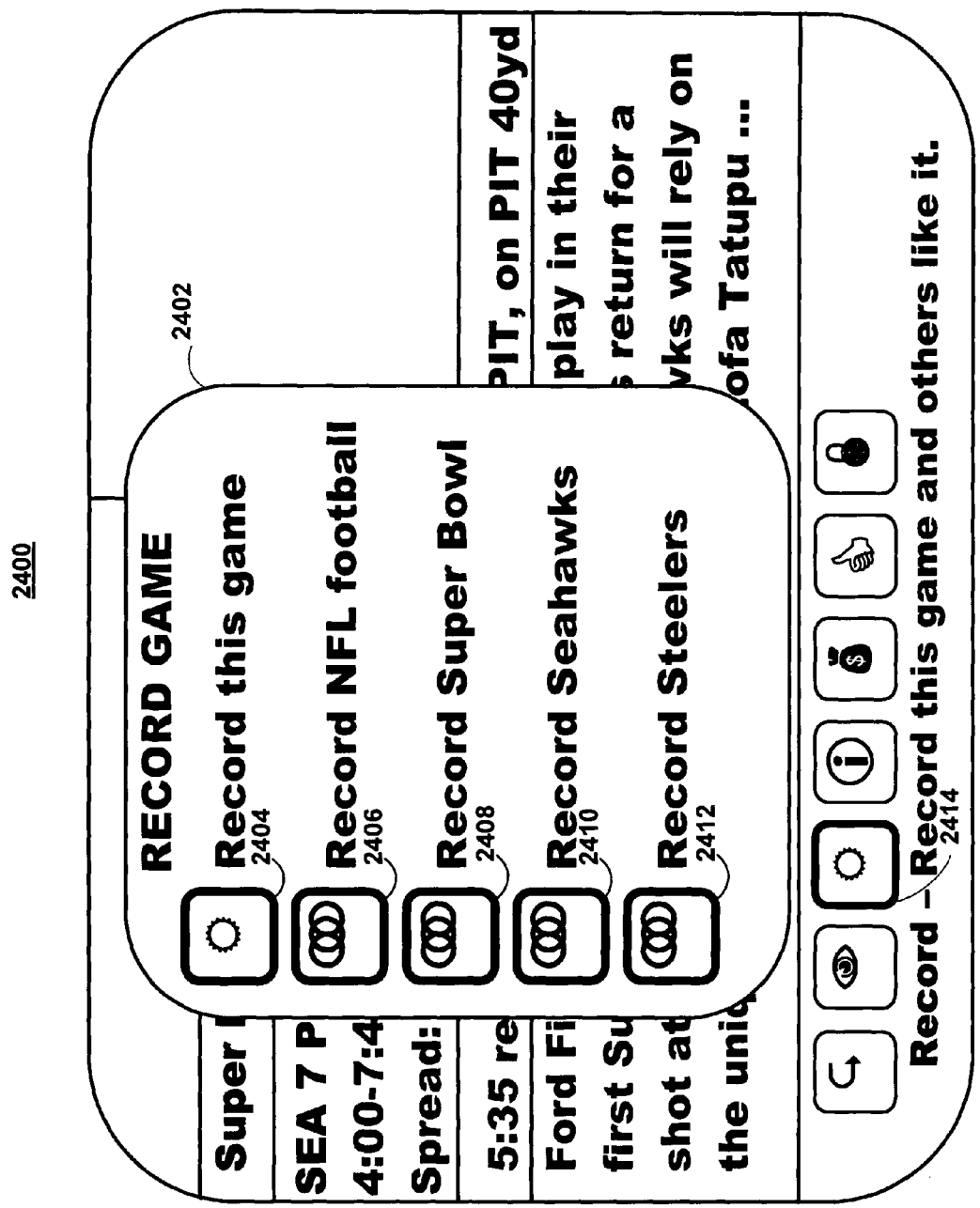
FIG. 24 is an illustrative display screen for scheduling category recordings in accordance with one embodiment of the invention.

Another illustrative recording display screen is shown in FIG. 24. Display screen 2400 includes overlay 2402, which includes several recording options 2404, 2406, 2408, 2410, and 2412. The user may access overlay 2402 by selecting record option 2414 in the menu at the bottom of the display screen. To record (or schedule for recording) the current game, the user may select record option 2404. To record all games matching an appropriate category (e.g., all Super Bowl games), the user may select one or more of the desired category recording options 2404, 2406, 2408, 2410, or 2412.

Figure 25:
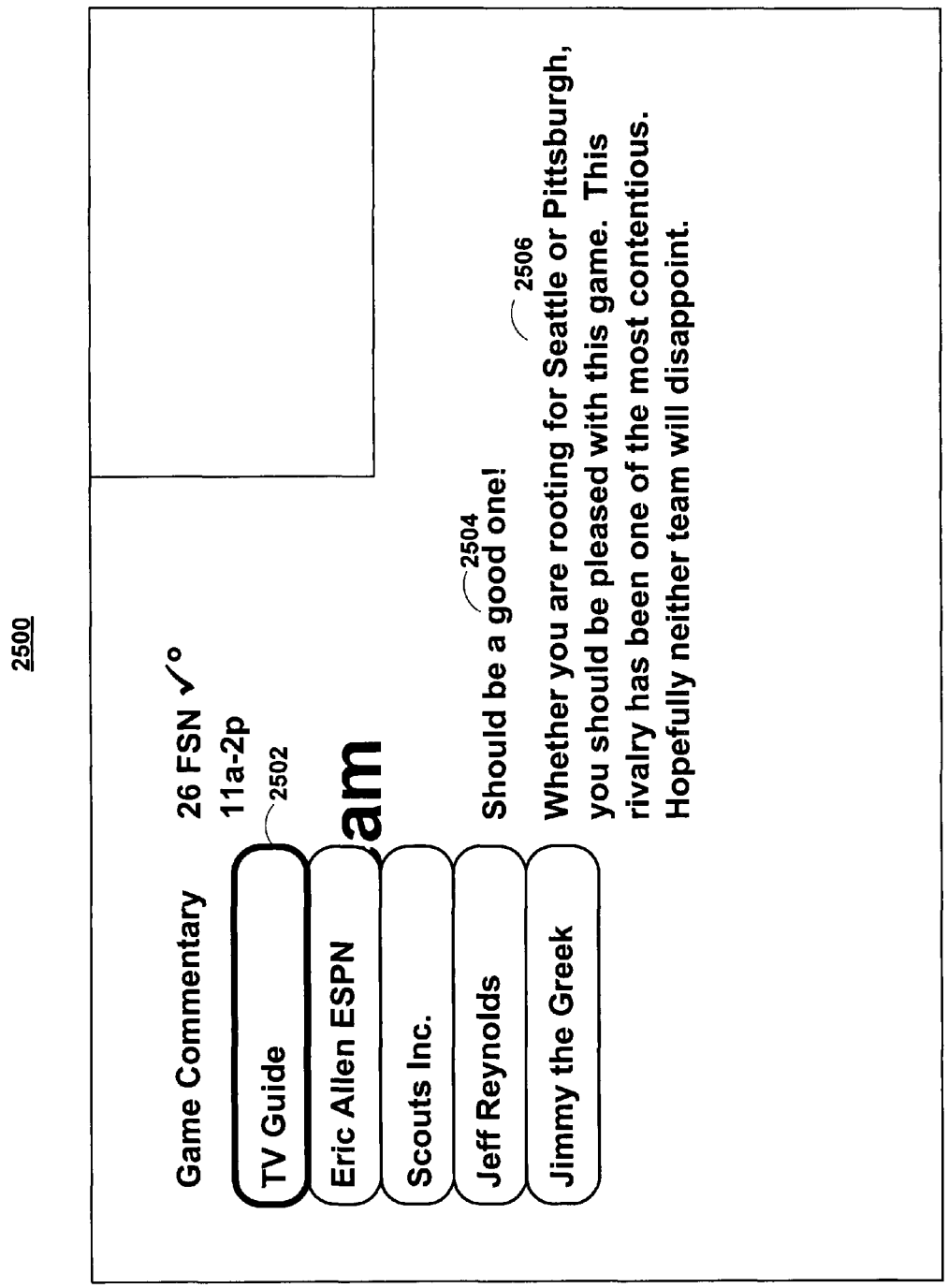
FIG. 25 is an illustrative display screen for viewing sports commentary from a variety of difference sources in accordance with one embodiment of the invention.
Figure 26:
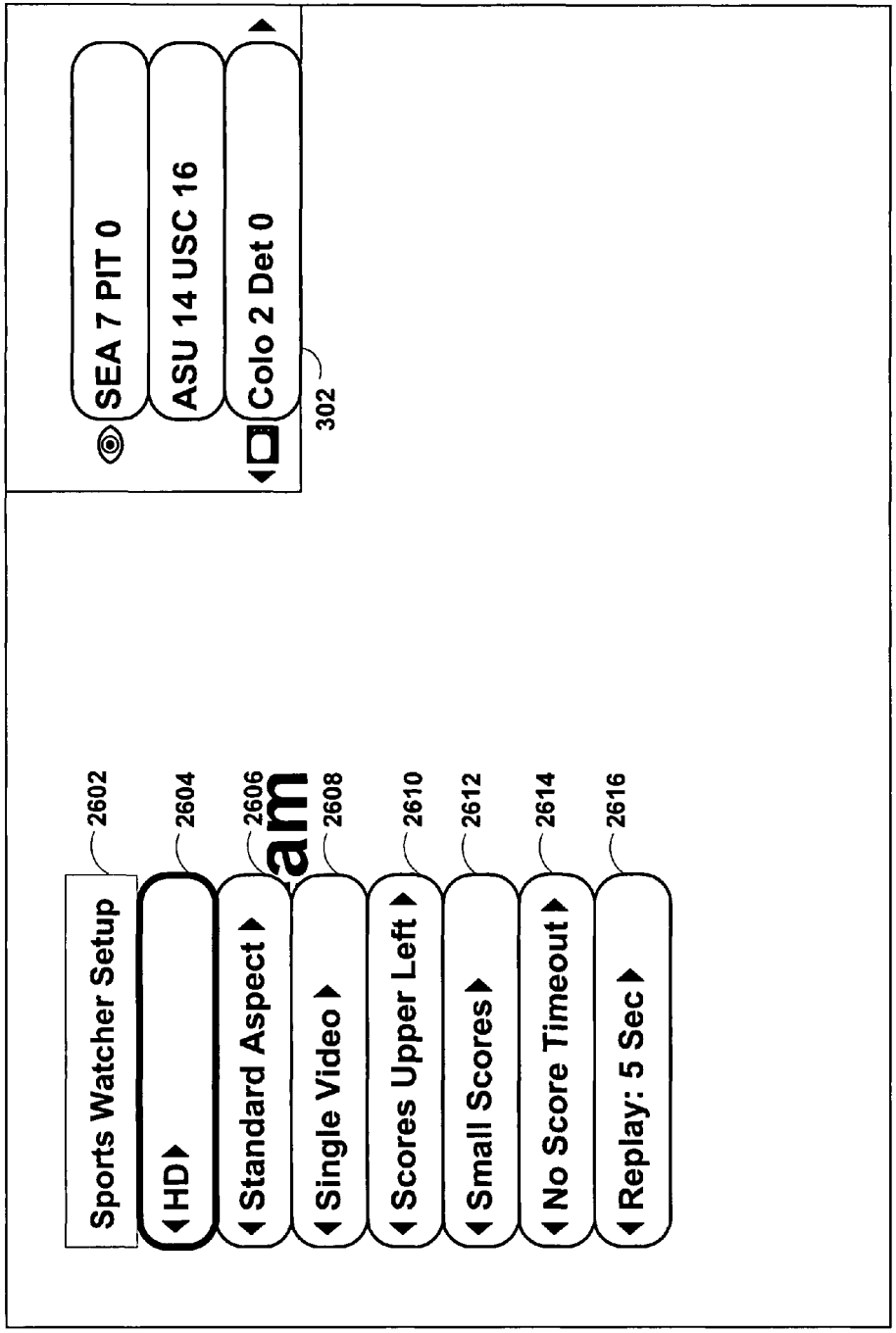
FIGS. 26-28 show illustrative sports watcher setup display screens for customizing sports watcher features in accordance with one embodiment of the invention.
Figure 27:
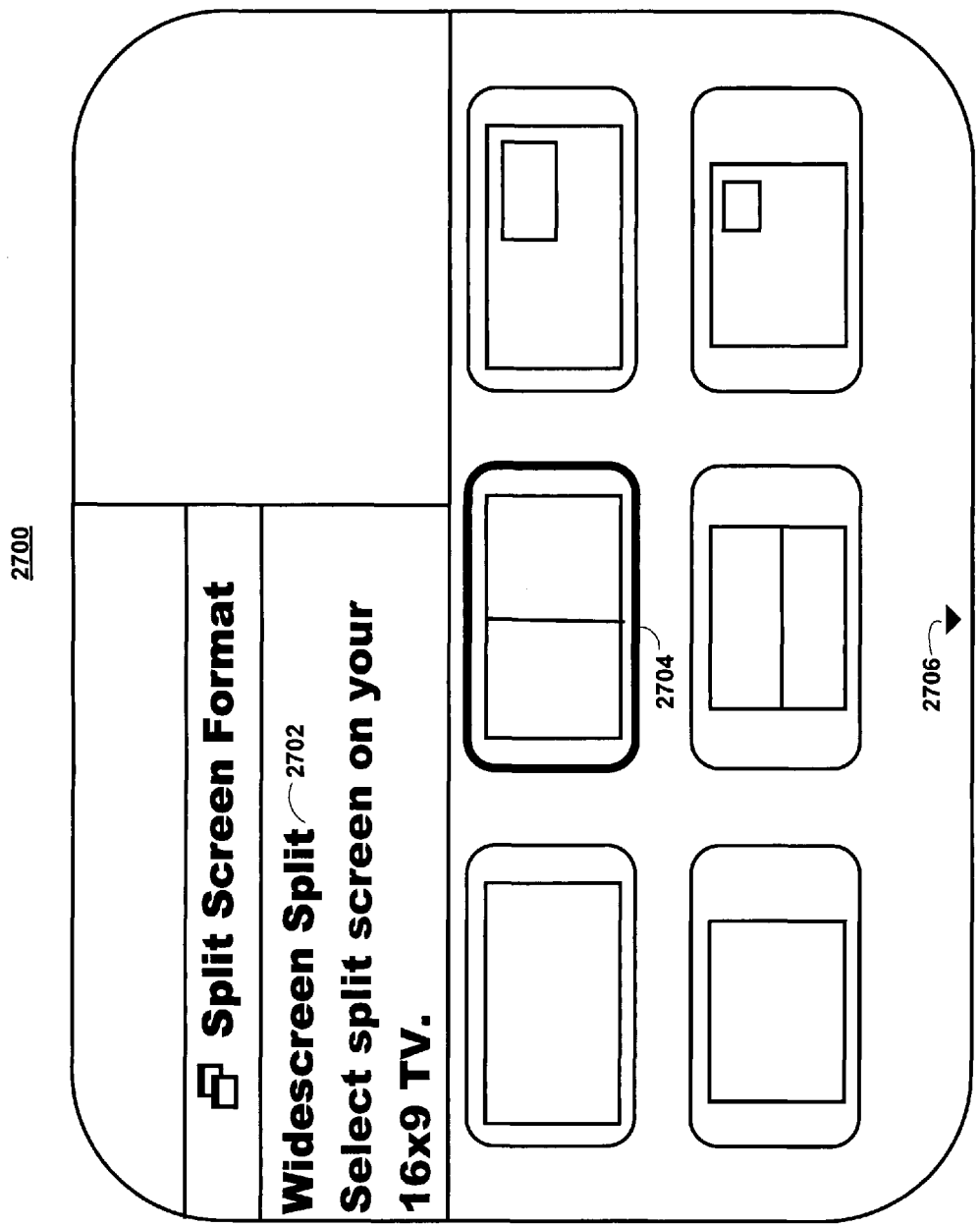

As previously mentioned, game commentary from a variety of sources may also be displayed to the user. Game commentary may include text, graphics, video, and interactive elements (e.g., interactive playbooks, polls, and discussion forums). FIG. 25 shows display screen 2500 for accessing commentary content. The user may be presented with a number of commentary options, such as option 2502. The user may select any commentary option to be presented with the associated commentary. For example, in some embodiments, the user is automatically linked to a website or interactive application containing the commentary. The commentary may also be displayed directly in display screen 2500, if desired. In some cases, commentary may be displayed automatically when option 2502 is highlighted. Title 2504 may be associated with the commentary as well as commentary text 2506. In some embodiments, the user may also leave feedback regarding the commentary that other users in the media system may view when they access the same commentary. The commentary may include text, graphics, audio clips, and video.

To setup any of the sports watcher screens, the user may select a setup option from the sports watcher menu, such as setup option 714 from menu 702 (FIG. 7). After selecting the setup option, display screen 2600 of FIG. 26 may be displayed. Under sports watcher setup menu 2602, the user may adjust sports watcher-specific options by selecting, for example, HD/SD option 2604, widescreen/standard aspect ratio option 2606, single video/PIP/side-by-side windows option 2608, scoreboard position option 2610, scoreboard size option 2612, scoreboard timeout option 2614, and instant replay configuration 2616. Options to setup the wagering configuration and fantasy league configuration may also be included under screen layout setup menu 2602.

From single video/PIP/side-by-side windows option 2608, the user selects the user's preference for either single video mode, PIP mode, or side-by-side window mode. Whatever mode is selected will be the default mode for the sports watcher application. If the video layout setup option from quick menu 802 of FIG. 8 is selected, the user may be presented with video layout selection display screen 2700 of FIG. 27. Different video layout options may be provided for widescreen and standard aspect ratios. Area 2702 identifies selection 2704 as a widescreen split screen video layout. The user may move cursor 2704 to any video layout format option (or select more option 2706 or press a down arrow or page down key to see additional video layout format options).

Figure 28:
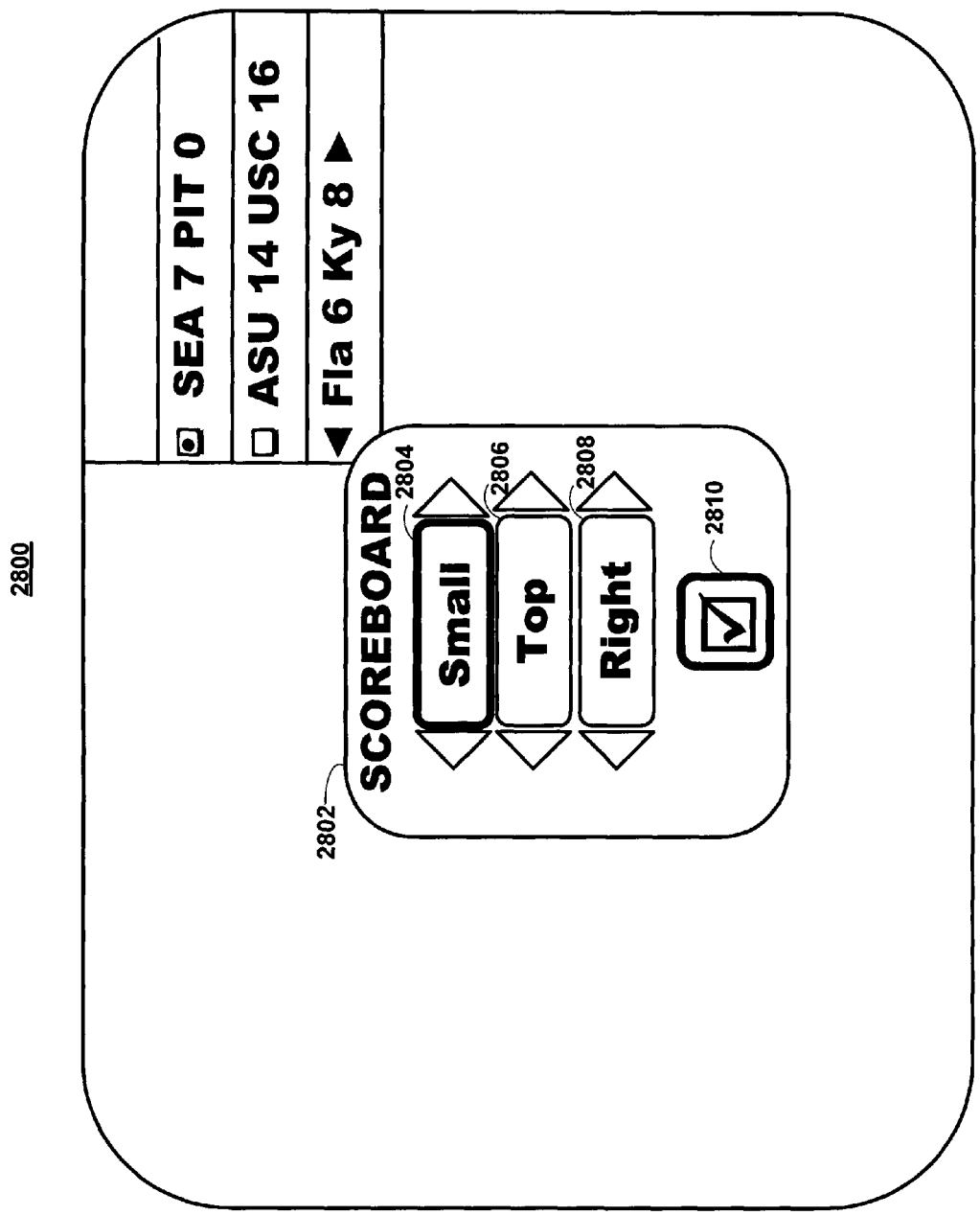

FIG. 28 shows display screen 2800 with scoreboard adjust overlay 2802. Scoreboard adjust overlay 2802 allows the user to customize the size, position, and/or timeout of the scoreboard, such as scoreboard 302 (FIG. 5). The user may select size option 2804 to change the default scoreboard size from small to medium or large. The user may select scoreboard vertical position option 2806 to change the scoreboard from the top to the bottom of the screen. Using scoreboard horizontal position option 2808, the user may select to change the side of the screen on which the scoreboard is displayed (e.g., left, right, or center). In addition to options 2804, 2806, and 2808, additional scoreboard options may be defined. For example, the user may select a banner or box scoreboard format in some embodiments. The user may also select how much game information (in addition to the score) should be displayed in the scoreboard. For example, the user might select to always display the current clock time or time remaining inside the scoreboard, if available. The user may also wish to see quarter, half, inning, or game summary information within the scoreboard.

As with traditional media guidance applications, the sports watcher application may include full listings of sports events and other programs on broadcast television, as well sports events available on-demand. The sports watcher application may sort the listings by time, by sport, by type of program (e.g., game, classic, highlights, commentary, interview, news update), etc. The listings may be displayed in table or grid form. Sports listings may include the current score if the game is in progress or has recently ended. Listings may also include extended information (teams and location, odds, etc.), and commentary from one or more sports personalities.

In some embodiments, the sports watcher application may include a program guide interface called the Game Guide. The Game Guide may be used to provide search results for a sports related search. Different results may be displayed in the Game Guide, which the user may select to quickly tune from game to game. The results on the Game Guide may include the teams and the status of the game in progress (e.g., who has the ball, the current score, time and quarter). The Game Guide may modify the display for a game when the game reaches a given moment (e.g., display the box in red when a team reaches the red zone, or has a runner in scoring position). The Game Guide may be displayed as an overlay over the video of one or more games, if desired.

The sports watcher application may also include an interface into the operator's sports packages and other offerings. The interface may include a list of available sports packages (purchased and unpurchased), the title and description of each package. The user may perform a number of actions with each package. For example, the user may view a list of games that are part of the package (to the extent that data is available), purchase a package upgrade, add package contents to the user's favorites, or set automatic reminders for package contents.

A user may also access sports content on-demand via a sports on-demand feature. For example, recent games, classic games, commentary videos, help videos on Sports Watcher features, fundamental video lessons (e.g., Wagering 101, Fantasy Sports 101), a "for Spouses" series (e.g., football for spouses), and various "How To" videos (e.g., pro tips on sports activities) may all be accessed on-demand (and for an additional fee, if desired).

The sports watcher application also provides a number of opportunities for targeted advertising. In addition to generally targeting advertisements based on the sports demographic, advertisements may be further targeted based on user preferences and user profile information. For example, if the user has selected the NY Yankees as the user's favorite team, advertisements to purchase Yankees tickets, memorabilia, or other products may be displayed to the user in any of the display screens shown herein.

The sports watcher application may use additional data as part of the interactive media guidance application, beyond the data provided by the program listings source. The data may include improved sports genres (e.g., sport, professional, college, high school, amateur, international, Olympics, men's, women's, mixed, league, team, and tournament information for each game), availability in different formats (e.g., HD and SD), odds and point spreads, commentary from one or more sources, and data for fantasy sports leagues. As described above, some or all of this data may be provided as part of a plurality of real-time data feeds or streams. These data feeds or streams may be received by the user equipment device from one or more data or content sources (e.g., content source 130, supplemental content source 120, or data sources 140 (FIG. 1)). Such data may include program run time updates (game is going long, in overtime, etc.), scores, other real-time status updates, data for games being broadcast, as well as games that are not available on air, real-time commentary, other sports news items that may not be game related, data for fantasy sports leagues, and any other suitable data. The sports watcher application may also permit two-way data exchanges, for example for exchanging data with other members of fantasy sports leagues. Extended sports program metadata may be defined, including television program listings, VOD metadata, data for games not broadcast on television, universal game/program IDs, live score and status information (e.g., game delayed, running long), and ticker data. Any of the foregoing data may be delivered in an on-demand or carousel fashion.

In addition to the various data feeds, various types of messages may be sent between users in sports watcher mode. The message may include real-time Instant Messages (IMs) or email messages that are delivered to users in real-time, as well as custom sports watcher messages. A sports-specific message center (not shown) may be accessed to manage, view, delete, and send all user messages. In some embodiments, the message center is web-based and accessible over the Internet.

FIG. 29 shows sports watcher options display screen 2900. Display screen 2900 allows the user to customize some of the more common sports watcher options. To view and customize other options, the user may select more option 2914. Default replay time option 2902 allows the user to set default replay increments (in seconds) for various types of sports. For example, when the user presses a "Replay" button on an input device, such as input device 108 (FIG. 1), and a football game is currently in the active window, the last 10 seconds of play time may be replayed. The user may customize this replay time. Faster-paced sports, such as basketball and hockey, may have shorter replay times to better match the amount of play time the user is likely interested in replaying. The user may define more or fewer sports than those shown in default replay time option 2902.

The user may also associate default replay speeds with particular sports using default replay speed option 2904. For example, the user may set football replays to run at normal (i.e., 1×) speed. A variety of slow motion replay speeds (e.g., ½× and ¼× normal speed) and accelerated replay speeds (e.g., 2× and 4× normal speed) may also be defined. The user may associate any one of these speeds with a sport so that the sport will be automatically replayed in the desired speed. The user may override the default speed and time settings during the actual replay, if desired.

The user may also customize the all-sports channel flipping feature using option 2906. The user may limit channel flipping to only sporting events, only sports-related content (including, e.g., sporting events, sports news, sports commentary, and sports-themed movies), or only sports content of a particular sport or group of sports. System-defined or user-defined categories may also be selected. For example, a "popular sports" option may be selected where only channels currently showing baseball, basketball, hockey, golf, and football games are included in the channel flipping sequence. Channels displaying content that do not match the user's preferences in option 2906 may be automatically skipped in the channel flipping sequence as if the channels were not present in the channel line-up.

The user may also customize which icons (e.g., game status icons) the user would like to appear on the scoreboard, such as scoreboard 302 (FIG. 5), using scoreboard icons option 2908. For example, as described above with regard to FIG. 5, several different types of scoreboard icons may appear within the scoreboard. These icons generally provide more information about the game to the user, even if the game is not in the active window or tuned by a tuner in the user equipment device. In the example of FIG. 29, the user has selected commercial status icons, action icons, score icons, and milestone icons to appear in the scoreboard at the appropriate times. Commercial status icons may be displayed in the scoreboard when the game has gone to commercial and/or when the game is back from commercial. In this way, the user knows when the game has resumed from a commercial break. In some embodiments, in addition to the commercial status icon appearing in the scoreboard, the user's primary game may be automatically displayed in the active window (or made active) and/or brought into foreground view when the user's primary game resumes from a commercial break. For example, the user may switch to another game when the primary game breaks for commercial. So that the user does not miss any live action of the primary game, the primary game may be automatically displayed in full-screen mode (and first tuned, if needed) when the primary game returns from a commercial break.

Action icons may be displayed when a drive, rally, or scoring opportunity occurs in a game listed on the scoreboard. For example, an editor may monitor popular sporting events and associate an action flag with the event in a real-time data feed transmitted to the user equipment device. The sports watcher application may parse these action flags and display the appropriate action icon in the scoreboard next to the appropriate score. Action icons may also be displayed automatically when some predefined event occurs in the game. For example, when the clock time reaches a certain time, a predetermined number of points are scored within a predetermined amount of time, or any other suitable event occurs, the appropriate game status or action icon may be displayed in the scoreboard. In some embodiments, in addition to the action icons appearing in the scoreboard, the user's primary game may be automatically displayed in the active window (or made active) and/or brought into foreground view after an action flag is received for the user's primary game. In some embodiments, the user's secondary game may be brought into foreground view or displayed in the active window when an action flag is received for that game.

Score icons may indicate that the score difference between the two teams is less than a predetermined number of points (i.e., it is a close game). For example a yellow exclamation point may be displayed in the scoreboard next to scores within a certain number of points (e.g., 10 points). A red exclamation point may be displayed in the scoreboard next to scores within some fewer number of points (e.g., 5 points). The score icons may attract the user's attention to the game so that the user does not miss an opportunity to view an exciting portion of the game. In some embodiments, in addition to the score icons appearing in the scoreboard, the user's primary (or secondary) game may be automatically displayed in the active window (or made active) and/or brought into foreground view after a score icon is displayed next to the user's primary (or secondary) game in the scoreboard.

Milestone icons include icons indicating to the user that some milestone is about to be reached or surpassed. For example, when a quarterback is about to reach 400 yards passing or a rusher is about to reach 1,000 yards rushing, a milestone icon may be displayed in the scoreboard next to the score associated with the game with the milestone opportunity. In some embodiments, in addition to the milestone icon appearing in the scoreboard, the user's primary (or secondary) game may be automatically displayed in the active window (or made active) and/or brought into foreground view after a milestone icon is displayed next to the user's primary (or secondary) game in the scoreboard.

Flip banner detail option 2910 allows the user to select how much information should be displayed in the flip banner, such as flip banner 402 (FIG. 4). In the example of FIG. 29, the user has selected to display detailed game summary information as well as commentary in the flip banner. Other options might include score and clock time only, brief game summary information, detailed game information, detailed game information with injury report, or any other suitable information. In some embodiments, the user may be allowed to prioritize the types of information that may be displayed on the flip banner in priority order as space allows.

Viewing preferences option 2912 may include a list of sports criteria set by the user that indicate the user's sports viewing preferences. For example, a user may indicate a preference for a particular sport or sports, team or teams, league or leagues, athlete or athletes, or any other suitable criteria. In the example of FIG. 29, the user has indicated that the user's sports viewing preferences include all New York based teams (e.g., Yankees, Mets, Rangers, Islanders, Nets, Knicks, Liberty, Giants, and Jets), professional sporting events (e.g., MLB, NFL, and NHL), and pre-season games. The user may also define any number of sports (e.g., baseball and basketball), tournaments, or any other suitable viewing preferences in viewing preferences option 2912. The entries in viewing preferences option 2912 may be ranked or unranked. As described above, the position and rank in viewing preferences option 2912 may be used, in some embodiments, to calculate user profile scores in accordance with EQ 1.

After the user is finished setting preferences in display screen 2900, the user's profile may be created or updated as appropriate. For example, in some embodiments, the user's profile may be stored as a suitable data structure (e.g., table or array) locally in memory on the user equipment device. In other embodiments, the user's profile may be stored on a central server or data source (e.g., data source 142 of FIG. 1) so as to permit roaming access of the user's profile information and preferences from a user equipment device other than the user equipment device from which the user profile was created.

Regardless of how or where the user's profile is stored, the profile may maintain the user's current preferences and related sports watcher settings. The preferences and settings may be manually selected by the user through an options display screen, such as display screen 2900, or the sports watcher application may automatically set and/or update user preferences in the user's profile on behalf of the user. For example, the sports watcher application may monitor all user interaction with the user equipment device. From this monitoring, a user behavioral profile may be created. For example, all user media content access requests of sports programming may be logged and compared over time. As more and more user access requests are logged, a pattern may be discerned by the sports watcher application. For example, the user may watch the NY Yankees on the YES network more often than other types of sporting events (and more often than any other baseball team). Using any combination of information from the behavioral profile, active user monitoring, and/or the user preferences, the sports watcher application may automatically determine, for example, the user's frequently watched teams, sports, channels, match-ups, leagues, etc. From this determination, the sports watcher application may automatically select any of the options shown in display screen 2900. These automatic selections may be saved to the user's profile and used as default preferences, in some embodiments.

Figure 30:
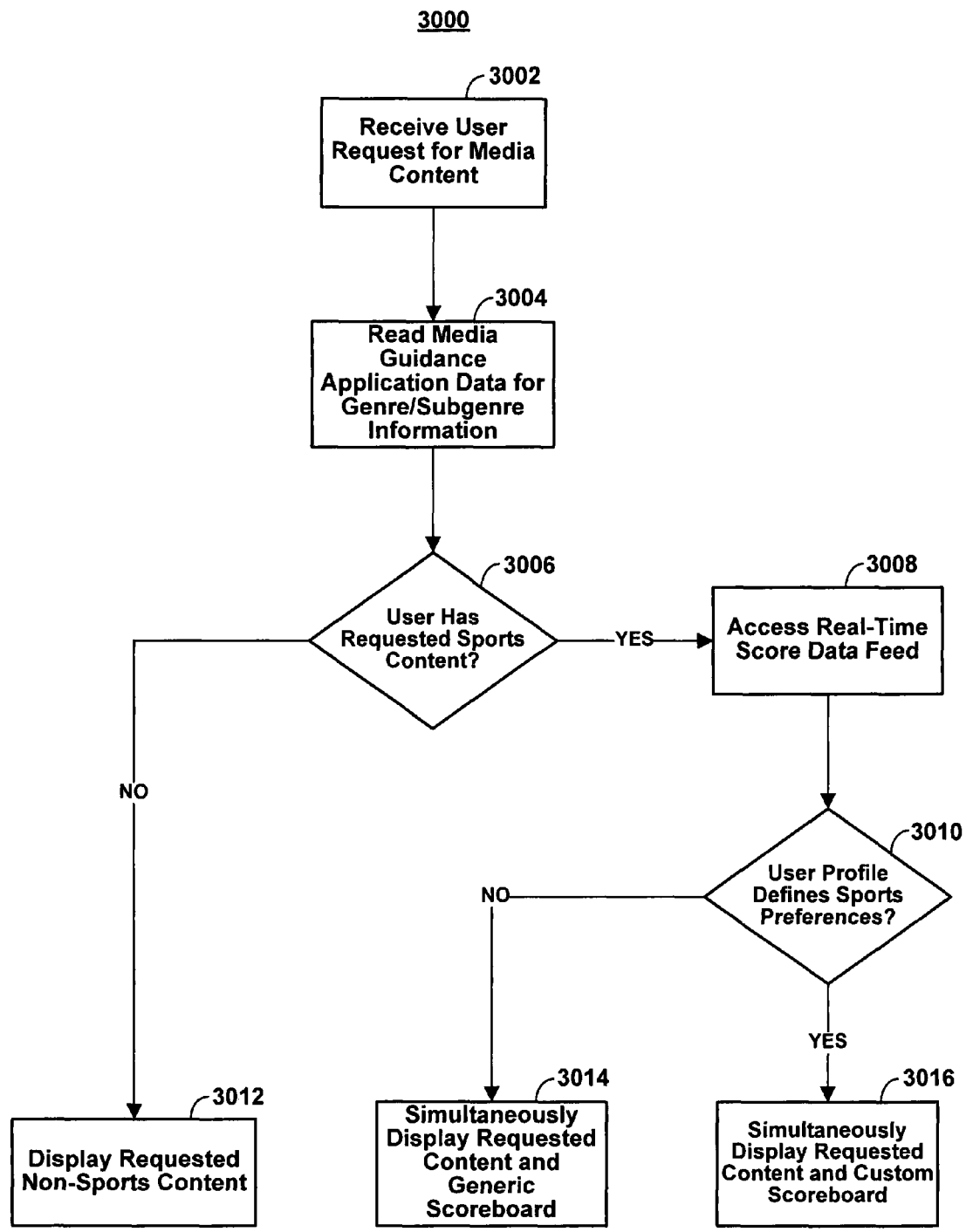
FIGS. 30, 31A, 31B, 32, and 33 are flow charts showing illustrative processes for providing the enhanced sports watcher features and functionality in accordance with various embodiments of the invention.

FIG. 30 shows illustrative process 3000 for simultaneously displaying an interactive scoreboard on a display screen with sports content in accordance with one embodiment of the invention. At step 3002, a user request for media content may be received. For example, the user may use input device 108 (FIG. 1) to request a particular channel, on-demand video, or recorded content. At step 3004, media guidance application data may be read for genre or subgenre information. For example, a professional football game may be associated with the sports genre and the football subgenre. This media guidance application data may be transmitted from a suitable data source within media system 100 (FIG. 1). For example, data source 142 may provide media guidance application data for all types of media content accessible by user equipment 102 (FIG. 1).

At step 3006, sports watcher application 106 (FIG. 1) may determine, at least partially from the media guidance application data, if the user has requested sports content. In addition to using genre information to make the determination at step 3006, sports watcher application 106 (FIG. 1) may also use other media guidance application data to make the determination. For example, the title or description of the content may be searched for sports keywords (e.g., "football"). If, at step 3006, a determination is made that the requested content is not sports-related, the requested non-sports content may be displayed to the user at step 3012. If, at step 3006, a determination is made that the requested content is sports-related, sports watcher mode may be automatically entered. This may include automatically executing sports watcher application 106 (FIG. 1), if the application is not already running on the user equipment. One or more real-time score data feeds may then be automatically accessed at step 3008. For example, supplemental content source 120 (FIG. 1) may provide live data feeds containing score, play, and up-to-date game summary information to user equipment 102 (FIG. 1).

After accessing the real-time data feed at step 3008, the user's profile may be read at step 3010. If the user has defined preferences for what types of sports or games that should be included in the scoreboard display, such as scoreboard 302 (FIG. 5), a custom scoreboard showing scores matching the user's preferences may be simultaneously displayed with the requested content in a display screen at step 3016. If the user has not defined preferences for the types of sports or games the user would like to appear in the scoreboard display, a generic scoreboard with all available scores or a predetermined subset of scores may be displayed simultaneously with the requested content at step 3014.

In practice, one or more steps shown in process 3000 may be combined with other steps, performed in any suitable order, performed in parallel (e.g., simultaneously or substantially simultaneously), or removed.

Figure 31A:
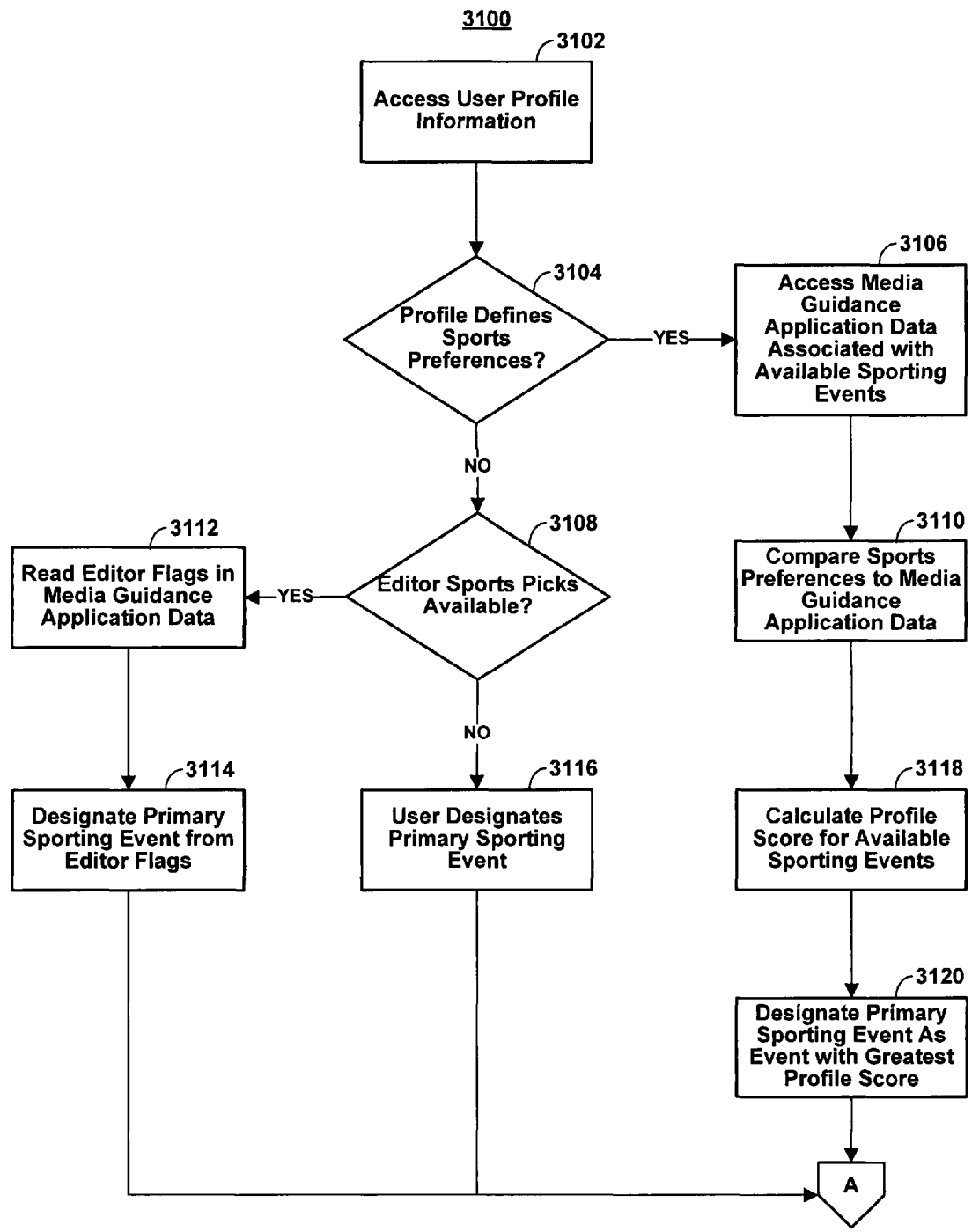
Figure 31B:
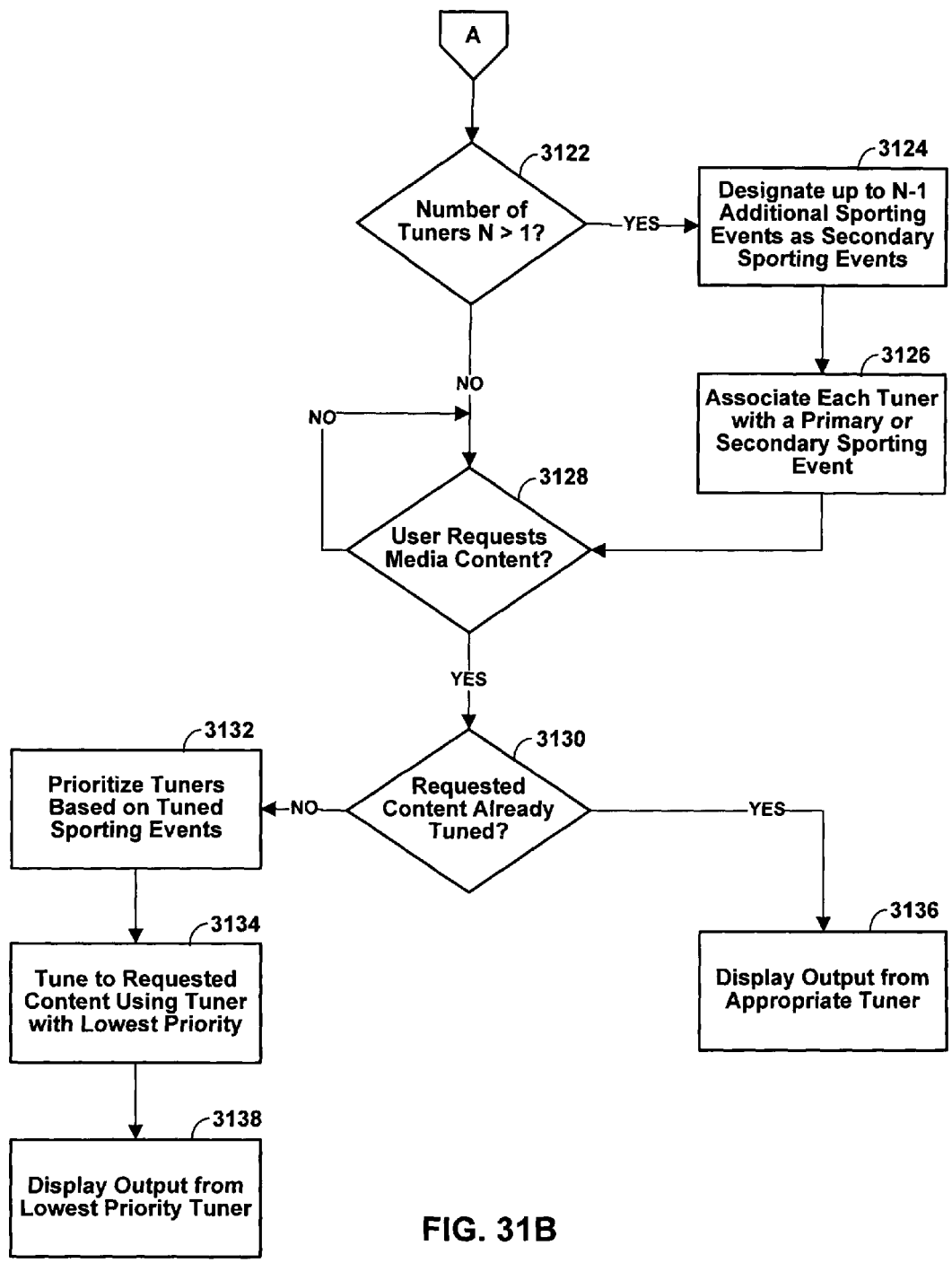

FIGS. 31A and 31B show illustrative process 3100 for designating primary sporting events and prioritizing tuners in accordance with one embodiment of the invention. At step

3102, user profile information may be accessed. At step 3104, sports watcher application 106 (FIG. 1) may determine if the user has setup sports viewing preferences. For example, the user's sports viewing preferences created from sports watcher options display screen 2900 (FIG. 29) (or using other suitable screens such as those shown on FIGS. 10-13) may be read at step 3104. If viewing preferences are defined, media guidance application data associated with sports-related content currently accessible by user equipment 102 (FIG. 1) may be accessed at step 3106. At step 3110, the media guidance application data may be compared to the user's viewing preferences. At step 3118, user profile scores may be calculated at step 3118 based on the comparison. For example, user profile scores may be calculated and stored in profile score column 236 of table 230 (FIG. 2B). In some embodiments, the profile scores may be calculated in accordance with EQ 1. The content with the greatest profile score may be automatically designated as the user's primary sporting event at step 3120. For example, as shown in table 220 (FIG. 2B), the content with the top four user profile scores were assigned as primary sporting events to tuners 1 through 4.

If the user's profile does not define viewing preferences at step 3104, sports watcher application 106 (FIG. 1) may next determine if editor sports picks are defined at step 3108. As described above, in some embodiments, editors may select particular sporting events as primary events and associate a special editor's primary event flag with the media guidance application data for the selected sporting event or events. If editor picks are defined in the system, at step 3112 the editor flag may be read from the media guidance application data. From these flags, one or more sporting events may be designated as primary sporting events at step 3114.

If editor picks are not available at step 3108, the user may manually designate a sporting event as the primary sporting event at step 3116. In some embodiments, the user may not be aware of his or her designation of primary sporting events. For example, the first sporting event the user accesses or requests may be automatically designated as the primary sporting event (absent editor picks or user viewing preferences), the second sporting event the user accesses or requests may be automatically designated as the user's secondary sporting event, and so on. A user may change the designation of primary and/or secondary sporting event at any time by interacting with scoreboard 302 (FIG. 5) or pressing an appropriate key on a user input device, such as input device 108 (FIG. 1). Although, in the example of process 3100, primary sporting events may be designated using either user profile information, editor flags, or user selections, a combination of these three designation criteria may be used in other embodiments.

Illustrative process 3100 continues in FIG. 31B. If the user equipment device, such as user equipment 102 (FIG. 1), contains more than one tuner at step 3122, up to N–1 additional sporting events may be designated as secondary sporting events at step 3124. These secondary events may each be assigned to an available tuner (other than the primary tuner, which has already been assigned to the primary event). The secondary games may be selected in any suitable manner. For example, they may include the sporting events with the greatest remaining profile scores from table 230 (FIG. 2B). The secondary games may also be self-selected by the user or selected by an editor.

At step 3126, each tuner may be associated with a primary or secondary sporting event. For example, table 220 (FIG. 2B) includes an indication of a primary source identifier for each tuner in the user equipment device. As shown in table 220, the tuners are assigned primary events in rank order according to the user profile scores of the sporting events. Thus, tuner 1 is assigned the sporting event with the greatest user profile score, tuner 2 is assigned the sporting event with the next greatest user profile score, and so on. In addition to associating each tuner with a primary or secondary sporting event at step 3126, each tuner may also be automatically pre-tuned to its associated sporting event.

At step 3128, user equipment 102 (FIG. 1) determines if the user has requested media content. For example, the user may select a score displayed in scoreboard 302 (FIG. 5) or scoreboard 804 (FIG. 8) to automatically display the game associated with the selected score. As another example, the user may input a channel number or execute a channel flipping command from an input device, such as input device 108 (FIG. 1). If the user has requested media content at step 3128, at step 3130 sports watcher application 106 (FIG. 1) determines if the requested media content is already tuned by one of the tuners in user equipment 102 (FIG. 1). Depending on the type of tuner, this determination may be made in a number of ways. For example, sports watcher application 106 (FIG. 1) may determine if a particular packet identifier (PID) stream has been demultiplexed from the transport stream (for digital television systems), if a particular channel carrier frequency has been acquired and/or locked (for analog television systems), or if a particular network group (e.g., multicast group) has been joined. Any other method for determining if content has already been tuned by a tuner within the user equipment device may be used in other embodiments.

If the requested content is already tuned by a tuner within user equipment 102 (FIG. 1), the appropriate tuner output may be displayed, brought into foreground view, and/or made the active window at step 3136. If, however, the requested is not already tuned by a tuner within user equipment 102 (FIG. 1), at step 3132 the tuners may be prioritized based on the content tuned by the respective tuners in the user equipment device. For example, as shown in table 220 (FIG. 2B) a simple prioritization scheme may prioritize tuners in rank order according to user profile score of the content currently tuned by each tuner. For example, the tuner with the highest priority (tuner 1 in the example of FIG. 2B) may be assigned to the primary sporting event. The tuner with the next highest priority may be assigned to the sporting event with the next highest user profile score, and so on. Tuners may be prioritized based on the content currently tuned by each tuner, or tuners may be prioritized based on the primary sporting event assigned to each tuner (even if that event happens to not be currently tuned by the associated tuner). Any other suitable tuner prioritization schemes may also be used in other embodiments. As previously mentioned, one goal of prioritizing tuners is that sporting events that the user is interested in (or likely to be interested in) are tuned whenever possible. In this way, sporting events (and other non-sports content) that are less important to the user may be tuned away before important sporting events. This not only reduces the amount of tuning and decoding time required to display important sporting events to the user, but also assures the user that the standard and enhanced video controls described above will be available to the user as often as possible because of, for example, tuner output buffering.

At step 3134, the requested content may be tuned using the tuner with the lowest priority. For example, the tuner currently tuned to content with the lowest user profile score may be used to tune the requested content. In this way, the sporting events of greater interest to the user may remain tuned as long as possible. At step 3138, the requested content tuned on the lowest priority tuner is then displayed to the user, for example, in the main window or in a PIP/POP window.

In practice, one or more steps shown in process 3100 may be combined with other steps, performed in any suitable order, performed in parallel (e.g., simultaneously or substantially simultaneously), or removed.

Figure 32:
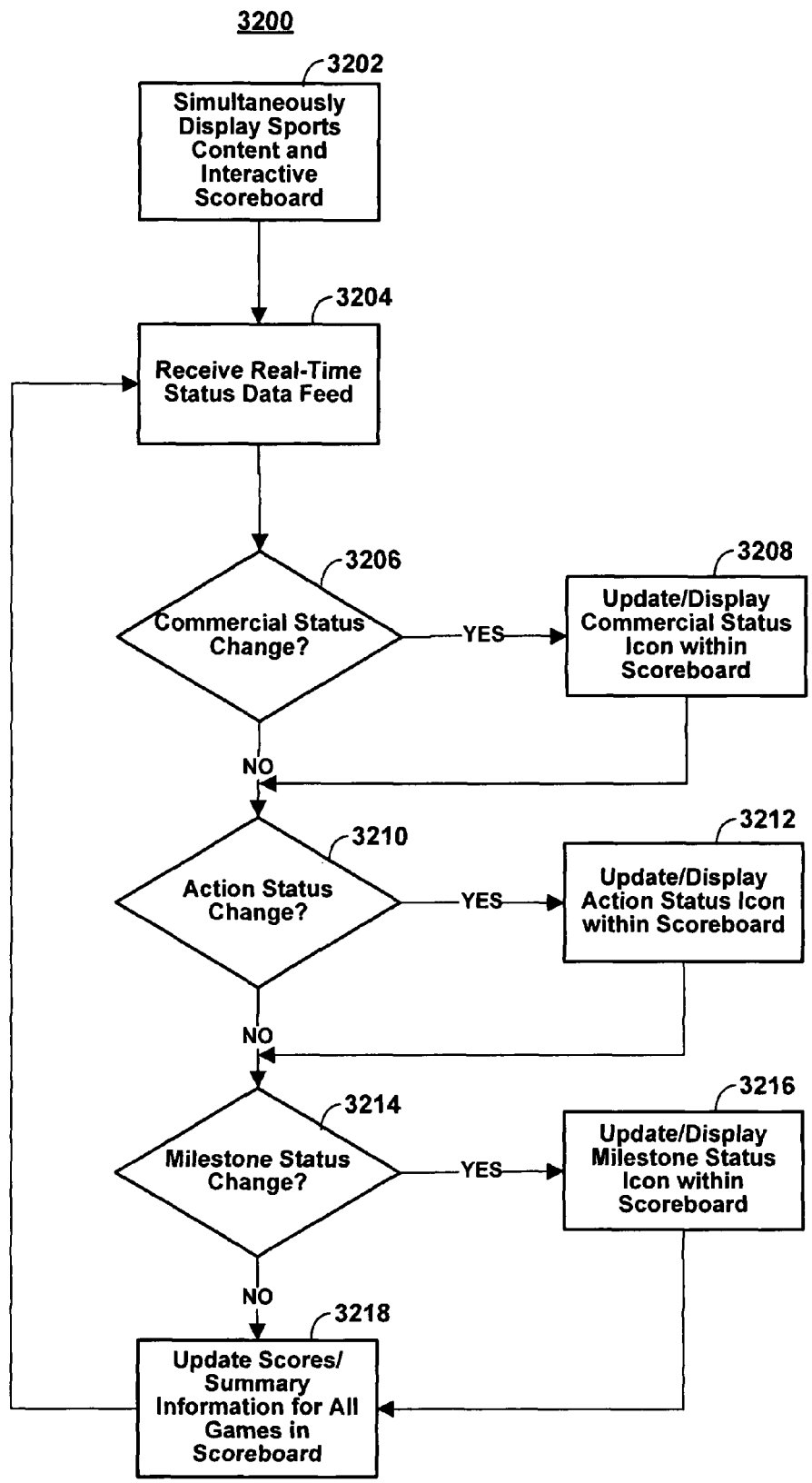

FIG. 32 shows illustrative process 3200 for displaying and updating game status icons within an interactive scoreboard, such as scoreboard 302 (FIG. 5). At step 3202, an interactive scoreboard is displayed simultaneously with a sporting event in a display screen. For example, control circuitry 110 (FIG. 1) may cause one of illustrative display screens 300 (FIG. 3), 400 (FIG. 4), 500 (FIG. 5), 700 (FIG. 7), or 800 (FIG. 8) to be displayed on display device 104 (FIG. 1). As previously described, in some embodiments, interactive scoreboard 302 may be automatically displayed when sports content is accessed or displayed.

At step 3204, one or more real-time status data feeds are received by user equipment 102 (FIG. 1). Sports watcher application 106 (FIG. 1) may parse the received status data feeds for status flags and other related game status information. For example, real-time scores, clock time, and any other suitable game information may be included in the real-time status data feeds.

At step 3206, sports watcher application 106 (FIG. 1) may determine if a commercial status change has occurred. For example, in some embodiments, commercial status flags may be included in one or more of the real-time status data feeds received at step 3204. Sports watcher application 106 (FIG. 1) may automatically monitor the status data feeds for incoming commercial status change flags for the games associated with the scores currently displayed in the interactive scoreboard, such as scoreboard 302 (FIG. 3). Additionally or alternatively, sports watcher application 106 (FIG. 1) may monitor the black frame interval, audio level, and/or any other suitable audio or video characteristic of the content on all the tuners in the user equipment device. From this information, sports watcher application 106 (FIG. 1) may determine when a sporting event has resumed from a commercial break without the need for commercial status change flags. In other embodiments, a hybrid approach may be used, whereby commercial status change flags are used in conjunction with audio and/or video characteristics of the content stream.

If a commercial status change is detected at step 3206, a commercial status icon may be displayed, removed, or updated within the interactive scoreboard. For example, display screen 500 (FIG. 5) shows commercial status icon 502. In the example of FIG. 5, icon 502 is displayed when the game associated with the score displayed in the scoreboard has returned from a commercial break. Thus, the icon indicates that there is now live play in the game associated with the score the icon is displayed adjacent to. In some embodiments, the commercial status icon may flash for a predetermined amount of time in the scoreboard after a commercial break has ended in order to draw the immediate attention of the user. The user might then select to switch the display to a game that has returned from a commercial break. Any other graphical or textual icons may be used in other embodiments.

After the commercial status icon is updated or displayed in the scoreboard at step 3208, or if no commercial status change is detected at step 3206, at step 3210 sports watcher application 106 (FIG. 1) may determine if there is an action status change in any of the games associated with scores currently displayed in the scoreboard. Action status flags may be included in one or more of the real-time status data feeds received at step 3204. From the action status flags, sports watcher application 106 (FIG. 1) may determine, for example, if there is a scoring drive, rally, or any other event of potential interest to the user currently occurring in any of the games associated with scores currently displayed in the scoreboard. As previously described, editors may actively monitor popular sports games for action events and associate an action status flag with games with exciting action. The action status flags may be also be generated automatically, for example, when less than a certain amount of clock time is remaining in a game, a close score is detected, or any other suitable event in the game occurs.

If sports watcher application 106 (FIG. 1) determines that there is an action status change in any of the games associated with scores currently displayed in the scoreboard, at step 3212 an action status icon may be updated, removed, or displayed in the scoreboard. For example, display screen 500 (FIG. 5) displays action status icon 504. In the example of FIG. 5, the icon is displayed when the game associated with the score has less than a predetermined amount of clock time remaining. The amount of clock time remaining may also be displayed in the scoreboard, as shown in scoreboard 302 of FIG. 5.

After the action status icon is updated or displayed in the scoreboard at step 3212, or if no action status change is detected at step 3210, at step 3214 sports watcher application 106 (FIG. 1) may determine if there is a milestone status change in any of the games associated with scores currently displayed in the scoreboard. For example, milestone status flags may be included by an editor in one or more of the real-time status data feeds received at step 3204. The editor may associate milestone status flags with, for example, game that have one or more players approaching statistical milestones (e.g., 400 yard passer or 1,000 yard rusher).

If sports watcher application 106 (FIG. 1) determines that there is a milestone status change in any of the games associated with scores currently displayed in the scoreboard, at step 3216 a milestone status icon may be updated, removed, or displayed in the scoreboard. For example, a graphical or textual icon may be displayed in the scoreboard that optionally informs the user about the type of milestone or the player associated with the statistical milestone. The user may select the milestone icon using input device 108 (FIG. 1) in some embodiments in order to be presented with a screen of detailed milestone information.

After the milestone status icon is updated or displayed in the scoreboard at step 3216, or if no milestone status change is detected at step 3218, the score or summary information displayed in the scoreboard may be updated at step 3218. In some embodiments, scores and summary information are automatically updated as real-time score information is received by the user equipment device. In other embodiments, score and summary information displayed in the scoreboard are updated periodically (e.g., every 5 seconds).

Although the scoreboard icons described above are illustrated in terms of a specific sport (e.g., football), in some embodiments, the icons may include custom icons for each type of sport. For example, an action icon for tennis may resemble a bouncing tennis ball, while an action for soccer resembles a bouncing soccer ball. Using tennis as an example, these action icons may be displayed when there is a tie set, at set point, at match point, or at any other suitable time when the user might be interested in quickly changing to the match. The icons and alerts described herein may be expanded to support other sports, including non-traditional sports and multi-sport tournaments, such as the Olympics. For example, a user may designate a home country (e.g., the USA) in the user's profile. Suitable icons may be displayed in the scoreboard when the user's home country is about to win a medal (e.g., gold), go ahead in total medal count, or any other suitable event occurs. The top finishers in each event may be displayed in lieu of a score within the scoreboard.

In practice, one or more steps shown in process 3200 may be combined with other steps, performed in any suitable order, performed in parallel (e.g., simultaneously or substantially simultaneously), or removed. Any suitable combination of icons and alerts may be shown on the scoreboard, including icons and alerts not described herein. The status of conditions affecting these alerts and icons may be monitored or checked in any suitable order or at any suitable interval.

Figure 33:
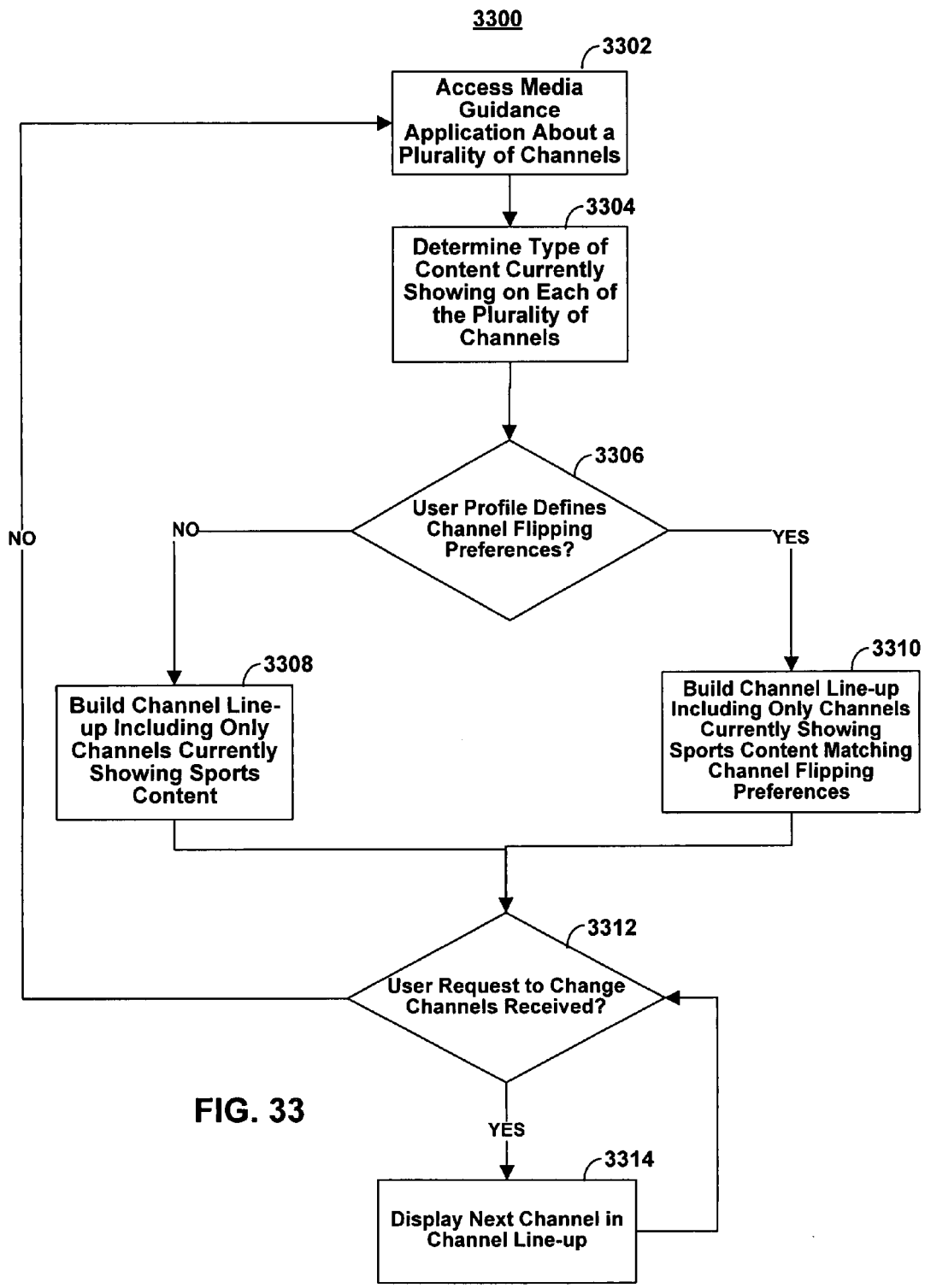

FIG. 33 shows illustrative process 3300 for implementing an all-sports channel flipping function. As previously described, the all-sports channel flipping function may be useful for users who wish to quickly surf through the available channels currently showing sporting events or sports-related programming. At step 3302, media guidance application data is accessed about a plurality of channels. For example, sports watcher application 106 (FIG. 1) may read genre and/or subgenre information about the programming currently being shown on all the channels in the user equipment channel line-up or channel map.

At step 3304, the type of content currently showing on each of the plurality of channels may be determined. For example, the genre or subgenre information may be used to determine the type of content in some embodiments. Additionally or alternatively, a keyword search of the title or summary information of the content currently showing on each channel may be executed. The content matching certain keywords may be automatically designated as a particular type of content. For example, content with the "NFL" or "football" keyword appearing in the title or summary information may be automatically designated as sports content.

At step 3306, sports watcher application 106 (FIG. 1) may determine if the user profile defines channel flipping preferences. For example, in some embodiments, the user may set channel flipping preferences from sports watcher options display screen 2900 (FIG. 29). In other embodiments, as described above, preferences in the user's profile may be selected automatically by sports watcher application 106 (FIG. 1). If the user's profile does not define channel flipping preferences, at step 3308 a channel line-up may be built including only those channels currently showing sporting events (or sports-related content). If the user's profile does define channel flipping preferences, at step 3310 a channel line-up may be built that includes only channels matching the user's flipping preferences. For example, as shown in sports watcher options display screen 2900 (FIG. 29), the user has selected specific sports to be included in the all-sports channel flipping function using channel flipping option 2906. Therefore, only channels showing the sports enumerated in channel flipping option 2906 may be included in the channel line-up at step 3310. All other channels may be omitted from the line-up for the purposes of the all-sports flipping function.

At step 3312, a determination is made whether the user has requested to change channels using the all-sports flipping function. In some embodiments, the user defaults to the all-sports flipping function for all channel up or channel down requests while in sports watcher mode. In other embodiments, a separate button or button are defined on an input derive, such as input device 108 (FIG. 1). The user may use the regular channel up and channel down buttons to flip through the entire channel line-up (i.e., all channels) and special all-sports channel up and channel down buttons to flip through the channel line-up built in step 3308 or 3310. In some embodiments, the user may use the regular channel up and down buttons to flip through all sports programs, and a separate button (e.g., a favorites button) to limit flipping further to only programs matching the user's preferences.

If a request is received to change channels using the all-sports flipping function, at step 3314 the next channel in the channel line-up is displayed to the user. For example, the next channel showing sports content in the direction of channel flipping may be displayed to the user at step 3314. This channel may be displayed in the main window or PIP/POP window. If no request to change channels is received at step 3312, illustrative process 3300 may begin again at step 3302. New channel line-ups may be built during idle channel flipping time or at periodic intervals (e.g., every 15 minutes). In this way, the channel line-ups are refreshed on a regular basis to ensure that the channel line-ups include only sports-related content.

In practice, one or more steps shown in process 3300 may be combined with other steps, performed in any suitable order, performed in parallel (e.g., simultaneously or substantially simultaneously), or removed.

The above described embodiments of the invention are presented for purposes of illustration and not of limitation, and the present invention is limited only by the claims which follow.

What is claimed is:

1. A method for sports-related media content tuning in a multi-tuner system, the method comprising:
   tuning to a first sporting event on a first television channel with a first tuner;
   tuning to a second sporting event on a second television channel with a second tuner;
   storing an identifier indicating one of the first sporting event and the second sporting event is a primary sporting event;
   receiving a user request to tune to a first media content that is not currently tuned by either the first tuner or the second tuner;
   in response to receiving the user request:
      determining, based on the stored identifier, by the control circuitry, which of the first and second tuners is tuned to the primary sporting event;
      selecting, by the control circuitry, a tuner other than the tuner tuned to the primary sporting event based on the determination; and
      tuning to the first media content with the selected tuner, whereby the first media content is tuned without tuning away from the primary sporting event.

2. The method of claim 1 further comprising simultaneously displaying the first media content in a PIP window and the primary sporting event in full-screen in response to receiving the user request.

3. The method of claim 1 wherein receiving an indication of a primary sporting event comprises receiving the indication from a user at the multi-tuner system.

4. The method of claim 1 wherein receiving an indication of a primary sporting event comprises receiving the indication from a cable headend or facility remote from the multi-tuner system.

5. The method of claim 1, wherein the multi-tuner system comprises at least three tuners, the method further comprising:
   tuning to at least one additional sporting event on at least one additional tuner; and
   receiving an indication of a secondary sporting event, wherein the secondary sporting event is one of the first sporting event, the second sporting event, and the at least one additional sporting event.

6. The method of claim 1 further comprising:
after tuning to the first media content, receiving a user request to tune to the primary sporting event;
determining if one of the first tuner and the second tuner is already tuned to the primary sporting event; and
in response to determining that one of the first tuner and the second tuner is already tuned to the primary sporting event, displaying the output of the tuner that is already tuned to the primary sporting event.

7. The method of claim 1 further comprising buffering the output of at least one of the first tuner and the second tuner.

8. The method of claim 1 further comprising:
accessing media guidance application data including genre information about a plurality of channels;
determining, from the media guidance application data, the channels of the plurality of channels that are currently showing sporting events; and
in response to receiving a user request to change channels, tuning to the next channel currently showing a sporting event.

9. The method of claim 1 further comprising:
accessing user profile information comprising a plurality of user viewing preferences;
calculating, based at least in part on the user viewing preferences, a user profile score for each of the first sporting event and the second sporting event; and
assigning a priority to at least one of the first tuner and the second tuner, the priority based at least in part on the calculated user profile scores.

10. The method of claim 1 further comprising:
determining that the first tuner and the second tuner are tuned to the first sporting event and the second sporting event respectively, and in response:
selecting one of the first sporting event and second sporting event as the primary sporting event; and
storing the identifier indicating that the one of the first sporting event and second sporting event is selected as the primary sporting event.

11. The method of claim 4 wherein the primary sporting event comprises a sporting event with the most active viewers in a local geographic region.

12. The method of claim 4 wherein the primary sporting event comprises a sporting event selected by an editor.

13. The method of claim 5 wherein the secondary sporting event is other than the primary sporting event.

14. The method of claim 5 further comprising:
accessing user profile information comprising a plurality of user viewing preferences;
calculating, based at least in part on the user viewing preferences, a user profile score for each of the first sporting event, the second sporting event, and the at least one additional sporting event; and
assigning a priority to at least one of the first tuner, the second tuner, and the at least one additional tuner, the priority based at least in part on the calculated user profile scores.

15. The method of claim 7 further comprising:
receiving a user request to replay at least a portion of the buffered output; and
in response to receiving the user request to replay, replaying the portion of the buffered output.

16. The method of claim 8 wherein tuning to the next channel currently showing a sporting event comprises tuning to the next channel currently showing a sporting event in the direction of a channel surf.

17. The method of claim 8 further comprising:
determining, from the media guidance application data, the channels of the plurality of channels that are currently showing a particular type of sporting event, wherein the next channel currently showing a sporting event is the next channel currently showing a sporting event of the particular type.

18. The method of claim 8 wherein determining the channels of the plurality of channels that are currently showing sporting events comprises building and storing a table of the channels that are currently showing sporting events.

19. The method of claim 8 further comprising automatically scanning through the channels currently showing sporting events, wherein each channel is displayed for a predetermined amount of time.

20. The method of claim 8 further comprising:
determining which channels of the channels that are currently showing sporting events match user profile information, wherein tuning to the next channel currently showing a sporting event comprises tuning to the next channel currently showing a sporting event that matches the user profile information.

21. The method of claim 8 further comprising displaying an interactive listing of the channels of the plurality of channels that are currently showing sporting events to the user.

22. The method of claim 9 wherein calculating a user profile score for each of the first sporting event and the second sporting event comprises:
assigning a weight to each of the plurality of user viewing preferences;
ranking the first sporting event and the second event according to each of the plurality of user viewing preferences; and
summing a product of the rank and the weight for each of the plurality of user viewing preferences.

23. The method of claim 9 wherein selecting a tuner other than the tuner tuned to the primary sporting event comprises selecting the tuner with the lowest priority.

24. The method of claim 14 wherein calculating a user profile score for each of the first sporting event, the second sporting event, and the at least one additional sporting event comprises:
assigning a weight to each of the plurality of user viewing preferences;
ranking the first sporting event, the second event, and the at least one additional sporting event according to each of the plurality of user viewing preferences; and
summing a product of the rank and the weight for each of the plurality of user viewing preferences.

25. The method of claim 14 wherein selecting a tuner other than the tuner tuned to the primary sporting event comprises selecting the tuner with the lowest priority.

26. The method of claim 15 wherein receiving a user request to replay at least a portion of the buffered output comprises receiving a user indication of a replay start point and a replay stop point.

27. The method of claim 15 wherein receiving a user request to replay at least a portion of the buffered output comprises:
displaying multiple replay speed options; and
receiving a user selection of one of the multiple replay speed options.

28. The method of claim 15 wherein receiving a user request to replay at least a portion of the buffered output comprises:
  displaying multiple replay time options; and
  receiving a user selection of one of the multiple replay time options.

29. The method of claim 15 wherein replaying the portion of the buffered output comprises automatically replaying the portion of the buffered output more than one time.

30. The method of claim 15 further comprising determining the type of sporting event buffered in the portion of the buffered output, wherein replaying the portion of the buffered output comprises selecting a replay speed or a replay time based on the determined type of sporting event.

31. The method of claim 17 wherein the particular type of sporting event is selected from the group consisting of a basketball sporting event, a baseball sporting event, a football sporting event, a soccer sporting event, a tennis sporting event, a golfing sporting event, a boxing sporting event, and a hockey sporting event.

32. The method of claim 17 wherein the particular type of sporting event is selected from the group consisting of a professional sporting event, an amateur sporting event, a sporting event of a particular division, and a sporting event of a particular tournament.

33. The method of claim 18 further comprising automatically updating the table on a periodic basis.

34. The method of claim 18 further comprising automatically updating the table after new media guidance application data is received.

35. The method of claim 20 wherein the user profile information comprises user favorites information.

36. The method of claim 21 further comprising reordering the interactive listing by sport and displaying the reordered interactive listing to the user.

37. The method of claim 21 further comprising:
  receiving a user selection of at least one channel in the interactive listing; and
  invoking a media guidance application function in response to receiving the user selection of the at least one channel in the interactive listing.

38. The method of claim 26 wherein the replay start point and the replay stop point are set using a nudge function from a user-selected pause point in the buffered output.

39. The method of claim 27 further comprising:
  determining the type of sporting event buffered in the portion of the buffered output; and
  selecting the multiple replay speed options for display based on the type of sporting event buffered in the portion of the buffered output, wherein different replay speed options are selected for different types of sporting events.

40. The method of claim 28 further comprising:
  determining the type of sporting event buffered in the portion of the buffered output; and
  selecting the multiple replay time options for display based on the type of sporting event buffered in the portion of the buffered output, wherein different replay time options are selected for different types of sporting events.

41. The method of claim 29 wherein receiving a user request to replay at least a portion of the buffered output comprises pressing and holding a replay button, wherein the portion of the buffered output is replayed repeatedly until the replay button is released.

42. The method of claim 35 wherein the user profile information comprises information selected from the group consisting of a favorite sport, a favorite channel, a favorite team, a favorite league, a favorite player, a favorite coach, and a favorite venue.

43. The method of claim 37 wherein the media guidance application function is selected from the group consisting of tuning to the selected channel, adding the channel to a favorites list, setting a reminder, scheduling a recording, and setting an alert.

44. A method for sports-related media content tuning in a multi-tuner system, the method comprising:
  receiving a user request for media content;
  determining the genre of the requested media content; and
  in response to determining that the genre of the requested media content is a sports genre, automatically:
  accessing, with the control circuitry, user profile information comprising a plurality of user sports viewing preferences;
  calculating, with the control circuitry and based at least in part on the user sports viewing preferences, a user profile score for the requested media content;
  assigning, with the control circuitry, a priority to the requested media content, the priority based at least in part on the calculated user profile score;
  determining, with the control circuitry, a priority of each media content presently tuned by a respective one of the tuners within the multi-tuner system, the priority based at least in part on the calculated user score;
  comparing, with the control circuitry, the priority assigned to the requested media content to each of the other priorities assigned to the media content presently tuned by one of the respective tuners;
  selecting, with the control circuitry and based on the priority comparison, one of the tuners within the multi-tuner system; and
  tuning the requested media content on the selected tuner.

45. A system for sports-related media content tuning, the system comprising:
  at least a first tuner and a second tuner; and
  control circuitry configured to:
  tune to a first sporting event on a first television channel with the first tuner;
  tune to a second sporting event on a second television channel with the second tuner;
  store an identifier indicating one of the first sporting event and the second sporting event is a primary sporting event;
  receive a user request to tune to a first media content that is not currently tuned by either the first tuner or the second tuner;
  in response to receiving the user request:
    determine, based on the stored identifier which of the first and second tuners is tuned to the primary sporting event;
    select a tuner other than the tuner tuned to the primary sporting event based on the determination; and
    tune to the first media content with the selected tuner, whereby the first media content is tuned without tuning away from the primary sporting event.

46. The system of claim 45 wherein the control circuitry is further configured to:
  simultaneously display the first media content in a PIP window and the primary sporting event in full-screen in response to receiving the user request.

47. The system of claim 45 wherein the control circuitry is further configured to receive the indication of the primary sporting event from a local user.

48. The system of claim 45 wherein the control circuitry is further configured to receive the indication of the primary sporting event from a remote cable headend or facility.

49. The system of claim 45 wherein the system comprises at least one additional tuner, the control circuitry further configured to:
tune to at least one additional sporting event on the at least one additional tuner; and
receive an indication of a secondary sporting event, wherein the secondary sporting event is one of the first sporting event, the second sporting event, and the at least one additional sporting event.

50. The system of claim 45 wherein the control circuitry is further configured to:
after tuning to the first media content, receive a user request to tune to the primary sporting event;
determine if one of the first tuner and the second tuner is already tuned to the primary sporting event; and
in response to determining that one of the first tuner and the second tuner is already tuned to the primary sporting event, display the output of the tuner that is already tuned to the primary sporting event.

51. The system of claim 45 wherein the control circuitry is further configured to buffer the output of at least one of the first tuner and the second tuner.

52. The system of claim 45 wherein the control circuitry is further configured to:
access media guidance application data including genre information about a plurality of channels;
determine, from the media guidance application data, the channels of the plurality of channels that are currently showing sporting events; and
in response to receiving a user request to change channels, tune to the next channel currently showing a sporting event.

53. The system of claim 52 wherein the control circuitry is configured to:
determine, from the media guidance application data, the channels of the plurality of channels that are currently showing a particular type of sporting event, wherein the next channel currently showing a sporting event is the next channel currently showing a sporting event of the particular type.

54. The system of claim 45 wherein the control circuitry is configured to:
access user profile information comprising a plurality of user viewing preferences;
calculate, based at least in part on the user viewing preferences, a user profile score for each of the first sporting event and the second sporting event; and
assign a priority to at least one of the first tuner and the second tuner, the priority based at least in part on the calculated user profile scores.

55. The system of claim 48 wherein the primary sporting event comprises a sporting event with the most active viewers in a local geographic region.

56. The system of claim 48 wherein the primary sporting event comprises a sporting event selected by an editor.

57. The system of claim 49 wherein the secondary sporting event is other than the primary sporting event.

58. The system of claim 49 wherein the control circuitry is configured to:
access user profile information comprising a plurality of user viewing preferences;
calculate, based at least in part on the user viewing preferences, a user profile score for each of the first sporting event, the second sporting event, and the at least one additional sporting event; and
assign a priority to at least one of the first tuner, the second tuner, and the at least one additional tuner, the priority based at least in part on the calculated user profile scores.

59. The system of claim 51 wherein the control circuitry is further configured to:
receive a user request to replay at least a portion of the buffered output; and in response to receiving the user request to replay, replay the portion of the buffered output.

60. The system of claim 52 wherein the control circuitry is configured to tune to the next channel currently showing a sporting event by tuning to the next channel currently showing a sporting event in the direction of a channel surf.

61. The system of claim 52 wherein the control circuitry is configured to build and store a table of the channels that are currently showing sporting events.

62. The system of claim 52 wherein the control circuitry is configured to automatically scan through the channels currently showing sporting events, wherein each channel is displayed for a predetermined amount of time.

63. The system of claim 52 wherein the control circuitry is configured to display an interactive listing of the channels of the plurality of channels (Original) that are currently showing sporting events to the user.

64. The system of claim 53 wherein the particular type of sporting event is selected from the group consisting of a basketball sporting event, a baseball sporting event, a football sporting event, a soccer sporting event, a tennis sporting event, a golfing sporting event, a boxing sporting event, and a hockey sporting event.

65. The system of claim 53 wherein the particular type of sporting event is selected from the group consisting of a professional sporting event, an amateur sporting event, a sporting event of a particular division, and a sporting event of a particular tournament.

66. The system of claim 54 wherein the control circuitry is further configured to:
assign a weight to each of the plurality of user viewing preferences;
rank the first sporting event and the second event according to each of the plurality of user viewing preferences; and
sum a product of the rank and the weight for each of the plurality of user viewing preferences.

67. The system of claim 54 wherein the control circuitry is configured to select the tuner with the lowest priority.

68. The system of claim 58 wherein the control circuitry is configured to:
assign a weight to each of the plurality of user viewing preferences;
rank the first sporting event, the second event, and the at least one additional sporting event according to each of the plurality of user viewing preferences; and
sum a product of the rank and the weight for each of the plurality of user viewing preferences.

69. The system of claim 58 wherein the control circuitry is configured to select the tuner with the lowest priority.

70. The system of claim 59 wherein the control circuitry is configured to receive a user indication of a reply start point and a reply stop point.

71. The system of claim 59 wherein the control circuitry is further configured to:
display multiple replay speed options; and
receive a user selection of one of the multiple replay speed options.

72. The system of claim 59 wherein the control circuitry is further configured to:
   display multiple replay time options; and
   receive a user selection of one of the multiple replay time options.

73. The system of claim 59 wherein the control circuitry is configured to replay the portion of the buffered output more than one time.

74. The system of claim 59 wherein the control circuitry is further configured to determine the type of sporting event buffered in the portion of the buffered output, wherein the control circuitry is configured to replay the portion of the buffered output at a replay speed or for a replay time based on the determined type of sporting event.

75. The system of 61 wherein the control circuitry is further configured to automatically update the table on a periodic basis.

76. The system of 61 wherein the control circuitry is further configured to automatically update the table after new media guidance application data is received.

77. The system of claim 62 wherein the control circuitry is configured to:
   determine which channels of the channels that are currently showing sporting events match user profile information and tune to the next channel currently showing a sporting event that matches the user profile information.

78. The system of claim 63 wherein the control circuitry is configured to reorder the interactive listing by sport and display the reordered interactive listing to the user.

79. The system of claim 63 wherein the control circuitry is configured to:
   receive a user selection of at least one channel in the interactive listing; and
   invoke a media guidance application function in response to receiving the user selection of the at least one channel in the interactive listing.

80. The system of claim 70 wherein the reply start point and the reply stop point are set using a nudge function from a user-selected pause point in the buffered output.

81. The system of claim 71 wherein the control circuitry is further configured to:
   determine the type of sporting event buffered in the portion of the buffered output; and
   select the multiple reply speed options for display based on the type of sporting event buffered in the portion of the buffered output, wherein different replay speed options are selected for different types of sporting events.

82. The system of claim 72 wherein the control circuitry is further configured to:
   determine the type of sporting event buffered in the portion of the buffered output; and
   select the multiple reply time options for display based on the type of sporting event buffered in the portion of the buffered output, wherein different replay time options are selected for different types of sporting events.

83. The system of claim 73 wherein the control circuitry is configured to replay at least a portion of the buffered output repeatedly while a user presses and holds a replay button.

84. The system of claim 77 wherein the user profile information comprises user favorites information.

85. The system of claim 79 wherein the media guidance application function is selected from the group consisting of tuning to the selected channel, adding the channel to a favorites list, setting a reminder, scheduling a recording, and setting an alert.

86. The system of claim 84 wherein the user profile information comprises information selected from the group consisting of a favorite sport, a favorite channel, a favorite team, a favorite league, a favorite player, a favorite coach, and a favorite venue.

* * * * *

UNITED STATES PATENT AND TRADEMARK OFFICE
CERTIFICATE OF CORRECTION

| | | |
|---|---|---|
| PATENT NO. | : 8,745,661 B2 | Page 1 of 1 |
| APPLICATION NO. | : 11/888675 | |
| DATED | : June 3, 2014 | |
| INVENTOR(S) | : Ellis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1533 days.

Signed and Sealed this
Fourth Day of August, 2015

Michelle K. Lee
*Director of the United States Patent and Trademark Office*